(12) United States Patent
Katai

(10) Patent No.: US 7,922,947 B2
(45) Date of Patent: Apr. 12, 2011

(54) METHOD OF PRODUCING DISPERSION

(75) Inventor: Yukihiro Katai, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1490 days.

(21) Appl. No.: 10/947,248

(22) Filed: Sep. 23, 2004

(65) Prior Publication Data

US 2005/0062193 A1  Mar. 24, 2005

(30) Foreign Application Priority Data

Sep. 24, 2003  (JP) .................. 2003-331178

(51) Int. Cl.
*B29D 7/00* (2006.01)
(52) U.S. Cl. .................................. 264/216
(58) Field of Classification Search .............. 264/216, 264/204, 207
See application file for complete search history.

(56) References Cited

U.S. PATENT DOCUMENTS

| 2002/0044986 | A1* | 4/2002 | Yamazaki et al. | 425/378.1 |
| 2002/0192397 | A1* | 12/2002 | Tsujimoto | 428/1.31 |
| 2004/0017022 | A1* | 1/2004 | Yamada | 264/217 |

FOREIGN PATENT DOCUMENTS

| JP | 61-106628 | 5/1986 |
| JP | 11-323017 | 11/1999 |
| JP | 2000-273239 A | 10/2000 |
| JP | 2001-1745 | 3/2001 |
| JP | 2001-042628 | * 12/2001 |
| JP | 2002-128900 | 5/2002 |
| WO | WO 02/22720 | * 3/2002 |

OTHER PUBLICATIONS

Japanese Office Action issued in Japanese Patent Application No. 2003-331178 on Feb. 5, 2010.

* cited by examiner

*Primary Examiner* — Matthew J Daniels
*Assistant Examiner* — Russell J Kemmerle, III
(74) *Attorney, Agent, or Firm* — Birch, Stewart, Kolasch & Birch, LLP

(57) ABSTRACT

A solvent and TAC particles are continuously supplied to a disperser. When the shearing of the solvent and the particles are made in a shearing section, the particles are dispersed in the solvent. The dispersion is fed to a mixer in one minute. The shearing of the dispersion is made in the mixer, the particles are swollen in the solvent in one minute. Since the shearing and the continuous feed of the swelling solution is made, the aggregation does not occur. There are no undissolved aggregates in a dope, which is obtained from the swelling solution. A film produced from the dope has no defects of luminescent spot but excellent optical properties.

21 Claims, 4 Drawing Sheets

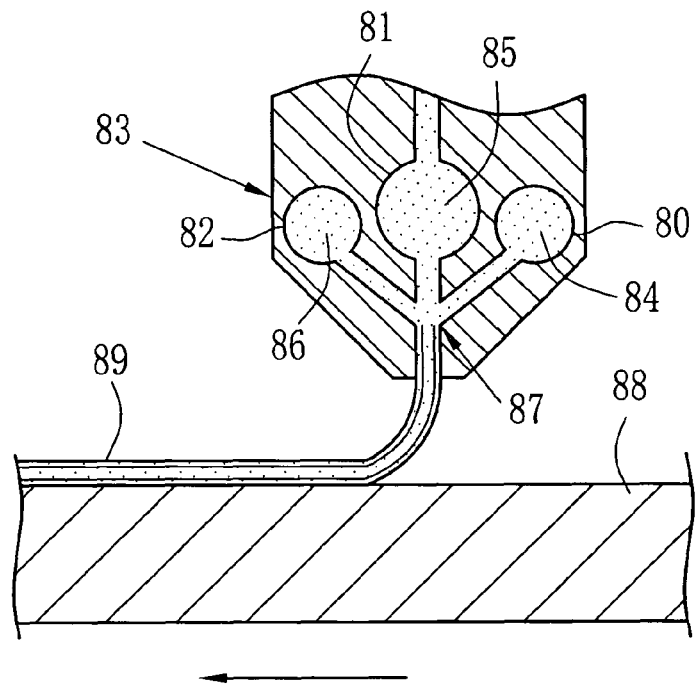
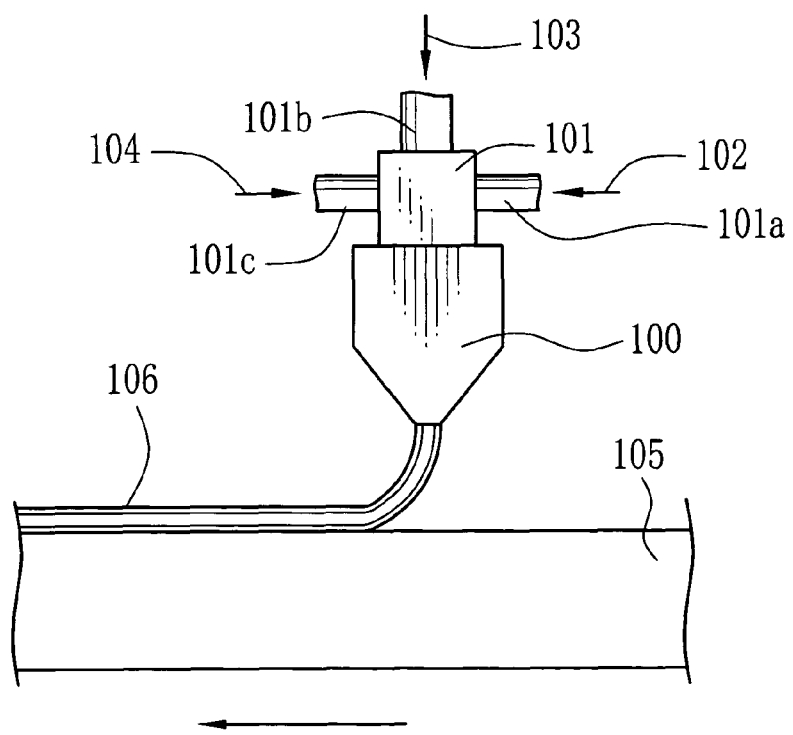

METHOD OF PRODUCING DISPERSION

This Non-provisional application claims priority under 35 U.S.C. §119(a) on Patent Application No(s). 2003-331178 filed in Japan on Sep. 24, 2003, the entire contents of which are hereby incorporated by reference.

BACKGROUND OF THE INVENTION

1. Field of the Invention

The present invention relates to a method of producing a cellulose acylate dispersion used for preparing a swelling solution and a dope, more especially to a method of producing a cellulose acylate dispersion used for preparing a swelling solution and a dope for forming a film for optical use in-a solution casting method.

2. Description Related to the Prior Art

Cellulose acylate, especially cellulose triacetate (hereinafter TAC) is used as a raw material for producing a TAC film in a solution casting method. The TAC film is used as a base of a photosensitive material and in a liquid crystal display. In a method of producing the TAC film, the TAC is dissolved to a mixture solvent whose main solvent is dichloromethane, to prepare a polymer solution (hereinafter dope). Then the dope is cast on a support (for example a belt, a rotary drum, and the like) to form a casting film. When the casting film has a self-supporting property, the casting film is peeled from the support by a peel roller, dried and cooled. Thereafter the casting film is wound as a film (see, Japan Institute of Invention and Innovation (JIII) JOURNAL No.2001-1745).

The dope is prepared in a batch operation in which TAC powders and the solvent are usually supplied into a tank and then stirred and mixed. In the batch operation, there are some merits, for example, the quality of the solution is uniform in one batch, and the amount of the preparation in each batch is observed such that the concentration and composition of the solution are regulated. However, in the stirring in the tank, the undissolved aggregates (lumps) generated in the aggregation of the powders are easily generated. Otherwise in order to reduce the generation of the undissolved aggregates, the TAC may be added at the small amount each several times to the solvent. In this case, the TAC which is supplied later is fed into the solution in which the TAC is dissolved. Thus the penetration and swelling of the solvent into the TAC is more hardly proceeded in the solution than the solvent in which the TAC is not dissolved. Accordingly, in this case, the solubility of the TAC becomes lower in the progress of the dissolution. Therefore the TAC and the solvent are continuously supplied into a first vessel, and the mixing and stirring is made to swell for one or more minute. Thereafter the obtained mixture is fed into a second vessel and heated. Thus the TAC is entirely dissolved in the solvent, to make the obtained solution uniform. (see, Japanese Patent Laid-Open Publication No.2000-273239.

However, in the method described in the publication No.2000-273239, when the retention time in the first vessel is one minute or more, it is hard to prevent the generation of the undissolved aggregates. Further, when the undissolved aggregates are generated once, the undissolved aggregates as the aggregated materials are in a stable situation. In this case, even when the heating is made in the second vessel, the dissolution of the undissolved aggregates is hard. Further, in the batch operation, while the stirring is made in the tank, the mixture cannot be fed into the next process which is continuously driven. Therefore the buffer tank is necessary. However, the quantity in the buffer tank is in and decreased repeatedly, and therefore the solution remaining on an inner wall of the tank is dried to generate skinnings, gel-like materials and the like.

SUMMARY OF THE INVENTION

An object of the present invention is to provide a method of producing a cellulose acylate dispersion, in which a generation of undissolved aggregate is reduced, while the cellulose acylate dispersion is used for preparing a dope for forming a film for optical use in a solution casting method.

In the research of the inventor, the following became clear, according to two processes, (1) a process of mixing to continuously disperse particles (crashes or flakes) of cellulose triacetate and solvent after supply thereof into a disperser at a predetermined flow rate, and (2) a process of shearing a mixed and dispersed solution (or dispersion), and further progressively making the swelling so as to obtain from the dispersion a swelling solution in which the solvent is penetrated into the particles. These two processes are sequentially performed, and thus the generation of the undissolved aggregate is reduced, and the generation of the gel-like materials in the devices is prevented.

In order to achieve the object and the other object, a method of producing a cellulose acylate dispersion of the present invention includes steps of continuously supplying cellulose acylate and a solvent in a disperser, and feeding through the disperser in one minute of a retention time. Thus the cellulose acylate is dispersed in the solvent.

In an preferable embodiment of the present invention, an additive is contained in the solvent. The additive is at least one of a plasticizer, a UV-absorbing agent, a matting agent, an adjuster of optical properties, a release agent, a deterioration inhibitor, and retardation adjuster. Further, the retention time is more than 1 second.

In an preferable embodiment of the present invention, the disperser includes a shearing section for shearing the solvent or the solution, so as to disperse the cellulose acylate in the solvent or the solution a shearing speed in the shearing section is in the range of $1 \times 10^3$ (1/sec) to $2 \times 10^5$ (1/sec). Further, an oxygen density in the disperser is at most 10 vol. %. at least one of gas of nitrogen, helium, neon, argon, krypton, xenon and radon is injected therein.

At least 90 wt. % of the cellulose acylate is particles having diameter from 0.1 mm to 2.0 mm. Bulk density of the cellulose acylate is in the range of 0.2 g/cm$^3$ to 1.0 g/cm$^3$. A repose angle of the cellulose acylate is at most 60°.

Preferebly, the solvent is a mixture solvent composed of at least two sorts of solvent materials, and further, at least one of non-chlorine solvent materials is contained in the solvent.

Preferably, a shearing device is provided downstream from the disperser, the shearing device make the shearing of the dispersion at a shearing speed in the range of $1 \times 10^3$ (1/sec) to $2 \times 10^5$ (1/sec) to obtain a swelling solution in which the cellulose acylate is swollen. The dispersion is fed from the disperser to the shearing device in one minute. The shearing device is connected to the disperser in line.

In a preferable embodiment, a retention time of the dispersion or the swelling solution in the shearing device is at most 30 minutes. A cooling device for cooling the swelling solution is attached to the shearing device. The cooling device makes the cooling with a cooling medium so as to keep a temperature of the shearing device less than boiling point of the solvent.

The swelling solution is used for producing a dope. The heat-dissolving and the cool-dissolving of the swelling solution are made in this order so as to obtain the dope. A film is formed from the dope in a solution casting method.

According to the method of the present invention, the aggregation of the cellulose acylate particles does not occur. Therefore the generation of the undissolved aggregate caused by the aggregation is prevented, and the swelling solution of high quality is obtained from the dispersion.

BRIEF DESCRIPTION OF THE DRAWINGS

The above objects and advantages of the present invention will become easily understood by one of ordinary skill in the art when the following detailed description would be read in connection with the accompanying drawings.

FIG. 3 is an explanatory view illustrating a situation of casting a dope with use of an embodiment of a casting die;

FIG. 4 is an explanatory view illustrating a situation of casting the dope with use of an second embodiment of a casting die;

PREFERRED EMBODIMENTS OF THE INVENTION

Figure 1:
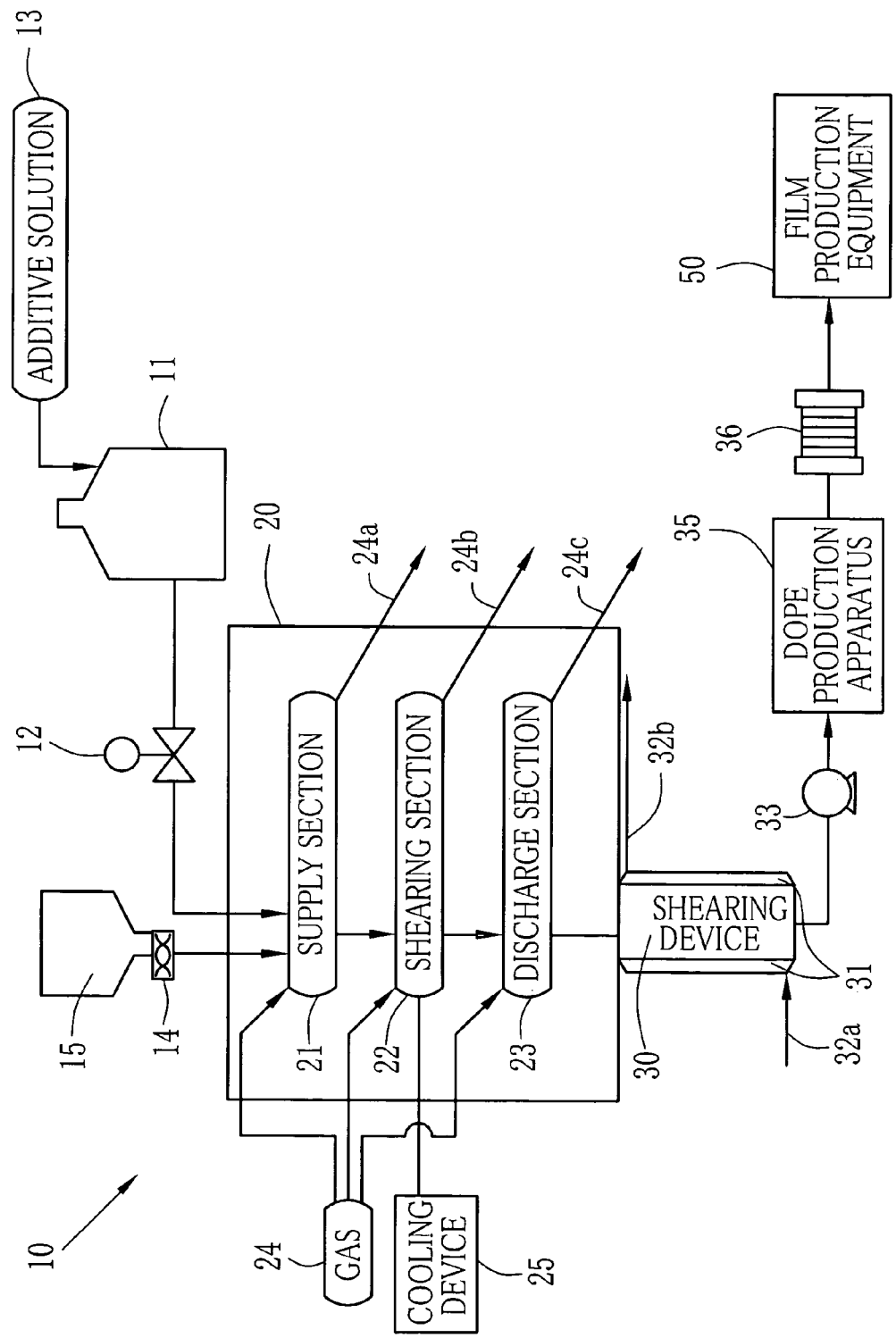
FIG. 1 is a schematic diagram of a production equipment of a dispersion, a swelling solution and a dope according to the present invention.

Cellulose acyolates used in the present invention are not restricted especially. However, the preferable polymer is cellulose acetate. Further, in cellulose atetate, cellulose triacetate (TAC) whose acetylation degree is 57.5% to 62.5% is the most preferable. The acetylation degree means the substitution degree for acetyl group in the cellulose acylate. The measurement and calculation of the acetylation degree is made with ASTM:D-817-91 (testing method of cellulose acetate and the like). In the present invention, the cellulose acylate particles may be used. At least 90 wt. % of the cellulose acylate particles has diameter from 0.1 mm to 2 mm. In this case, the affinity of molecules of the solvent is improved, and therefore the uniform dispersion is easily made. Accordingly, the generation of the undissolved aggregate is reduced. Further, it is preferable that the weight percentage of the cellulose acylate particles having diameter from 0.1 to 2 mm is preferably at least 95 wt. % of the total cellulose acylate particles, particularly at least 97 wt. %, especially at least 98 wt. %, and most especially at least 99 wt. %. Preferably, the cellulose acylate particle has a nearly ball-like shape. Note that there are cotton linter and wood pulp as raw materials of the cellulose triacetate, and the single one or mixture of the cotton linter and the wood pulp may be used in the present invention.

Cellulose acylate used in the present invention preferably has a bulk density of 0.2 g/cm$^3$ to 1.0 g/cm$^3$, and especially 0.3 g/cm$^3$ to 0.7 g/cm$^3$. In this case, the affinity of molecules of the solvent is improved, and therefore the uniform dispersion is easily made. Accordingly, the generation of the undissolved aggregate is reduced. When the bulk density is less than 0.2 g/cm$^3$, the shape of the cellulose acylate particles are too nonuniform, and therefore the uniform dispersion in a solvent becomes harder. Note that the solvent may be also a mixture solvent as a mixture of two or more sorts of solvent materials. In the mixture solvent, the dispersion of the particles becomes more easily. Further, as described below, additives may be previously added to the solvent. Further, when the bulk density is more than 1.0 g/cm$^3$, the cellulose acylate particles are too small and powder like, and therefore the dispersion in the solvent becomes harder. Note that when the cellulose acylate particles are filled in a vessel, the bulk density is determined as a divided value of mass of the cellulose acylate particles by a volume of the vessel.

Further, cellulose acylate used in the present invention preferably has a repose angle of at most 60°, and especially at most 45°. In this case, the affinity of molecules of the solvent is improved, and therefore the uniform dispersion is easily made. Accordingly, the generation of the undissolved aggregate is reduced. When the repose angle is too large, the cellulose acylate particles has larger force of aggregation, and therefore the flowability of the cellulose acylate particles becomes worse. In this case the occlusion of feed pipes sometimes occurs. Note that the repose angle of the present invention is a value measured in a manner of JIS R9301-2-2.

The solvents used in the present invention are not restricted especially, and are concretely nonchlorine type.

As the solvent of nonchlorine type, there are aliphatic hydrocarbons (for example hexane, n-heptane and the like), esters (for example, methyl acetate, methyl formate, ethyl acetate, amyl acetate, butyl acetate and the like), ketones (for example, acetone, methylethyl ketone, cyclohexanone and the like), ethers (for example, dioxane, dioxolane, tetrahydrofrane, diethylether, methyl-tert-butylether, and the like), and alcohols (for example, methanol, ethanol, n-butanol and the like). Note that a mixture of the organic solvents of chlorine and nonchlorine types may be used in the present invention. Note that in the present invention although the nonchlorine type mixture solvent to which the solubility of cellulose acylate is low is used, cellulose acylate easily disperses, and therefore the dope is easily obtained. Further, in view of the circumstance protection and cost for processing the solvent therefor, it is preferable to use the mixture solvent whose main solvent is nonchlorine type.

[Additives]

Further, the additives may be previously dissolved to the solvent used in the present invention for dispersion of the polymer. As the additives, there are plasticizers, UV absorbing agents, matting agents, adjusting agents of optical properties, release agents, deterioration inhibitors, and the like. Note that when the additives are added to the solvent (or a dispersing solvent), the additives are directly added to the dispersing solvent. Otherwise the additives may be added to other solvent to prepare an additive solution, and thereafter the additive solution may be added to the dispersing solution.

(Plasticizer)

As the plasticizers, for example, there are phosphoric acid esters (for example, triphenyl phosphate, tricresylphosphate, cresyldiphenyl phosphate, octyldiphenyl phosphate, biphenyldiphenyl phosphate, trioctyl phosphate, tributyl phosphate and the like), phthalic acid esters (for example, diethyl phthalate, dimethoxyethyl phthalate, dimethyl phthalate, dioctyl phthalate, and the like), glycolic acid esters (for example, triacetin, tributyrin, butylphthalylbutyl glycolate, ethylphthalylethyl glycolate (hereinafter called also ethylphthalylglycolethyl ester), methylphthalylethyl glycolate, butylphthalylbutylylglycolate and the like), and acetates (for example dipentaerythrithol hexaacetate, ditrimethylol propane tetraacetate, and the like), and the like. However, the plasticers are not restricted in them. Further, the plural sorts of the plasticisers may be used.

(UV Absorbing Agent)

As the ultraviolet absorbing agent, there are, for example, oxybenzophenone based compounds, benzotriazol based compound, salicylates based compounds, benzophenone based compounds, cyanoacrylate based compounds, nickel complex salt based compounds, and the like. However, the UV absorbing agents are not restricted in them, and plural sorts of the UV absorbing agents may be used.

(Matting Agent)

The matting agents are used for improving an adhering endurance property under high moisture and a slipping property of the film, and may be inorganic and organic compounds. As inorganic matting agents, there are, preferably, compounds containing silicon, silicon dioxide, titanium dioxide, zinc oxide, aluminumoxide, bariumoxide, zirconiumoxide, strontium oxide, antimony oxide, tin oxide, antimony tin oxide, calcium carbonate, talc, clay, calcinated caoline, calcinated calcium silicate, calcium silicate hydrate, aluminum silicate, magnesium oxide, calcium phosphate and the like. The particularly preferable matting agent is inorganic compounds containing silicone, and zirconium oxide. However, the especially preferable one is silicone dioxide, since it can decreases the turbidity.

As the organic matting agents, there are polymers, for example, silicone resins, fluoro carbon resins, acryl resins and the like. Particularly preferable is silicone resins, and especially preferable is silicone resins having three dimensional network structure.

(Release Agent)

The release agents have effects to make the peeling force smaller. As the release agent, surface-active agents are especially preferable. There are phosphoric acid type, sulfonic acid type, carboxylic acid type, nonionic type, cationic type and the like in the release agent. However the release agents are not restricted in them. These releasing agents are described in Japanese Patent Laid-Open Publication No. 61-243837. Further, Japanese Paten Laid-Open Publication No. 57-500833 teaches polyethoxylic phosphoric acid ester as release agent. In the Japanese Paten Laid-Open Publication No.61-69845, the peeling is smoothly made by adding to cellulose ester mono/diphosphoric acid alkylester in which non-esterified hydroxylic group has a free acid form. Further, in Japanese Patent Laid-Open Publication No.1-299847, a peeling force is decreased by adding inorganic particles and phosphoric acid ester compounds having non-esterified hydroxylic group and propyreneoxide chain.

(Deterioration Inhibitor)

As the deterioration inhibitors, for example, there are antioxidant, peroxide decomposer, radical inhibitor, metal deactivator, acid capture, amine and the like. Such deterioration inhibitors and the above UV-stabilizers are disclosed in Japanese Patent Laid-Open Publication No.60-235852, 3-199201, 5-1907073, 5-194789, 5-271471, 6-107854, 6-118233, 6-148430, 7-11056, 7-11055, 7-11056, 8-29619, 8-239509 and 2000-204173. The especially preferable deterioration inhibitor is butylized hydroxyl toluene (BHT).

(Controlling Agent of Optical Isomers: Retardation Adjuster)

In the present invention, retardation adjuster may be added as the adjusting agents of optical properties to the dope for controlling the optical anisotropy (supposed in Japanese Patent Application No.2003-319673). Aromatic compounds having at least two aromatic groups are preferably used as the retardation adjuster. In this case, the preferable structure of the retardation is that there are no steric hindrances between conformations of two aromatic rings.

The compounds having at least two aromatic rings have a plane having π-bond characteristics constructed of at least seven carbon atoms. When there are no steric hindrances between conformations of two aromatic rings, the tow aromatic rings are disposed in the same plane. According to study of the inventor, in order to increase the retardation of the cellulose ester film, it is important that the plural aromatic rings are disposed on the same plane. In this specification, the aromatic ring includes not only aromatic hydrocarbon ring but also aromatic hetero ring.

The aromatic hydrocarbon group is especially preferably 6-membered ring (benzene ring). The aromatic hetero ring is usually unsaturated hetero ring, and preferably 5-membered ring, 6-membered ring, or 7-membered ring, and especially preferably 5-membered ring, or 6-membered ring. Usually, double bonds in the heterocyclic group having character of aromatic hydrocarbon is formed at the largest number (or the maximal number). As hetero atoms used in the present invention, nitrogen atom, oxygen atom, and sulfer atom are preferable, and nitrogen atom is especially preferable. As the aromatic heterocyclic group, there are furan ring, thiophene ring, pyrrol ring, oxazol ring, isothiazol ring, thiazol ring, imidazol ring, pyrazol ring, furazan ring, triazol ring, pyran ring, pyridine ring, pyridazine ring, pyrimidine ring, pyradine ring, and 1,3,5-triadine ring and the like. As the preferable aromatic ring, there are benzene ring, furan ring, thiophene ring, pyrrol ring, oxazol ring, thiazol ring, imidazol ring, triazol ring, pyrimidine ring, pyradine ring, and 1,3,5-triadine ring.

The number of the aromatic rings in one aromatic compound is preferably 2-20, particularly 2-12, and especially 2-8. in view of the function of increasing the retardation, the combination of two aromatic rings is made in one of the following combination relations: (a) forming a condensation ring, (b) forming a single bond for perpendicularly combining two groups, (c) combining through a linkage group. (When Two aromatic groups are combined, a spiro linkage of them cannot be formed). Note that it is necessary that the steric hindrance of the conformation of two aromatic rings does not occur.

As the condensation cycle in (a), there are indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzoimidazole ring, benzotriazol ring, purine ring, indazole ring, chromene ring, quinoline ring, isoquinoline ring, quinolizine ring, quinazoline ring, cinnoline ring, quinoxaline ring, phthalazine ring, pteridine ring, carbazol ring, acridine ring, phenanthrizine ring, xanthene ring, phenazine ring, phenothiazine ring, phenoxathiin ring, phenoxazine ring, and thianthrene ring. Preferable are naphthalene ring, azulene ring, indole ring, benzoxazol ring, benzothiazol ring, benzoimidazol ring, benzotriazol ring and quinoline ring.

The single bond in (b) is preferably formed to combine respective carbon atoms of two aromatic rings. In order to combine two aromatic rings, two or more single bonds may be formed, such that aliphatic ring or nonaromatic heterocyclic ring may be formed between the two aromatic rings.

The linkage group in (c) is preferably combined with respective carbon atoms of two or more aromatic rings. The linkage groups are alkylene group, alkenylene group, alkynylene group, —CO—, —O—, —NH—, —S—, and combinations thereof. The examples of the combinations of linkage groups are shown as (c-1) to (c-15) in the following. Note that the positions of the right and left sides in each linkage group may be converse.

(c-1): —CO—O—
(c-2): —CO—NH—
(c-3): -alkylene-O—
(c-4): —NH—CO—NH—
(c-5): —NH—CO—O—
(c-6): —O—CO—O—
(c-7): —O-alkylene-O—
(c-8): —CO-alkenylene-
(c-9): —CO-alkenylene-NH—
(c-10): —CO-alkenylene-O—
(c-11): -alkylene-CO—O-alkylene-O—CO-alkylene-
(c-12): —O-alkylene-CO—O-alkylene-O—CO-alkylene-O—
(c-13): —O—CO-alkylene-CO—O—
(c-14): —NH—CO-alkenylene-
(c-15): —O—CO-alkenylene- The aromatic rings and linkage groups may have substituents. Note that it is necessary that the substituents don't make the steric hindrance of the conformation of two aromatic groups. The steric hindrance occurs depending on the sorts and positions of the substituents. For example, the substituents having large spaces (for example tertiary alkyl groups) often causes the steric hindrance. As the position of the substituents, the steric hindrance easily occurs when the substitution reaction is made at the position next to the aromatic group (o-position on the benzene ring). As the substituents, there are halogene atoms (F, Cl, Br, I), hydroxyl group, carboxyl group, cyano group, amino group, nitro group, sulfo group, carbamoyl group, sulfamoyl group, ureido group, alkyl group, alkenyl group, alkynyl group, aliphatic acyl group, aliphatic acyloxy group, alkoxy group, alkoxycarbonyl group, alkoxycarbonyl amino group, alkylthio group, alkyl sulfonyl group, aliphatic amide group, aliphatic sulfonamide group, aliphatic substiteted amino group, aliphatic substituted carbamoyl group, aliphatic substituted sulfamoyl group, aliphatic substituted ureido group, and nonaromatic linkage rings.

The number of carbon atoms in one alkyl group is preferably 1 to 8. Chain alkyl group, especially straight chain alkyl group is preferable to cyclic alkyl group. Further, the alkyl group may have substituent (for example, hydroxy group, carboxy group, alkoxy group, alkyl substituted amino group). As the alkyl goups including the substituted alkyl groups, there are methyl group, ethyl group, n-butyl group, n-hexyl group, 2-hydroxyethyl group, 4-carboxybutyl group, 2-methoxyethyl group, and 2-diethylaminoethyl group. The number of the carbon atoms in the alkenyl group is preferably 2 to 8. Chain alkenyl group, especially straight chain alkenyl group is preferable to cyclic alkenyl group. The alkenyl group may have substituent. As the alkenyl groups, there are vinyl group, allyl group, and 1-hexynyl group. The number of the carbon atoms in the alkynyl group is preferably 2 to 8. Chain alkynyl group, especially straight chain alkynyl group is preferable to cyclic alkynyl group. The alkynyl group may have substituent. As the alkynyl groups, there are ethynyl group, 1-butynyl group and 1-hexynyl group.

The number of the carbon atoms in the aliphatic acyl group is preferably 1 to 10. As the aliphatic acyl groups, there are acetyl group, propanoyl group and butanoyl group. The number of the carbon atoms in the aliphatic acyloxy group is preferably 1 to 10. As the aliphatic acyloxy groups, there is acetoxyl group. The number of the carbon atoms in the alcoxy group is preferably 1 to 8. The alcoxy group may contain substituents (for example alcoxy group). As the alcoxy groups containing the substituted alcoxy groups, there are methoxy group, ethoxy group, butoxy group, and methoxyethoxy group. The number of the carbon atoms in the alcoxycarbonyl group is preferably 2 to 10. As the alcoxycarbonyl groups, there are methoxycarbonyl group and ethoxycarbonyl group. The number of the carbon atoms in the alcoxycarbonyl amino group is preferably 2 to 10. As the alcoxycarbonyl amino groups, there are methoxycarbonyl amino group and ethoxycarbonyl amino group.

The number of the carbon atoms in the alkylthio group is preferably 1 to 12. As the alkylthio groups, there are methylthio group, ethylthio group and octylthio group. The number of the carbon atoms in the alkylsulfonyl group is preferably 1 to 8. As the alkylsulfonyl groups, there are methanesulfonyl group and ethanesulfonyl group. The number of the carbon atoms in the aliphatic amide group is preferably 1 to 10. As the aliphatic amide groups, there is acetamide group. The number of the carbon atoms in the aliphatic sulfonamide group is preferably 1 to 8. As the aliphatic sulfonamide groups, there are methanesulfonamide group, butansulfonamide group, and n-octanesulfonamide group. The number of the carbon atoms in the aliphatic substituted amino group is preferably 1 to 10. As the aliphatic substituted amino groups, there are dimethylamino group, diethylamino group, and 2-carboxyethylamino group. The number of the carbon atoms in the aliphatic substituted carbamoyl group is preferably 2 to 10. As the aliphatic substituted carbamoyl groups, there are methyl carbamoyl group and diethyl carbamoyl group. The number of the carbon atoms in the aliphatic substituted sulfamoyl group is preferably 1 to 8. As the aliphatic substituted sulfamoyl groups, there are methyl sulfamoyl group and diethyl sulfamoyl group. The number of the carbon atoms in the aliphatic substituted ureido group is preferably 2 to 10. As the aliphatic substituted ureido groups, there is methyl ureido group. As the nonaromatic heterocyclic ring groups, there are piperidino and morpholino.

The molecular weight of the retardation adjuster is preferably 300 to 800. The boiling point of the retardation adjuster is preferably at least 260° C. The boiling point is measured with a measuring device (for example TG/DTA100, produced by Seiko Instruments Inc.) which is sold in the market. In followings, the concrete examples of the retardation adjusters are shown, the aromaticity is shown by a circle in each examination.

[Chemical Formulae]

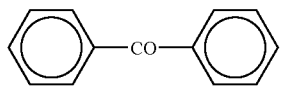

(1)

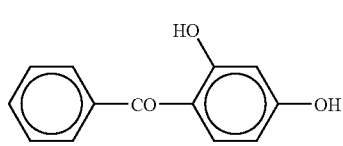

(2)

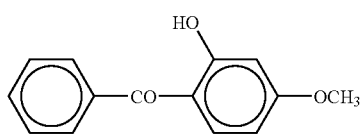 (3)
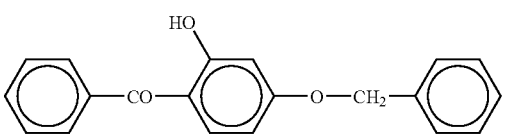 (4)
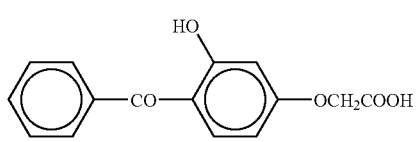 (5)
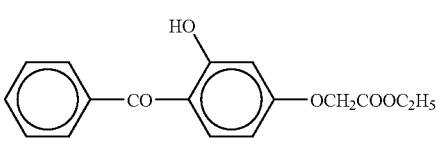 (6)
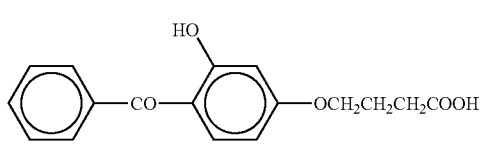 (7)
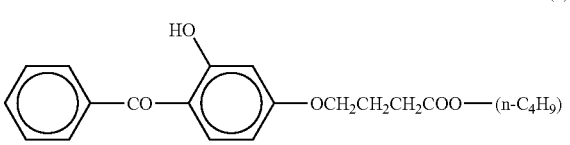 (8)
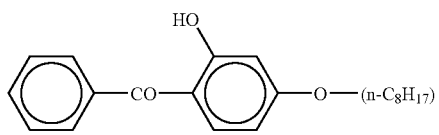 (9)
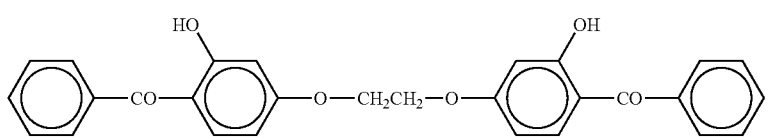 (10)
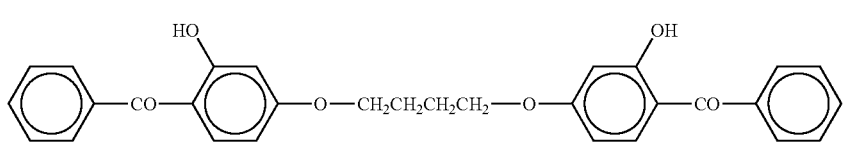 (11)
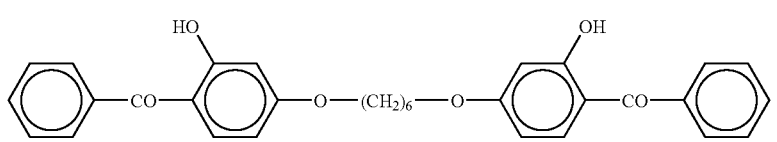 (12)
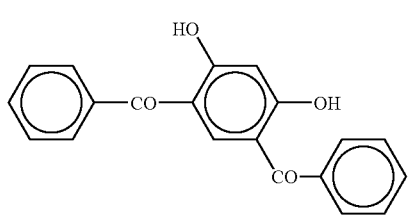 (13)
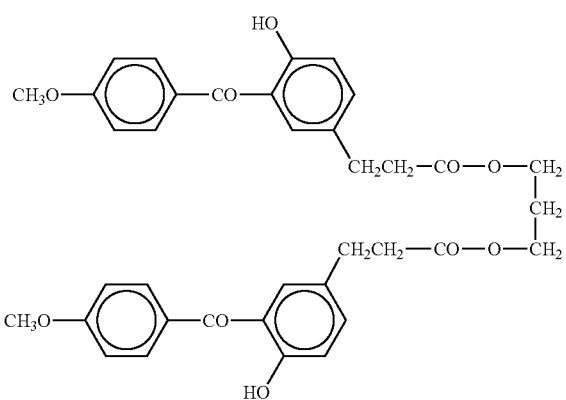 (14)

(15)
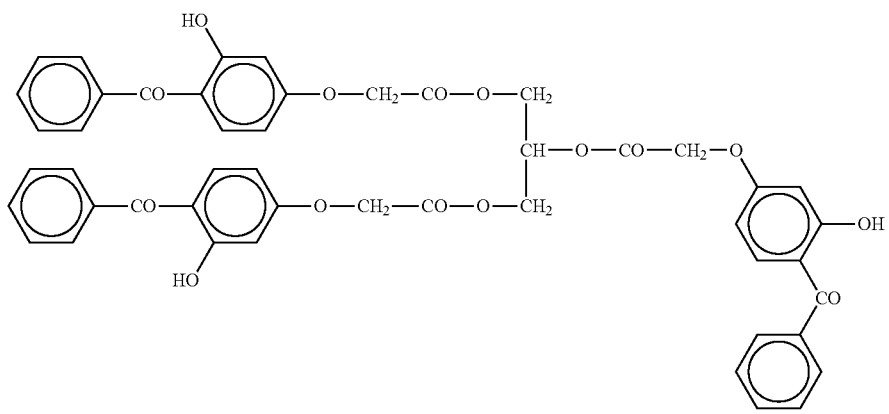
(16)
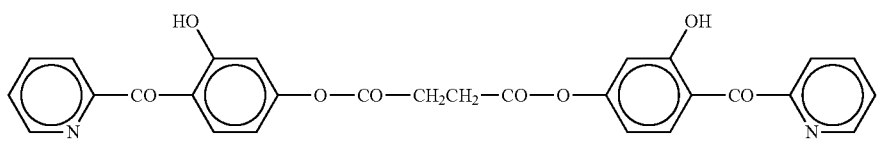
(17)
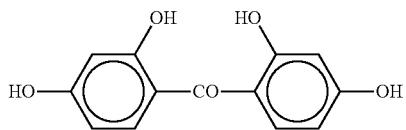
(18)
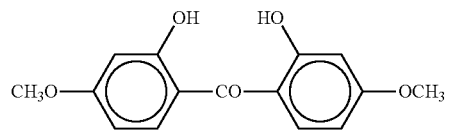
(19)
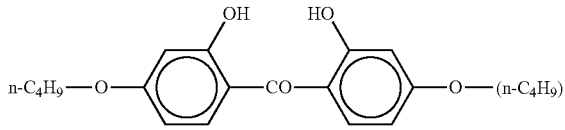
(20)
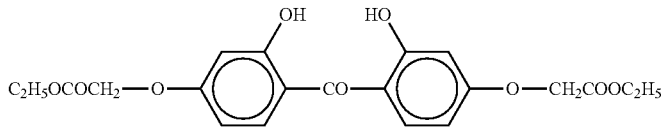
(21)
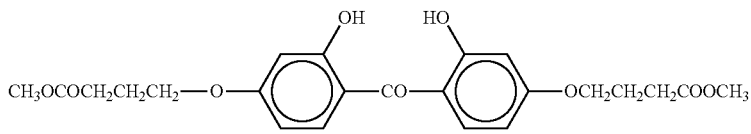
(22)
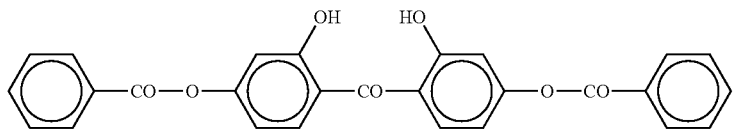
(23)
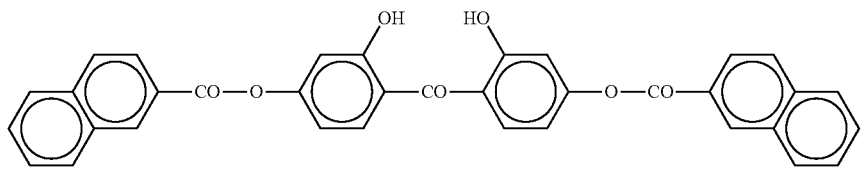
(24)
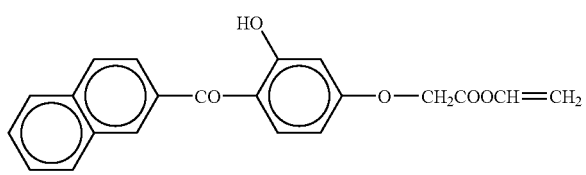

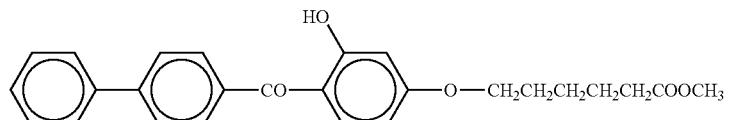
(25)
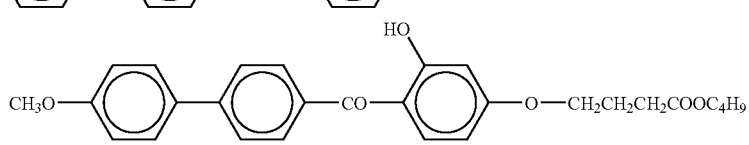
(26)
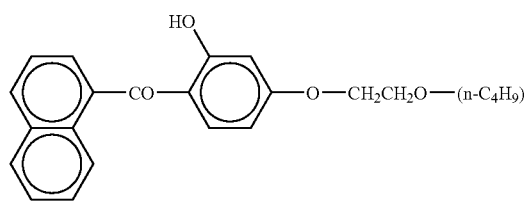
(27)
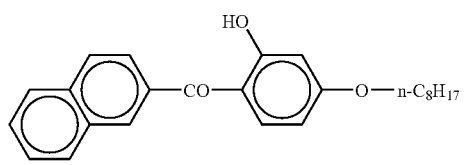
(28)
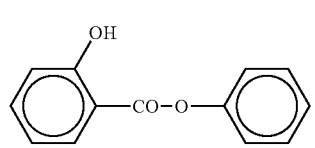
(29)
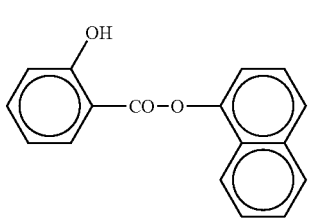
(30)
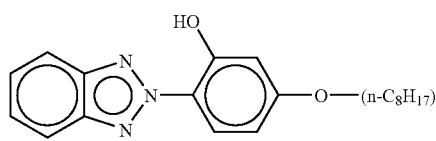
(31)
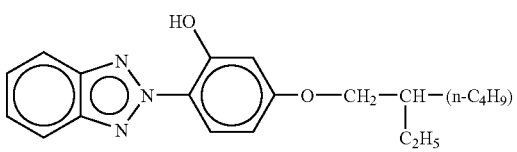
(32)
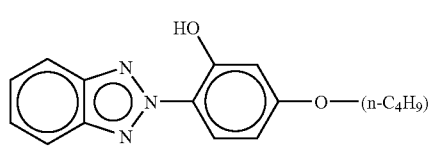
(33)
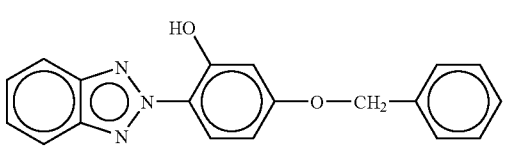
(34)
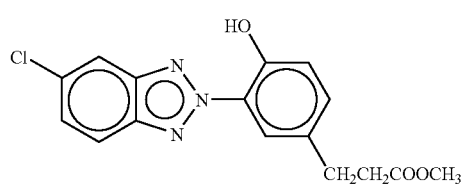
(35)
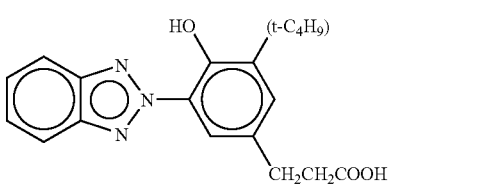
(36)
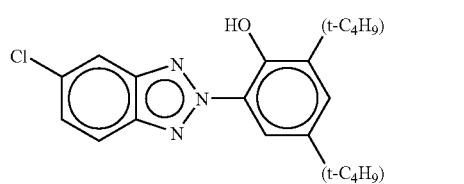
(37)
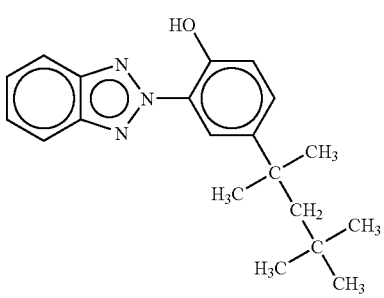
(38)
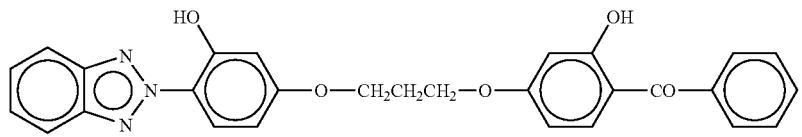
(39)

-continued
(40) 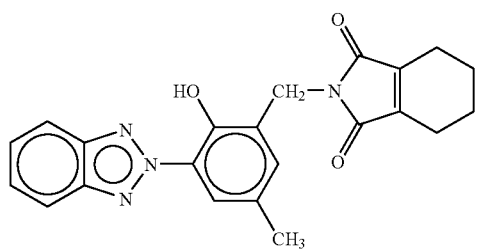
(41) 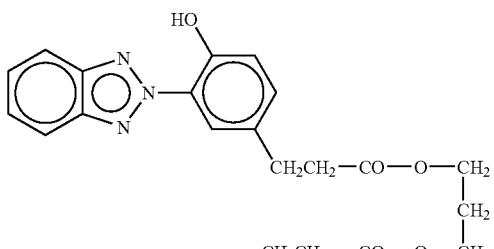
(42) 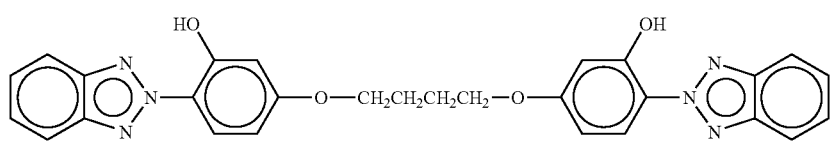
(43) 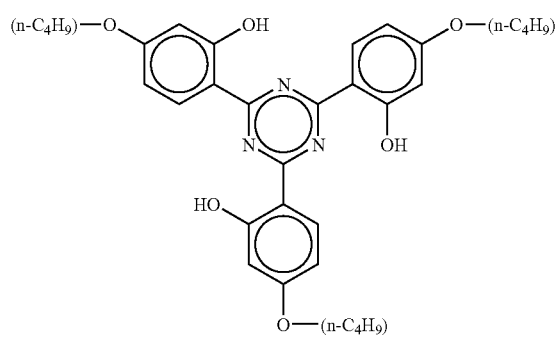
(44) 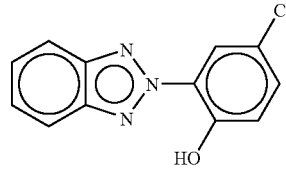
(45) 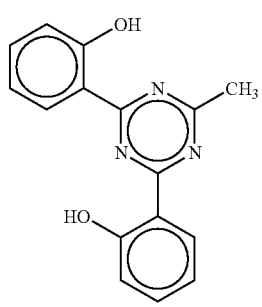
(46) 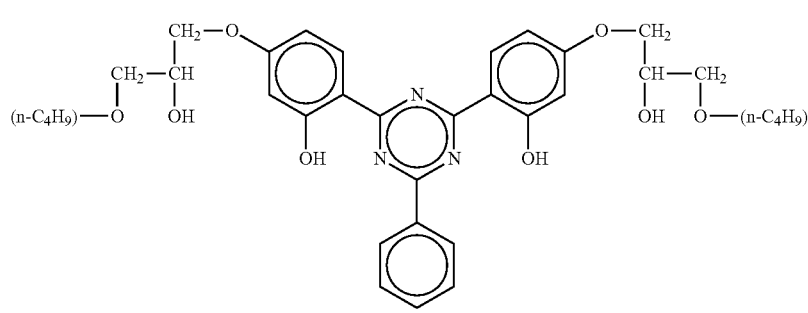

-continued
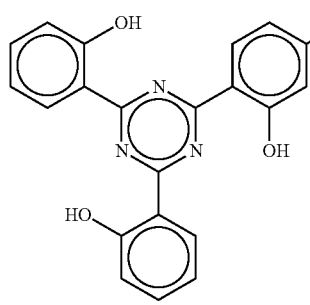(47)
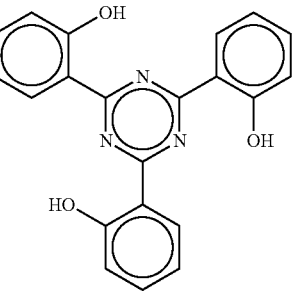
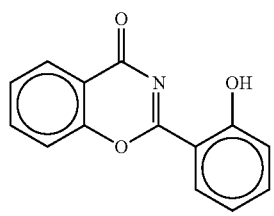(48)
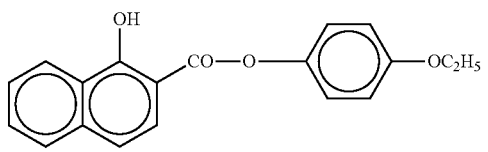(49)
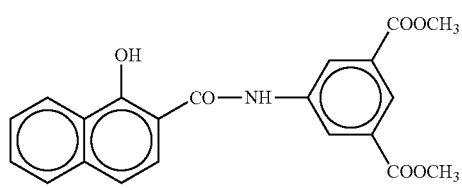(50)
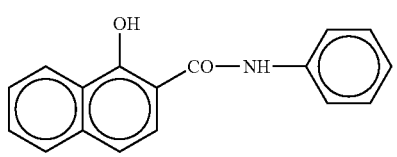(51)
(52)
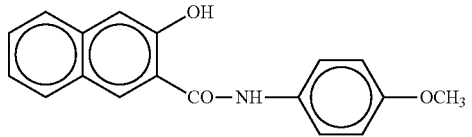(53)
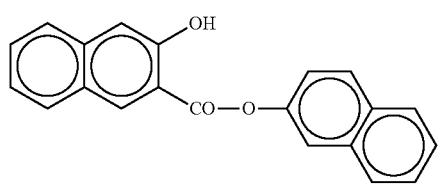(54)
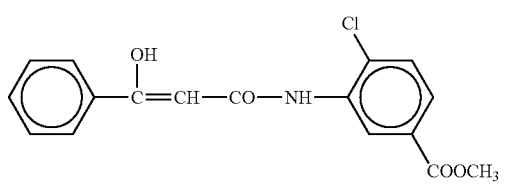(55)
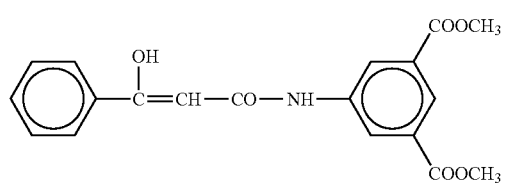(56)
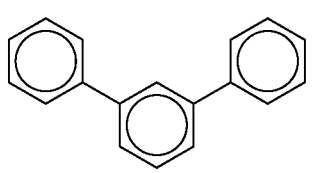(57)
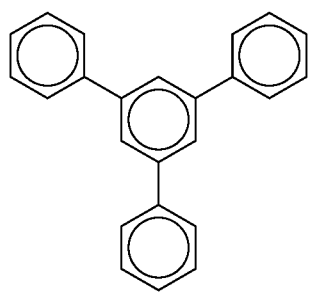(58)
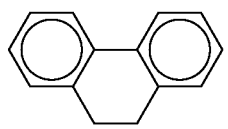(59)

-continued
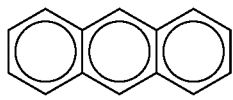
(60)
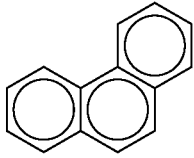
(61)
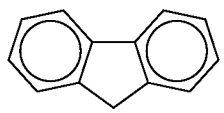
(62)
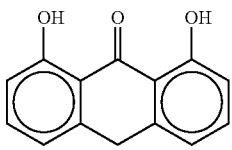
(63)
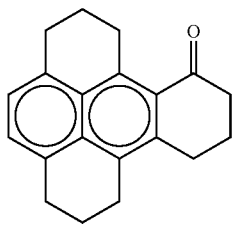
(64)
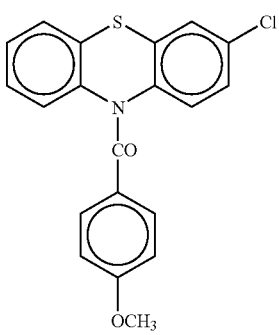
(65)
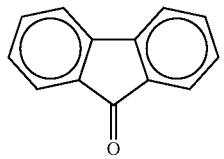
(66)
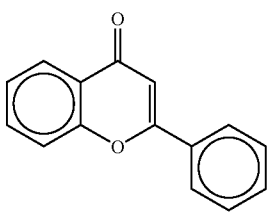
(67)
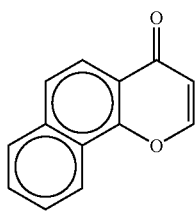
(68)
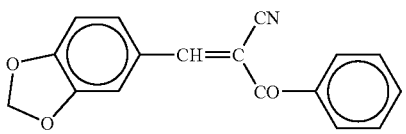
(69)
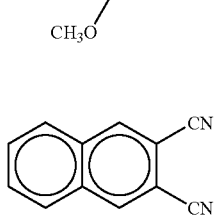
(70)
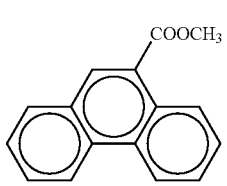
(71)
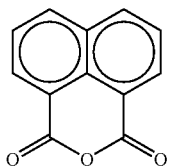
(72)
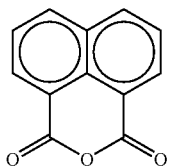
(73)

-continued
(74) 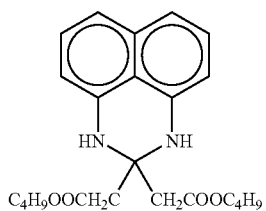
(75) 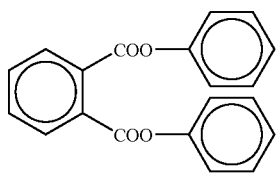
(76) 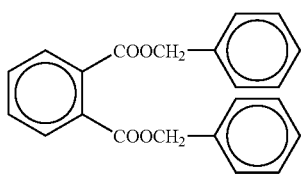
(77) 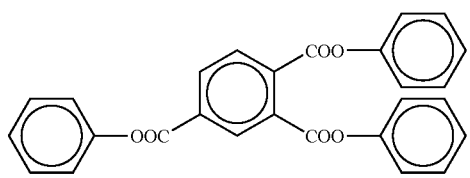
(78) 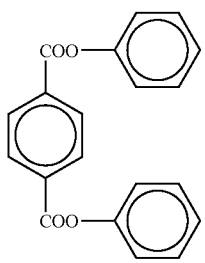
(79) 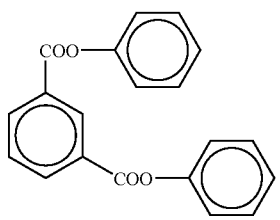
(80) 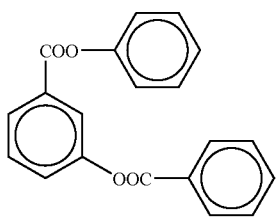
(81) 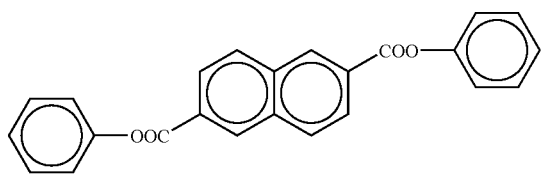
(82) 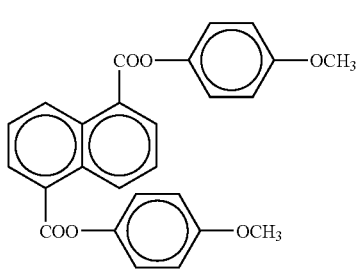
(83) 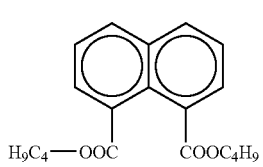
(84) 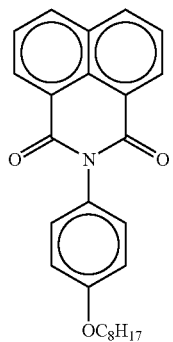
(85) 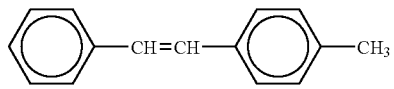

-continued
(86) 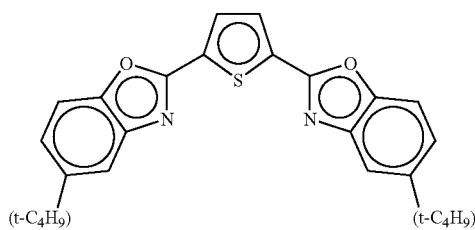
(87) 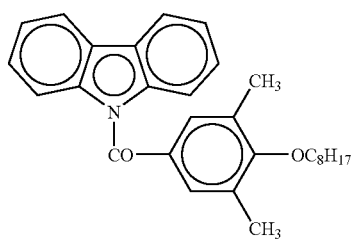
(88) 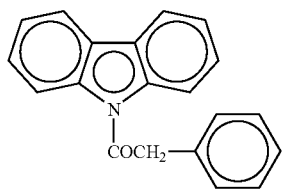
(89) 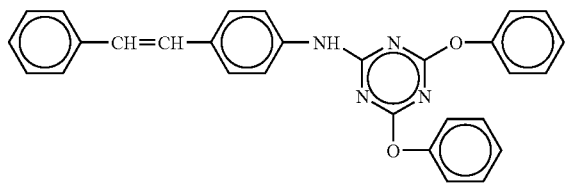
(90) 
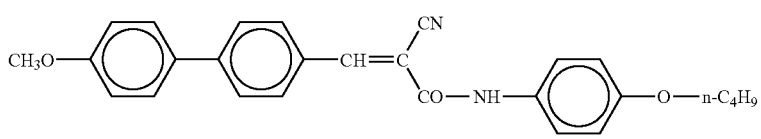
(91) 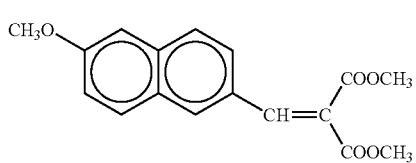
(92) 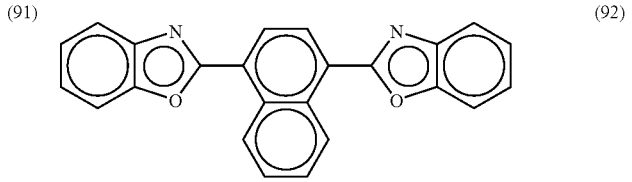
(93) 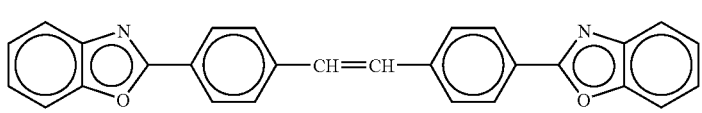
(94) 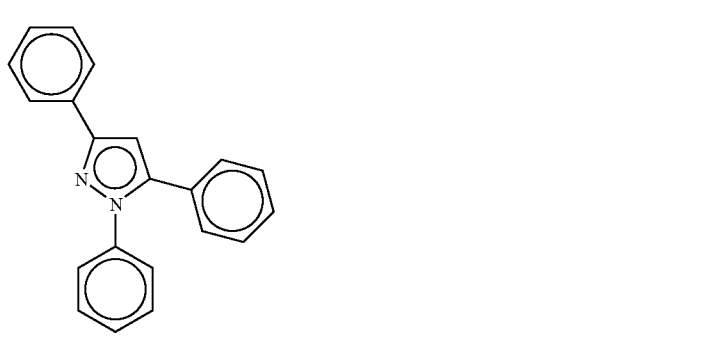

-continued (95)

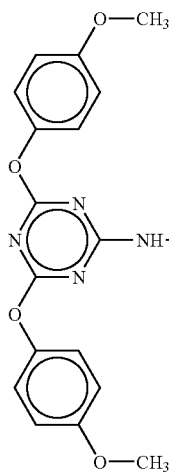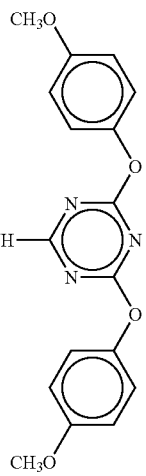

There are compounds having nearly rod-like structure. There are further rod-like compounds having at least two aromatic rings as the retardation adjusters. The rod like compound preferably has a linear molecule structure, in which the molecule structure of the rod-like compound is linear and thermodynamically the most stable. The thermodynamically most stable structure is obtained in the crystal structure analysis or the molecular orbital calculation. For example, Win-MOPAC2000 (trade name, produced by Fujitsu Co., Ltd.) is used as a soft ware for the molecular orbital calculation. Thus the molecular orbital calculation is made, and the molecule structure is obtained such as the heat of formation may be the smallest. The linear molecule structure means that the angle of the molecule structure is at least 140° while the molecule has thermodynamically the most stable structure.

The rod-like compound having at least two aromatic rings are preferable to have the following molecular structure (I).

$$Ar^1\text{-}L^1\text{-}Ar^2 \qquad (I):$$

In this formula (I), each of $Ar^1$ and $Ar^2$ is the aromatic group. In this specification, the aromatic group includes aryl group (aromatic hydrocarbon group), substituted aryl group, aromatic heterocyclic group and substituted aromatic hetercyclic group. Aryl group and substituted aryl group are preferable to the aromatic hetercyclic group and substituted aromatic hetercyclic group. The hetero ring in aromatic hetercyclic group is usually unsaturated.

The aromatic hetero ring is usually unsaturated hetero ring, and preferably 5-membered ring, 6-membered ring, or 7-membered ring, and especially preferably 5-membered ring, or 6-membered ring. Usually, double bonds in the heterocyclic group having character of aromatic hydrocarbon are formed at the largest number (or the maximal number). As hetero atoms used in the present invention, nitrogen atom, oxygen atom, and sulfer atom are preferable, and nitrogen atom and sulfer atom are especially preferable. As the heterocyclic group having character of aromatic hydrocarbon, there are furan ring, thiophene ring, pyrrol ring, oxazol ring, isooxazol ring, thiazol ring, isothiazol ring, imidazol ring, pyrazol ring, furazan ring, triazol ring, pyran ring, pyridine ring, pyridazine ring, pyrimidine ring, pyradine ring, and 1,3,5- triadine ring and the like. As the aromatic ring of the aromatic group, benzene ring, furan ring, thiophene ring, pyrrol ring, oxazol ring, thiazol ring, imidazol ring, triazol ring, pyridine ring, pyrimidine ring and pyradine ring are preferable, and the benzene ring is especially preferable.

As the substituents of the substituted aryl groups and substituted aromatic heterocyclic groups, there are halogene atoms (F, Cl, Br, I), hydroxyl group, carboxyl group, cyano group, amino group, alkylamino group (for example methylamino group, ethyl amino group, butyl amino group, dimethyl amino group), nitro group, sulfo group, carbamoyl group, alkyl carbamoyl group (for example, N-methyl carbamoyl group, N-ethyl carbamoyl group, N,N'-dimethyl carbamoyl group), sulfamoyl group, alkyl sulfamoyl group (for example, N-methyl sulfamoyl group, N-ethyl sulfamoyl group, N,N'-dimethyl sulfamoyl group) ureido group, alkyl ureido group, (For example, N-methyl ureido group, N,N-dimethyl ureido group, N,N,N'-trimethyl ureido group), alkyl group (for example, methyl group, ethyl group, propyl group, butyl group, pentyl group, heptyl group, octyl group, isopropyl group, s-butyl group, t-amyl group, cyclohexyl group, cyclopentyl group), alkenyl group (for example, vinyl group, allyl group, hexenyl group), alkynyl group (for example, ethynyl group, bytynyl group), acyl group (for example, formyl group, acetyl group, butyryl group, hexanoyl goup, lauryl group), acyloxy group(for example, acetoxy group, butyryloxy group, hexanoyloxy group, lauryloxy group), alkoxy group (for example, methoxy group, ethoxy group, propoxy group, butoxy group, pentyloxy group, heptyloxy group, octyloxy group), aryloxy group (for example, phenoxy group), alcoxycarbonyl group (for example methoxycarbonyl group, ethoxycarbonyl group, propoxycarbonyl group, butoxy carbonyl group, pentylthioxycarbonyl group, heptyloxycarbonyl group), aryloxy carbonyl group (for example, phenoxy carbonyl group), alcoxycarbonylamino group (for example, butoxy carbonyl amino group, hexyloxy carbonyl amino group), alkylthio group (for example, methylthio group, ethylthio group, propylthio group, butylthio group, pentylthio group, heptylthio group, octylthio group) arylthio group (for example phenyl thio group), alkylsulfonyl group (for example methylsulfonyl group, ethylsulfonly group, propylsulfonyl group, butylsulfonyl group, pentylsulfonyl group, heptylsulfonyl group, octylsulfonyl group), amido group (for example, acetoamido group, butylamido group, hexylamido group, laurylamido group) and nonaromatic linkage ring (for example morpholyl group, pyrazinyl group).

The preferable substituents of the aryl groups and substituted aromatic heterocyclic groups are halogene atoms, cyano group, carboxyl group, amino group, alkyl substituted amino group, acyl group, acyloxy group, amide group, alkoxycarbonyl group, alcoxy group, alkylthio group and alkyl group. The alkyl groups in the alkyl amino group, the alkoxycarbonyl group, alkoxy group and alkylthio group may have substitutions, which are for example, halogene atoms, hydroxyl group, carboxyl group, cyano group, amino group, alkylamino group, nitro group, sulfo group, carbamoyl group, alkylcarbamoyl group, sulfamoyl group, alkylsulfamoyl group, ureido group, alkyl ureido group, alkenyl group, alkynyl group, acyl group, acyloxy group, alkoxy group, aryl group, alkoxycarbonyl group, aryloxycarbonyl amino group, alkoxycarbonyl amino group, alkylthio group, arylthio group, alkylsulfonyl group, amido group, and nonaromatic linkage rings. The preferable substitutions of the alkyl group are halogene atoms, hydroxyl group, amino group, alkylamino group, acyl group, acyloxy group, acylamino group, alkoxycarbonyl group and alkoxy group.

In the formula (I), $L^1$ is a divalent linking group constructed of alkylene group, alkenylene group, alkynylene group, —O—, —CO—, and the combination thereof. Preferably the alkylene group has a cyclic structure. The cyclic alkylene group is preferably cyclohexylen, especially 1,4-cyclohexylene. As the chain alkyl group, the straight-chain alkyl group is preferable to the branched alkyl group. The number of carbon atoms in one alkylene group is preferably 1 to 20, particularly 1 to 15, especially 1 to 10, more especially 1 to 8, and most especially 1 to 6.

The alkenylene group and the alkynylene group preferably have a cyclic structure, and particularly have the straight-chain structure more than the branched chain structure. The number of carbon atoms in one alkenylene or alkynylene group is preferably 2 to 10, particularly 2 to 8, especially 2 to 6, more especially 2 to 4, and most especially 2 (vinylene, or ethynylene). The number of carbon atoms in one arylene group is preferably 6 to 20, particularly 6 to 16, and especially 6 to 12.

The divalent linking group is shown in the following:
(L-1): —O—CO-alkylene-CO—O—
(L-2): —CO—O-alkylene-O—CO—
(L-3): —O—CO-alkenylene-CO—O—
(L-4): —CO—O-alkenylene-O—CO—
(L-5): —O—CO-alkynylene-CO—O—
(L-6): —CO—O-alkynylene-O—CO—
(L-7): —O—CO-arylene-CO—O—
(L-8): —CO—O-arylene-O—CO—

In the formula (I), the angle between $Ar^1$ and $Ar^2$ sandwiching $L^1$ is preferably at least 140°. The especially preferable rod-like compounds satisfy the following formula.

$Ar^1$-$L^2$-X-$L^3$-Ar2    (II):

In this formula (II), each of $Ar^1$ and $Ar^2$ is the aromatic group, whose definition is the same as the $Ar^1$ and $Ar^2$ in the formula (I).

In the formula (II), each $L^2$ and $L^3$ is a divalent linking group constructed of alkylene group, alkenylene group, alkynylene group, —O—, —CO—, and the combination thereof. The alkylene group preferably has a chain structure to a cyclic structure, and particularly preferably the straight-chain structure to the branched chain structure. The number of carbon atoms in one alkylene group is preferably 1 to 10, particularly 1 to 8, especially 1 to 6, more especially 1 to 4, and most especially 1 or 2 (methylene or ethylene). $L^2$ and $L^3$ are especially preferably —O—CO— or —CO—O—.

In the formula (II), X is 1,4-cyclohexylene, vinylene or ethynylene. In the followings, the compounds of the formula (I) are shown concretely.

[Chemical Formulae]

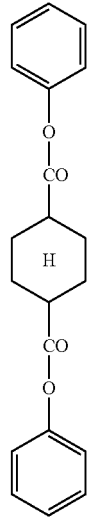

(1)

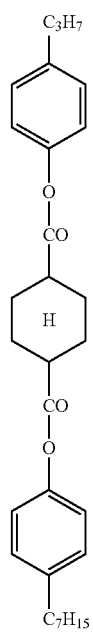

(2)

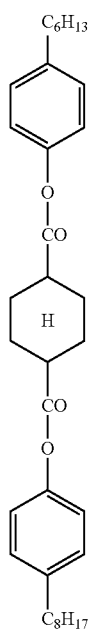
(3)
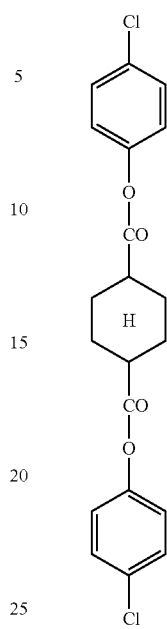
(5)
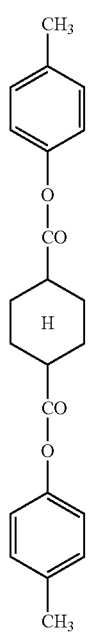
(4)
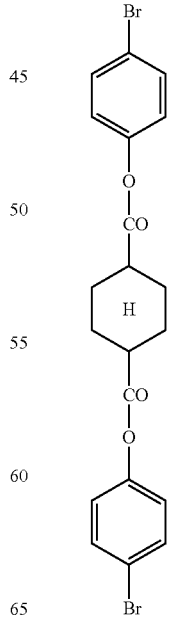
(6)

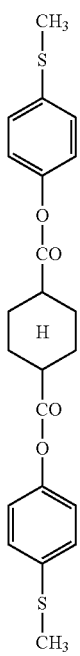
(7)
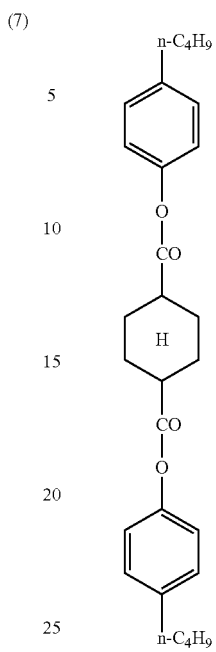
(9)
(8)
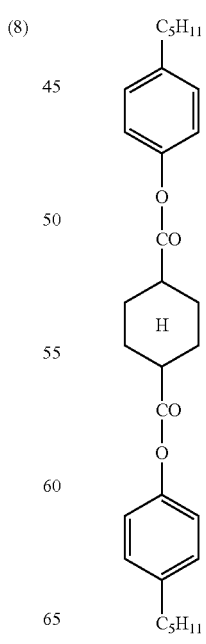
(10)

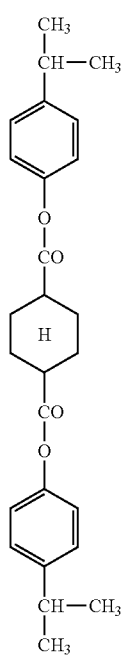
(11)
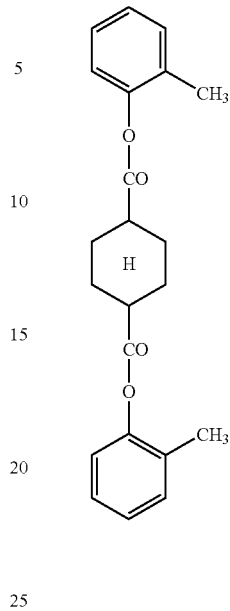
(13)
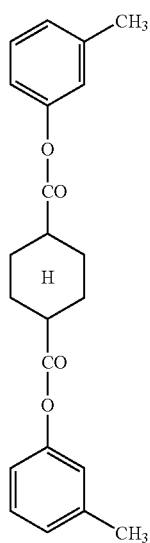
(12)
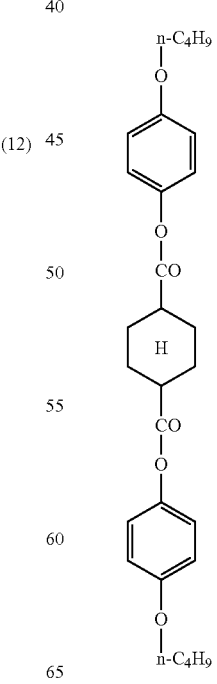
(14)

(15)
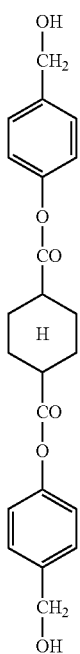
(16)
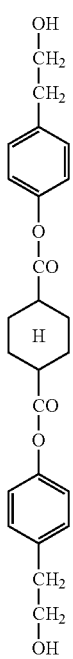
(17)
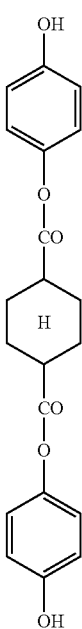
(18)

(19)
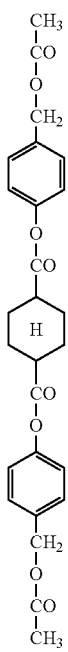
(20)
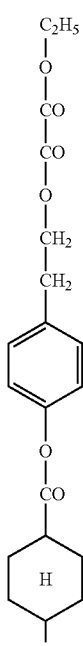
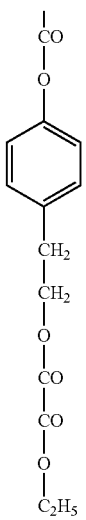
(21)
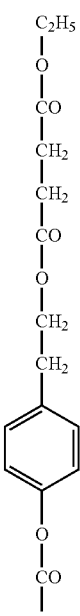

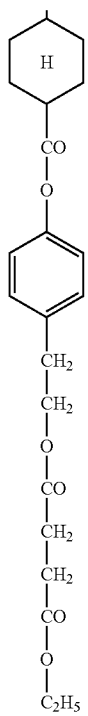
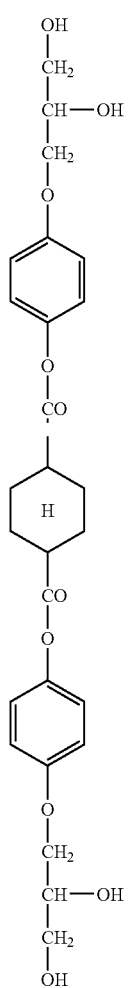
(22)
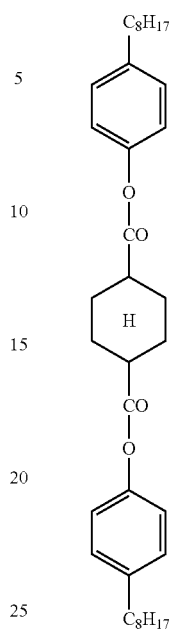
(23)
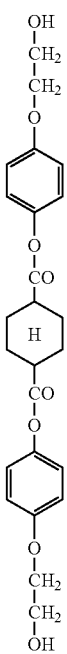
(24)

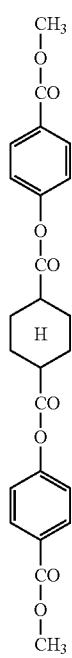 (25)
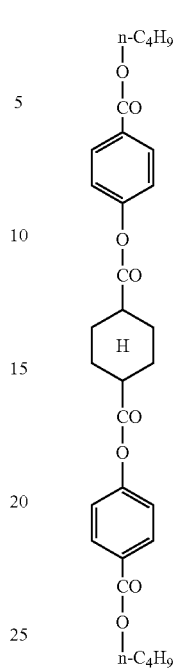 (27)
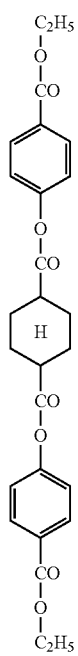 (26)
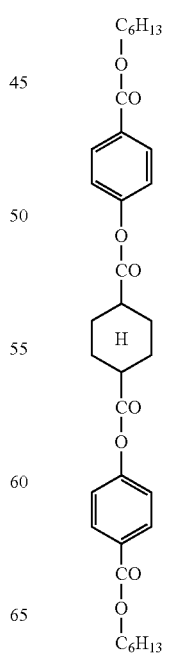 (28)

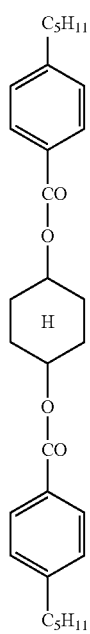
(29)
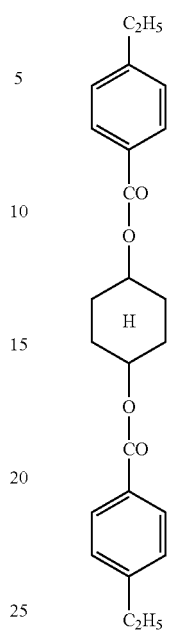
(31)
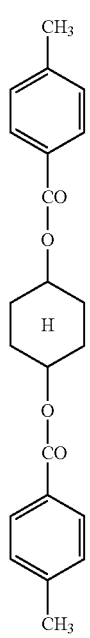
(30)
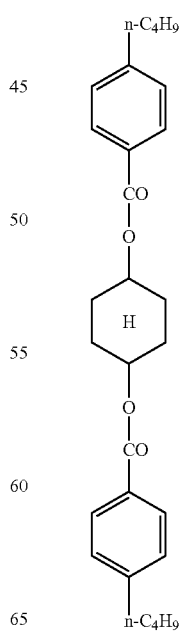
(32)

(33)
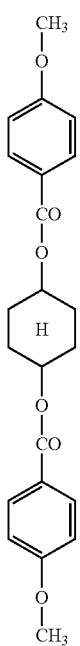
(34)
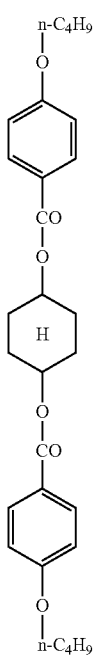
(35)
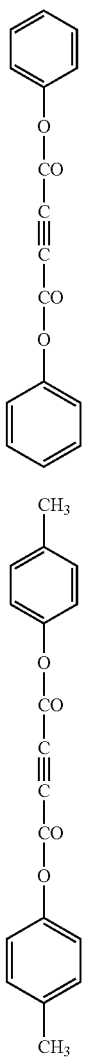
(36)
(37)
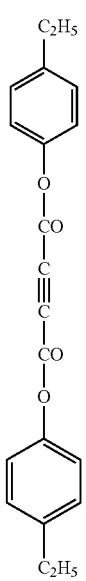

(38)
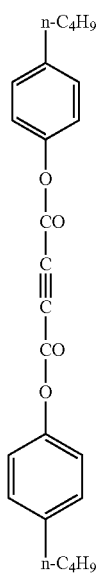
(40)
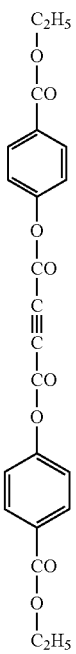
(39)
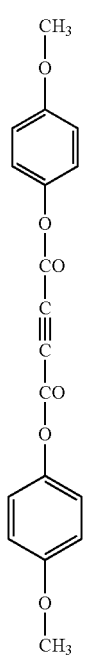
(41)

(42)

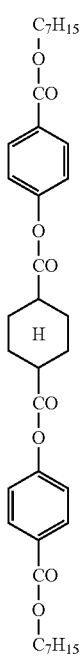

(44)

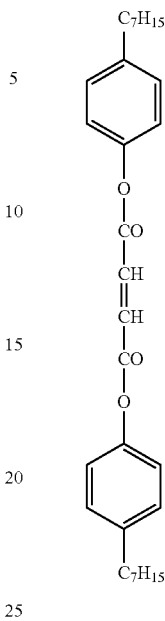

(43)

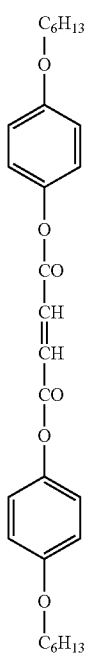

(45)

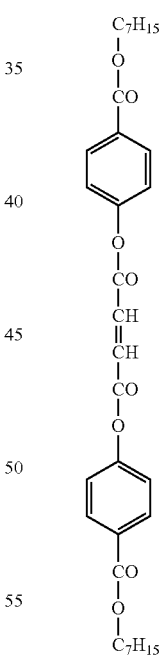

Each compound of formulae (1)-(34),(41),(42) has two asymmetric carbon atoms at $1^{st}$ and $4^{th}$ position of cyclohexane ring. But the compounds of formulae (1), (4)-(34), (41), (42) have no optical isomers (optical activity) as having symmetrical molecular structure of meso type, but only geometric isomers (in trans and cis configurations). The trans and cis optical isomers of the compounds of the formula (1) are shown in followings.

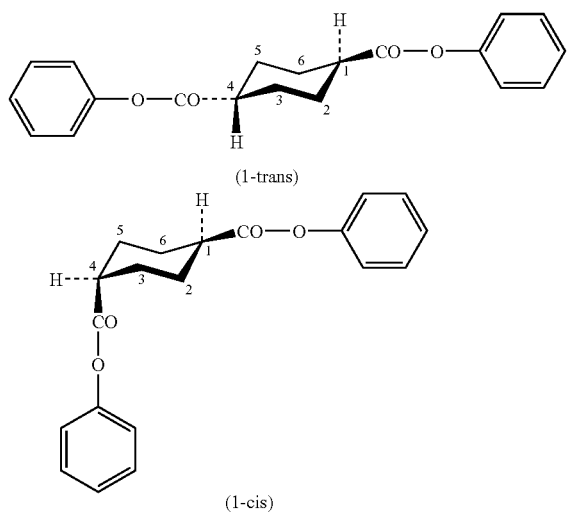

(1-trans)

(1-cis)

As described above, the rod-like compounds preferably have the linear molecular structures. Accordingly, the trans configuration is preferable to the cis configuration. In the compounds of formulae (2),(3), there are not only the geometrical isomers but also optical isomers. In the geometric isomers of these compounds, the trans configuration is preferable to the cis configuration. The optical isomers have no differences in effects, and may be any of D-isomer, L-isomer or racemic body. In the compounds of the formulae (43)-(45), there are trans nad cis configurations to a vinylene bond in the center. In the same reason described above, the trans configuration is preferable to the cis configuration.

At least two of the rod-like compounds may be used, whose maximal absorbance wavelength (λmax) in the UV absorption spectra is shorter than 250 nm. The rod-like compounds can be produced in the synthesizing methods described in publications: such as "Mol. Cryst. Liq. Cryst. Vol.53, Page 229 (1979); Vol.89, Page 93 (1982); Vol.145, Page 111 (1987); Vol.170, Page 43 (1989)", "J. Am. Chem. Soc., Vol.113, Page 1349 (1991); Vol.118, Page 5346 (1996); Vol.92, Page 1582 (1970)", "J. Org. Chem. Vol.40, Page 420 (1975)", "Tetrahedron, Vol.48, No.16, Page 3437 (1992)) and the like. The amount of the retardation adjuster to be added is preferably in the range of 0.1% to 30% in mass, and especially 0.5% to 20% in mass.

As the retardation adjusters, there are compounds having triphenylene ring, which are represented in the following general formula (I). $R^1$

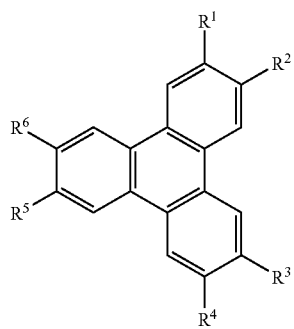

(I)

In this formula, $R^1$, $R^2$, $R^3$, $R^4$, $R^5$, $R^6$ are independently hydrogen atom, halogen atom, nitro group, sulfo group, aliphatic group, aromatic group, heterocyclic group, O—$R^{11}$, —S—$R^{12}$, —CO—$R^{13}$, —O—CO—$R^{14}$, —CO—O—$R^{15}$, —O—CO—O—$R^{16}$, —N$R^{17}R^{18}$, —CO—N$R^{19}R^{20}$, —N$R^{21}$CO—$R^{22}$, —O—CO—N$R^{23}R^{24}$, —Si$R^{25}R^{26}R^{27}$, —O—Si$R^{28}R^{29}R^{30}$, —S—CO—$R^{31}$, —O—SO$_2$—$R^{32}$, —SO—$R^{33}$, —N$R^{34}$—CO—O—$R^{35}$, —SO$_2$—$R^{36}$ or —N$R^{37}$—CO—N$R^{38}R^{39}$.

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{26}$, $R^{27}$, $R^{38}$ and $R^{39}$ are independently hydrogen atom, aliphatic group, aromatic group and heterocyclic group.;

Further, $R^1$ and $R^2$, $R^3$ and $R^4$, or $R^5$ and $R^6$ may be bound to form a ring.

$R^1$, $R^2$, $R^3$, $R^4$, $R^5$ and $R^6$ are preferably —O—$R^{11}$, —S—$R^{12}$, —O—CO—$R^{14}$, —O—CO—O—$R^{16}$, —N$R^{17}R^{18}$, —N$R^{21}$—CO—$R^{22}$ or —O—CO—N$R^{23}R^{24}$, and particularly —O—$R^{11}$, —S—$R^{12}$, —O—CO—$R^{14}$, —O—CO—O—$R^{16}$ or —O—CO—N$R^{23}R^{24}$, and especially —O—$R^{11}$ or —O—CO—$R^{14}$, and most especially —O—CO—$R^{14}$.

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{34}$, $R^{35}$, $R^{36}$, $R^{37}$, $R^{38}$ and $R^{39}$ are preferably hydrogen atom, aliphatic group, or aromatic group. $R^{14}$ in —O—CO—$R^{14}$ is especially preferably aromatic group. In the formula (I), $R^1$, $R^2$, $R^3$, $R^4$, $R^5$ and $R^6$ are preferably the same.

In this specification, the aliphatic group is alkyl group, alkenyl group, alkynyl group, substituted alkyl group, substituted alkenyl group and substituted alkynyl group. The alkyl group may be cycle (cycloalkyl group). Further, the alkyl group may have branches. The number of carbon atoms in one alkyl group is preferably 1 to 30, particularly 1 to 20, and especially 1 to 10. As the alkyl group, there are for example, methyl, ethyl i-propyl, butyl, i-butyl, s-bytyl, t-butyl, t-pentyl, hexyl, octyl, t-octyl, dodesyl and tetracosyl groups. The alkenyl group may be cycle (cycloalkenyl group). Further, the alkenyl group may have branches, and may have at least two double bonds. The number of carbon atoms in one alkenyl group is preferably 2 to 30, particularly 2 to 20, and especially 2 to 10. As the alkenyl group, there are for example, vinyl, allyl and 3-heptenyl groups. The alkynyl group may be cycle (cycloalkynyl group). Further, the alkynyl group may have branches, and may have at least two triple bonds. The number of carbon atoms in one alkynyl group is preferably 2 to 30, particularly 2 to 20, and especially 2 to 10. As the alkynyl group, there are, for example, ethynyl, 2-propynyl, 1-pentynyl and 2,4-octadinyl.

As the substituted alkyl group, substituted alkenyl group and substituted alkynyl group, there are halogen atom, nitro group, sulfo group, aromatic group, heterocyclic group, O—$R^{41}$, —S—$R^{42}$, —CO—$R^{43}$, —O—CO—$R^{44}$, —CO—O—$R^{45}$, —O—CO—O—$R^{46}$, —N$R^{47}R^{48}$, —CO—N$R^{49}R^{50}$, —N$R^{51}$—CO—$R^{52}$, —O—CO—N$R^{53}R^{54}$, —Si$R^{55}R^{56}R^{57}R^{58}$, —O—Si$R^{59}R^{60}R^{61}R^{62}$.

$R^{41}$, $R^{42}$, $R^{43}$, $R^{44}$, $R^{45}$, $R^{46}$, $R^{47}$, $R^{48}$, $R^{49}$, $R^{50}$, $R^{51}$, $R^{52}$, $R^{53}$, $R^{54}$, $R^{55}$, $R^{56}$, $R^{57}$, $R^{58}$, $R^{59}$, $R^{60}$, $R^{61}$ and $R^{62}$ are independently hydrogen atom, aliphatic group, aromatic group, or heterocyclic group. The alkyl part of the substituted alkyl group is the same as the above alkyl group.

As the substituted alkyl group, there are benzyl, phenetyl, 2-methoxyethyl, ethoxymethyl, 2-(2-methoxyethoxy)ethyl, 2-hydroxyethyl, hydroxymethyl, 2-carboxyethyl, carboxymethyl, ethoxycarbonylmethyl, 4-acryloiloxybutyl, trochloromethyl and perfuluoropentyl groups. The alkenyl part of the substituted alkenyl group is the same as the above alkenyl group. As the substituted alkenyl group, there are styryl, 4-methoxystyryl group. The alkynyl part of the substituted alkynyl group is the same as the above alkynyl group. As the substituted alkynyl group, there are 4-butoxyphenylethynyl, 4-propylphenylethynyl and trimethylsilylethynyl.

In this specification, the aromatic group is aryl group and substituted aryl group. The number of carbon atoms in one aryl group is preferably 6 to 30, particularly 6 to 20, and especially 6 to 10. As the aryl group, there are for example, phenyl, 1-naphtyl and 2-naphtyl. As the substituted aryl group, there are halogen atom, nitro group, sulfo group, aliphatic group, aromatic group, heterocyclic group, O—$R^{71}$, —S-$R^{72}$, —CO—$R^{73}$, —O—CO—$R^{74}$, —CO—O—$R^{75}$, —O—CO—O—$R^{76}$, —$NR^{77}R^{78}$, —CO—$NR^{79}R^{80}$, —$NR^{81}$—CO—$R^{82}$, —O—CO—$NR^{83}R^{84}$, —$SiR^{85}R^{86}R^{87}R^{88}$ and —O—$SiR^{89}R^{90}R^{91}R^{92}$. $R^{71}$, $R^{72}$, $R^{73}$, $R^{74}$, $R^{75}$, $R^{76}$, $R^{77}$, $R^{78}$, $R^{79}$, $R^{80}$, $R^{81}$, $R^{82}$, $R^{83}$, $R^{84}$, $R^{85}$, $R^{86}$, $R^{87}$, $R^{88}$, $R^{89}$, $R^{90}$, $R^{91}$ and $R^{92}$ are independently hydrogen atom, aliphatic group, aromatic group, or heterocyclic group.

The aryl part of the substituted aryl group is the same as the above aryl group. As the substituted alkyl group, there are p-biphenetyl, 4-phenylethynylphenyl, 2-methoxypenyl, 3-methoxypenyl, 4-methoxypenyl, 2-ethoxyphenyl, 3-ethoxyphenyl, 4-ethoxyphenyl, 2-propoxyphenyl, 3-propoxyphenyl, 4-propoxyphenyl, 2-butoxyphenyl, 3-butoxyphenyl, 4-butoxyphenyl, 2-hexyloxyphenyl, 3-hexyloxyphenyl, 4-hexyloxyphenyl, 2-octyloxyphenyl, 3-octyloxyphenyl, 4-octyloxyphenyl, 2-dodecyloxyphenyl, 3-dodecyloxyphenyl, 4-dodecyloxyphenyl, 2-tetracosyloxyphenyl, 3-tetracosyloxyphenyl, 4-tetracosyloxyphenyl, 3,4-dimethoxyphenyl, 3,4-diethoxyphenyl, 3,4-dihexyloxyphenyl, 2,4-dimethoxyphenyl, 2,4-diethoxyphenyl, 2,4-dihexyloxyphenyl, 3,5-dimethoxyphenyl, 3,5-diethoxyphenyl, 3,5-dihexyloxyphenyl, 3,4,5-trimethoxyphenyl, 3,4,5-triethoxyphenyl, 3,4,5-trihexyloxyphenyl, 2,4,6-tromethoxyphenyl, 2,4,6-triethoxyphenyl, 2,4,6-trihexyloxyphenyl, 2-fluorophenyl, 3-fluorophenyl, 4-fluorophenyl, 2-chlorophenyl, 3-chlorophenyl, 4-chlorophenyl, 2-bromophenyl, 3-bromophenyl, 4-bromophenyl, 3,4-difluorophenyl, 3,4-dichlorophenyl, 3,4-dibromophenyl, 2,4-difluorophenyl, 2,4-dichlorophenyl, 2,4-dibromophenyl, 3,5-difluorophenyl, 3,5-dichlorophenyl, 3,5-dibromophenyl, 3,4,5-trifluorophenyl, 3,4,5-trichlorophenyl, 3,4,5-tribromophenyl, 2,4,6-trifluorophenyl, 2,4,6-trichlorophenyl, 2,4,6-tribromophenyl, pentafluorophenyl, pentachlorophenyl, pentabromophenyl, 2-iodephenyl, 3-iodephenyl, 4-iodephenyl, 2-formilphenyl, 3-formilphenyl, 4-formilphenyl, 2-benzoilphenyl, 3-benzoilphenyl, 4-benzoilphenyl, 2-carboxyphenyl, 3-carboxyphenyl, 4-carboxyphenyl, o-tolyl, m-tolyl, p-tolyl, 2-ethylphenyl, 3-ethylphenyl, 4-ethylphenyl, 2-(2-methoxyethoxy)phenyl, 3-(2-methoxyethoxy)phenyl, 4-(2-methoxyethoxy)phenyl, 2-ethoxycarbonylphenyl, 3-ethoxycarbonylphenyl, 4-ethoxycarbonylphenyl, 2-benzoiloxyphenyl, 3-benzoiloxyphenyl, and 4-benzoiloxyphenyl.

In this specification, the heterocyclic group may have substituent. The ring of the heterocyclic group is preferably 5-membered ring or 6-membered ring. Aliphatic ring, aromatic ring, or other complex ring may be condensed to the complex ring group. As the hetero atoms in the complex ring, there are B, N, O, S, Se, and Te. As the complex cyclic ring, there are pyrrolidine ring, morpholine ring, 2-bora-1,3-dioxolane ring, and 1,3-thiazolidine ring. As the unstaturated complex cycle, there are imidazol ring, thiazol ring, benzothiazol ring, benzooxazol ring, benzotriazol ring, benzoselenazole ring, pyridine ring, pyrimidine ring, and quinoline ring. The substituent of the heterocyclic group is the same as the substituent of the substituted aryl group.

The molecular weight of compound having triphenylene ring is preferably 300 to 2000. The boiling point is preferably at least 260° C. The boiling point is measured with a measuring device in the market (for example TG/DTA100, produced by Seiko Instruments Inc.) The examples of the compounds having triphenylen ring are shown in following. Note that the plural R are the same group. The definition of R is shown with the number after the formula.

(1)-(78)

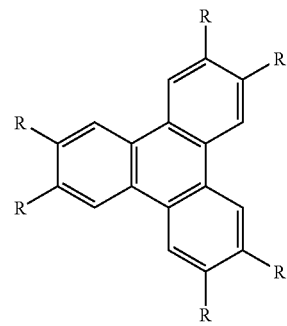

(1) fluoro
(2) chloro
(3) bromo
(4) formyl
(5) benzoyl
(6) carboxyl
(7) butylamino
(8) dibenzylamino
(9) trimethylsilyloxy
(10) 1-pentynyl
(11) ethoxycarbonyl
(12) 2-hydroxyethoxycarbonyl
(13) phenoxycarbonyl
(14) N-phenylcarbamoyl
(15) N,N-diethylcarbamoyl
(16) 4-methoxybenzoyloxy
(17) N-phenylcarbamoyloxy
(18) hexyloxy
(19) 4-hexyloxybenzoyloxy
(20) ethoxy
(21) benzoyloxy
(22) m-dodecyloxyphenylthio
(23) t-octylthio
(24) p-fluorobenzoylthio
(25) isobutyrylthio
(26) p-methylbenzonesulfinyl
(27) ethanesulfinyl
(28) benzenesulfonyl
(29) methanesulfonyl
(30) 2-methoxyethoxy
(31) propoxy
(32) 2-hydroxyethoxy
(33) 2-carboxyethoxy
(34) 3-heptenyloxy
(35) 2-phenylethoxy
(36) trichloromethoxy
(37) 2-propinyloxy
(38) 2,4-octadiynyloxy
(39) perfluoropentyloxy
(40) ethoxycarbonylmethoxy

(41) p-methoxyphenoxy
(42) m-ethoxyphenoxy
(43) o-chlorophenoxy
(44) m-dodecyloxyphenoxy
(45) 4-pyridiloxy
(46) pentafluorobenzoyloxy
(47) p-hexyloxybenzoyloxy
(48) 1-naphthoyloxy
(49) 2-naphthoyloxy
(50) 5-imidazolcarbonyloxy
(51) o-phenoxycarbonylbenzoyloxy
(52) m-(2-methoxyethoxy)benzoyloxy
(53) o-caboxybenzoyloxy
(54) p-formylbenzoyloxy
(55) m-ethoxycarbonylbenzoyloxy
(56) p-pivaloylbenzoyloxy
(57) propionyloxy
(58) phenylacetoxy
(59) cinnamoyloxy
(60) hydroxyacetoxy
(61) ethoxycarbonylacetoxy
(62) m-butoxyphenylpropioloyloxy
(63) propioloyloxy
(64) trimethylsilylpropioloyloxy
(65) 4-octenoyloxy
(66) 3-hydroxypropionyloxy
(67) 2-methoxyethoxyacetoxy
(68) perfluorobutylyloxy
(69) methanesulfonyloxy
(70) p-toluenesulfonyloxy
(71) triethylsilyl
(72) m-butoxyphenoxycarbonylamino
(73) hexyl
(74) phenyl
(75) 4-pyridyl
(76) benzyloxycarbonyloxy
(77) m-chlorobenzamide
(78) 4-methylanilino (79)-(85)

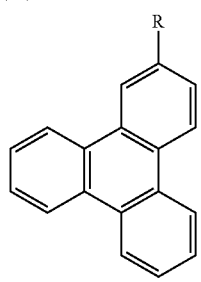

(79) nitro
(80) sulfo
(81) formyl
(82) carboxyl
(83) methoxycarbonyl
(84) benzyloxycarbonyl
(85) phenoxycarbonyl (86)-(90)

(86) butoxy
(87) hexyloxy
(88) dodecyloxy
(89) hexanoyloxy
(90) carboxymethoxy

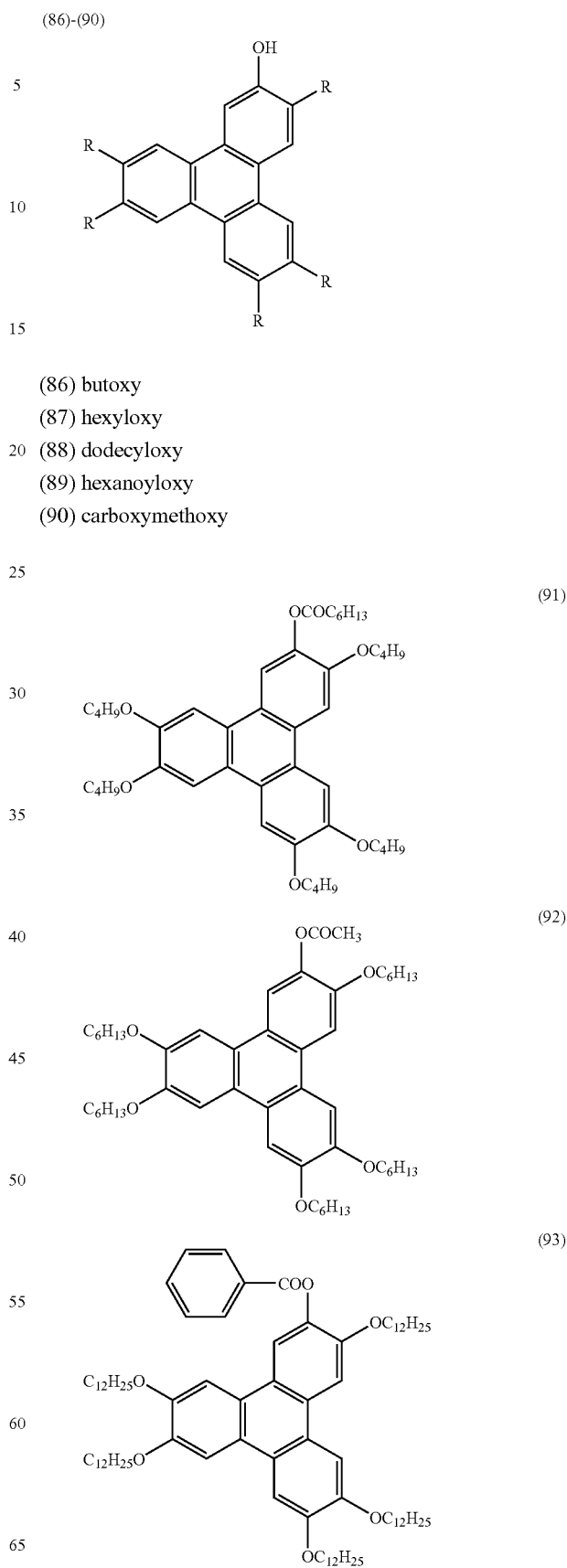

(94)
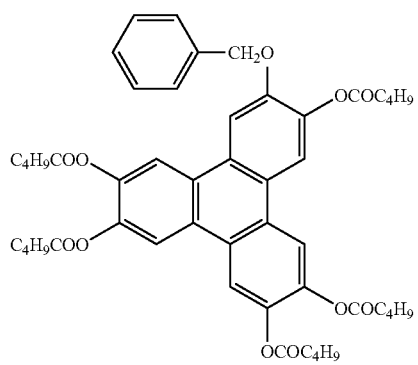

(98)
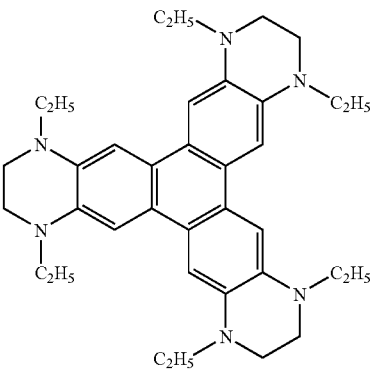

(95)
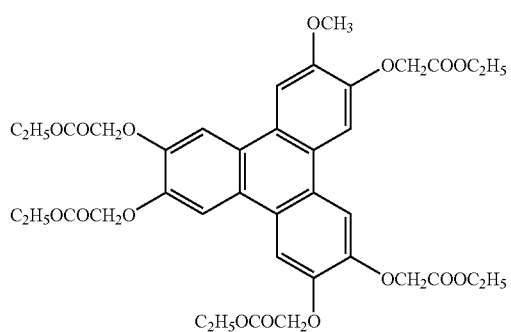

(99)

(96)
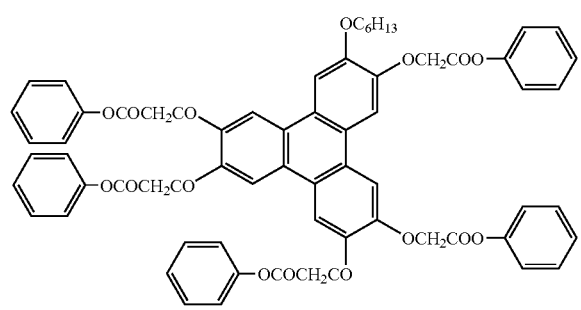

(100)

(97)
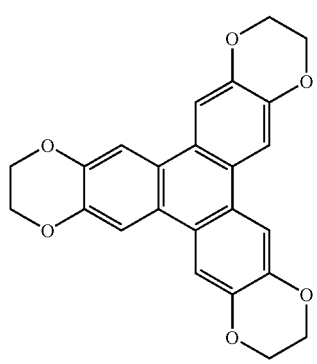

The compounds having at least two sorts of triphenylene rings may be used as the retardation adjuster. Further, discotic compounds may be used as the retardation adjuster.

According to the retardation adjuster for the cellulose ester film, it is preferable that when 3 pts.wt. of the retardation adjuster is added to 100 pts.wt of cellulose ester, the retardation of the cellulose film becomes at least 1.5 times (preferably at least twice, and especially twice to 10 times) larger than without the retardation adjuster. The discotic compounds in the range of 0.01 to 20 pts.wt are used to 100 pts.wt cellulose ester. Usually, the discotic compounds are contained in the cellulose ester film such that the disc surface of the discotic compound may be perpendicular to a film surface of the cellulose ester film. In this situation, the orientation of the discotic compound is regulated by drawing the cellulose ester film.

The discotic compounds preferably used are the compounds having 1,3,5-triadine ring, or having porphyrin moiety. The compounds having 1,3,5-triadine ring preferably has following formula (I).

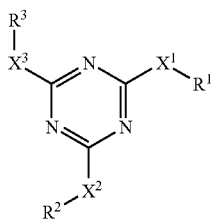

(I)

In this formula, $X^1$ is bound through single bonds, and $NR^4$, O or S;

$X^2$ is bound through single bonds, and $NR^5$, O, or S;

$X^3$ is bound through single bonds, and $NR^6$, O, or S $R^1$, $R^2$, $R^3$ are independently alkyl, alkenyl, aryl groups or heterocyclic group; and $R^4$, $R^5$, $R^6$ are independently hydrogen atom, alkyl, alkenyl, aryl groups or heterocyclic group. The compound of formula (I) is preferably melanin compound. In this case, $X^1$, $X^2$, $X^3$ are respectively $NR^4$, $NR^5$ and $NR^6$, and otherwise, while $X^1$, $X^2$, $X^3$ form single bonds, $R^1$, $R^2$, $R^3$ are complex ring group in which nitrogen atom has free valence.

Preferably, $X^1$—$R^1$, $X^2$—$R^2$ and $X^3$—$R^3$ are the same substitute.

Especially preferably, $R^1$, $R^2$, $R^3$ are aryl groups, and $R^4$, $R^5$, $R^6$ are hydrogen atoms.

The above alkyl group is chain alkyl group preferably to cyclic alkyl group, and straight chain alkyl group particularly preferably to branched alkyl group. The number of carbon atoms in one alkyl group is preferable 1 to 30, particularly 1 to 20, especially 1 to 10, more especially 1 to 8, and the most especially 1 to 6. The alkyl group may have the substituent. As the substituent, there are halogen atom, alkoxy group (for example, methoxy, ethoxy, epoxyethyloxy groups) and acyloxy group (for example, acryloyloxy, methacryloyloxy group). The alkenyl group is preferably chain alkenyl group to the cyclic alkenyl group, and especially preferably straight chain alkenyl group to branched alkeyl group.

The number of carbon atoms in one alkenyl group is preferable 2 to 30, particularly 2 to 20, especially 2 to 10, more especially 2 to 8, and the most especially 2 to 6. The alkenyl group may have the substituent. As the substituent, there are halogen atom, alkoxy groups (for example, methoxy, ethoxy, epoxyethyloxy groups) and acyloxy group (for example, acryloyloxy, methacryloyloxy group).

The aryl group is preferably phenyl or naphtyl, and especially naphtyl. The aryl group may have the substituent, such as halogen atom, hydroxyl group, cyano group, nitro group, carboxyl group, alkyl group, alkenyl group, aryl group, alkoxy group, alkenyloxy group, aryloxy group, acyloxy group, alkoxycarbonyl group, alkenyloxycarbonyl group, aryloxycarbonyl group, sulfamoyl group, alkyl substituted sulfamoyl group, alkenyl substituted sulfamoyl group, aryl substituted sulfamoyl group, sulfon amide group, carbamoyl group, alkyl substituted carbamoyl group, alkenyl substituted carbamoyl group, aryl substituted carbamoyl group, amide group, alkylthio group, alkenylthio group, arylthio group, and acyl group. These alkyl groups are defined as the same as the previously explained ones. The alkyl parts of alkoxy group, acyloxy group, alcoxycarbonyl group, alkyl substituted sulfamoyl group, solfonamide group, alkyl substituted carbamoyl group, amide group, alkylthio group and acyl group are defined as the same as the alkyl groups previously explained.

These alkenyl groups are defined as the same as the previously explained ones. The alkenyl parts of alkenyloxy group, acyloxy group, alkenyloxycarbonyl group, alkenyl substituted sulfamoyl group, solfonamide group, alkenyl substituted carbamoyl group, amide group, alkenylthio group and acyl group are defined as the same as the alkenyl groups previously explained. As the aryl groups, there are for example phenyl, α-naphtyl, β-naphtyl, 4-methoxyphenyl, 3,4-diethoxyphenyl, 4-octyloxyphenyl and 4-dodecyloxyphenyl. The acyl parts of aryloxy group, acyloxy group, aryloxycarbonyl group, aryl substituted sulfamoyl group, solfonamide group, aryl substituted carbamoyl group, amide group, arylthio group and acyl group are defined as the same as the aryl groups previously explained.

Preferably, the heterocyclic group in which $X^1$, $X^2$ or $X^3$ is NR, O or S has characters of aromatic group. Such heterocyclic group is usually unsaturated hetero ring, and preferably a complex ring having the double bonds at the most. Such complex ring is preferably 5-membered ring, 6-membered ring, or 7-membered ring, and particularly preferably 5-membered ring, or 6-membered ring, and especially preferably 6-membered ring. The hetero atoms on the complex ring are preferably N, S, or O, and particularly N. The complex ring having character of aromatic groups is especially preferably pyridine ring (2-pyridyl or 4-pyridyl as the heterocyclic group). The heterocyclic group may have the substituent that is the same as the substituent of the aryl part described above.

When $X^1$, $X^2$ or $X^3$ forms single bonds, the complex ring group preferably has free valence at nitrogen atom. Such complex ring group is preferably 5-membered ring, 6-membered ring, or 7-membered ring, and particularly preferably 5-membered ring, or 6-membered ring, and especially preferably 6-membered ring. In this case, the heterocyclic group may have the hetero atoms (for example S or O) other than the nitrogen atom. The heterocyclic group may have the substituent that is the same as the substituent of the aryl part described above. The heterocyclic group having free valence at the nitrogen atom is shown in following.

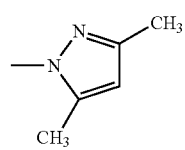

(Hc-1)

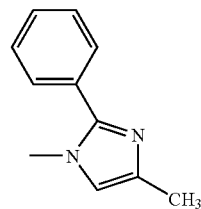

(Hc-2)

-continued

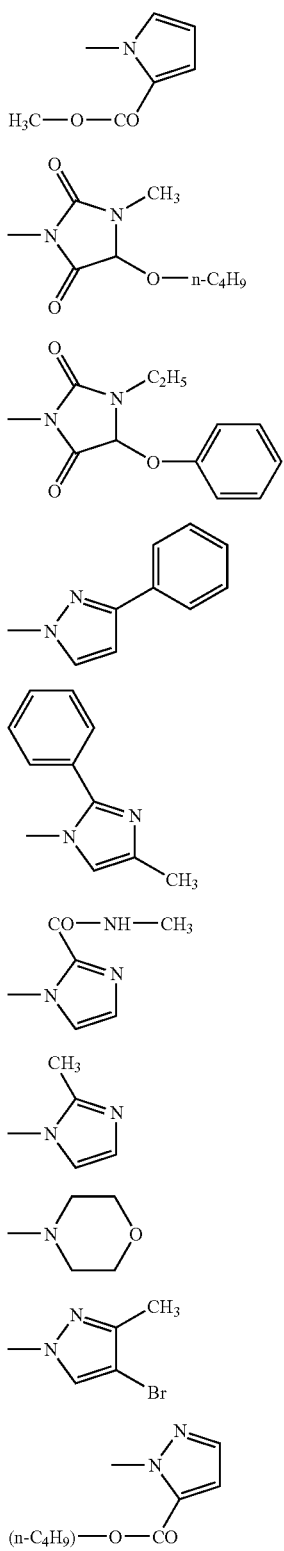

The molecular weight of the compound having 1,3,5-triadine is preferably from 300 to 2000, and the boiling point of the compound is preferably at least 260° C. The boiling point is measured with a measuring device sold in the market (for example TG/DTA100, produced by Seiko Instruments Inc.). The examples of the compounds having 1,3,5-triadine are shown in following. Note that the plural R are the same group. The definition of R is shown with the number after the formula.

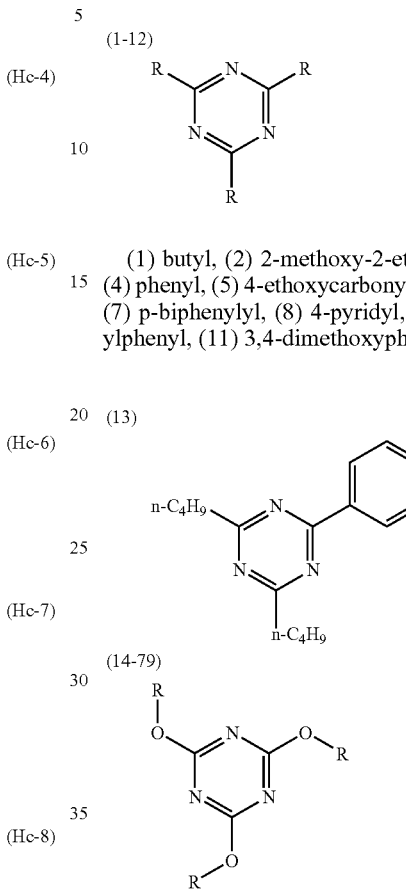

(1) butyl, (2) 2-methoxy-2-ethoxyethyl, (3) 5-undecenyl, (4) phenyl, (5) 4-ethoxycarbonylphenyl, (6) 4-butoxyphenyl, (7) p-biphenylyl, (8) 4-pyridyl, (9) 2-naphtyl, (10) 2-methylphenyl, (11) 3,4-dimethoxyphenyl, (12) 2-furyl

(14) phenyl, (15) 3-ethoxycarbonylphenyl, (16) 3-butoxyphenyl, (17) m-biphenylyl, (18) 3-phenylthiophenyl (19) 3-chlorophenyl (20) 3-bonzoylphenyl, (21) 3-acetoxyphenyl, (22) 3-benzoyloxyphenyl, (23) 3-phenoxycarbonylphenyl, (24) 3-methoxyphenyl, (25) 3-anilinophenyl, (26) 3-isobutylylaminophenyl, (27) 3-phenoxycarbonylaminophenyl, (28) 3-(3-ethylureido)phenyl, (29) 3-(3,3-diethylureido)phenyl, (30) 3-methylphenyl, (31) 3-phenoxyphenyl, (32) 3-hydroxyphenyl,

(33) 4-ethoxycarbonylphenyl, (34) 4-butoxyphenyl, (35) p-biphenylyl, (36) 4-phenylthiophenyl, (37)4-chlorophenyl, (38) 4-benzoylphenyl, (39) 4-acetoxyphenyl, (40) 4-benzoyloxyphenyl, (41) 4-phenoxycarbonylphenyl, (42) 4-methoxyphenyl, (43)4-anilinophenyl, (44) 4-isobutylylaminophenyl, (45) 4-phenoxycarbonylaminophenyl, (46) 4-(3-ethylureido)phenyl, (47) 4-(3,3-diethylureido)phenyl, (48) 4-methylphenyl, (49) 4-phenoxyphenyl, (50) 4-hydroxyphenyl,

(51) 3,4-diethoxycarbonylphenyl, (52) 3,4-dibutoxyphenyl, (53) 3,4-diphenylphenyl, (54) 3,4-diphenylthiophenyl, (55) 3,4-dichlorophenyl, (56) 3,4-dibenzoylphenyl, (57) 3,4-diacetoxyphenyl, (58) 3,4-dibenzoyloxyphenyl, (59) 3,4-diphenoxycarbonylphenyl, (60) 3,4-dimethoxyphenyl, (61) 3,4-dianilinophenyl, (62) 3,4-dimethylphenyl, (63) 3,4-diphenoxyphenyl, (64) 3,4-dihydroxyphenyl, (65) 2-naphtyl,

(66) 3,4,5-triethoxycarbonylphenyl, (67) 3,4,5-tributoxyphenyl, (68) 3,4,5-triphenylphenyl, (69) 3,4,5-triphenylthiophenyl, (70) 3,4,5-trichlorophenyl, (71) 3,4,5-tribenzoylphenyl, (72) 3,4,5-triacetoxyphenyl, (73) 3,4,5-tribenzoyloxyphenyl, (74) 3,4,5-triphenoxycarbonylphenyl, (75) 3,4,5-trimethoxyphenyl, (76) 3,4,5-trianilinophenyl, (77) 3,4,5-trimethylphenyl, (78) 3,4,5-triphenoxyphenyl, (79) 3,4,5-trihydroxyphenyl.

(80-145)

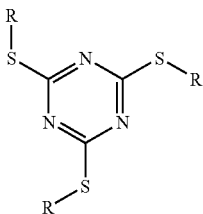

(80) phenyl, (81) 3-ethoxycarbonylphenyl, (82) 3-butoxyphenyl, (83) m-biphenylyl, (84) 3-phenylthiophenyl (85) 3-chlorophenyl (86) 3-benzoylphenyl, (87) 3-acetoxyphenyl, (88) 3-benzoyloxyphenyl, (89) 3-phenoxycarbonylphenyl, (90) 3-methoxyphenyl, (91) 3-anilinophenyl, (92) 3-isobutylylaminophenyl, (93) 3-phenoxycarbonylaminophenyl, (94) 3-(3-ethylureido)phenyl, (95) 3-(3,3-diethylureido)phenyl, (96) 3-methylphenyl, (97) 3-phenoxyphenyl, (98) 3-hydroxyphenyl,

(99) 4-ethoxycarbonylphenyl, (100) 4-butoxyphenyl, (101) p-biphenylyl, (102) 4-phenylthiophenyl, (103) 4-chlorophenyl, (104) 4-benzoylphenyl, (105) 4-acetoxyphenyl, (106) 4-benzoyloxyphenyl, (107) 4-phenoxycarbonylphenyl, (108) 4-methoxyphenyl, (109) 4-anilinophenyl, (110) 4-isobutylylaminophenyl, (111) 4-phenoxycarbonylaminophenyl, (112) 4-(3-ethylureido)phenyl, (113) 4-(3,3-diethylureido)phenyl, (114) 4-methylphenyl, (115) 4-phenoxyphenyl, (116) 4-hydroxyphenyl, (117) 3,4-diethoxycarbonylphenyl, (118) 3,4-dibutoxyphenyl, (119) 3,4-diphenylphenyl, (120) 3,4-diphenylthiophenyl, (121) 3,4-dichlorophenyl, (122) 3,4-dibenzoylphenyl, (123) 3,4-diacetoxyphenyl, (124) 3,4-dibenzoyloxyphenyl, (125) 3,4-diphenoxycarbonylphenyl, (126) 3,4-dimethoxyphenyl, (127) 3,4-dianilinophenyl, (128) 3,4-dimethylphenyl, (129) 3,4-diphenoxyphenyl, (130) 3,4-dihydroxyphenyl, (131) 2-naphtyl, (132) 3,4,5-triethoxycarbonylphenyl, (133) 3,4,5-tributoxyphenyl, (134) 3,4,5-triphenylphenyl, (135) 3,4,5-triphenylthiophenyl, (136) 3,4,5-trichlorophenyl, (137) 3,4,5-tribenzoylphenyl, (138) 3,4,5-triacetoxyphenyl, (139) 3,4,5-tribenzoyloxyphenyl, (140) 3,4,5-triphenoxycarbonylphenyl,(141) 3,4,5-trimethoxyphenyl, (142) 3,4,5-trianilinophenyl, (143) 3,4,5-trimethylphenyl, (144) 3,4,5-triphenoxyphenyl, (145) 3,4,5-trihydroxyphenyl.

(146-164)

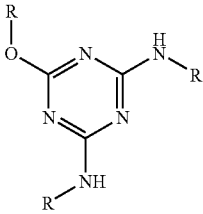

(146) phenyl, (147) 4-ethoxycarbonylphenyl, (148) 4-butoxyphenyl, (149) p-biphenylyl, (150) 4-phenylthiophenyl, (151) 4-chlorophenyl, (152) 4-benzoylphenyl, (153) 4-acetoxyphenyl, (154) 4-benzoyloxyphenyl, (155) 4-phenoxycarbonylphenyl, (156) 4-methoxyphenyl, (157) 4-anilinophenyl, (158) 4-isobutylylaminophenyl, (159) 4-phenoxycarbonylaminophenyl,(160) 4-(3-ethylureido)phenyl, (161) 4-(3,3-diethylureido)phenyl, (162) 4-methylphenyl, (163) 4-phenoxyphenyl, (164) 4-hydroxyphenyl, (165-183)

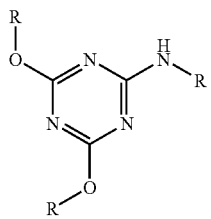

(165) phenyl, (166) 4-ethoxycarbonylphenyl, (167) 4-butoxyphenyl, (168) p-biphenylyl, (169) 4-phenylthiophenyl, (170) 4-chlorophenyl, (171) 4-benzoylphenyl, (172) 4-acetoxyphenyl, (173) 4-benzoyloxyphenyl, (174) 4-phenoxycarbonylphenyl, (175) 4-methoxyphenyl, (176)4-anilinophenyl, (177) 4-isobutylylaminophenyl, (178) 4-phenoxycarbonylaminophenyl, (179) 4-(3-ethylureido)phenyl, (180) 4-(3,3-diethylureido)phenyl, (181) 4-methylphenyl, (182) 4-phenoxyphenyl, (183) 4-hydroxyphenyl, (184-202)

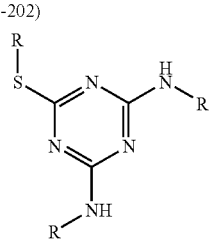

(184) phenyl, (185) 4-ethoxycarbonylphenyl, (186) 4-butoxyphenyl, (187) p-biphenylyl, (188) 4-phenylthiophenyl, (189) 4-chlorophenyl, (190) 4-benzoylphenyl, (191) 4-acetoxyphenyl, (192) 4-benzoyloxyphenyl, (193) 4-phenoxycarbonylphenyl, (194) 4-methoxyphenyl, (195) 4-anilinophenyl, (196) 4-isobutylylaminophenyl, (197) 4-phenoxycarbonylaminophenyl, (198) 4-(3-ethylureido)phenyl, (199) 4-(3,3-diethylureido)phenyl, (200) 4-methylphenyl, (201) 4-phenoxyphenyl, (202) 4-hydroxyphenyl, (203-221)

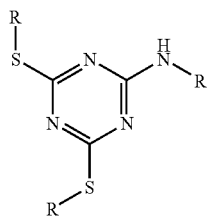

(203) phenyl, (204) 4-ethoxycarbonylphenyl, (205) 4-butoxyphenyl, (206) p-biphenylyl, (207) 4-phenylthiophenyl, (208) 4-chlorophenyl, (209) 4-benzoylphenyl, (210) 4-acetoxyphenyl, (211) 4-benzoyloxyphenyl, (212) 4-phenoxycarbonylphenyl, (213) 4-methoxyphenyl, (214) 4-anilinophenyl, (215) 4-isobutylylaminophenyl, (216) 4-phenoxycarbonylaminophenyl, (217) 4-(3-ethylureido)phenyl, (218) 4-(3,3-diethylureido)phenyl, (219) 4-methylphenyl, (220) 4-phenoxyphenyl, (221) 4-hydroxyphenyl, (222-419)

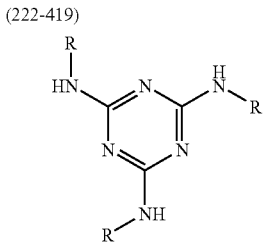

(222) phenyl, (223) 4-butylphenyl, (224) 4-(2-methoxy-2-ethoxyethyl)phenyl, (225) 4-(5-nonenyl)phenyl, (226) p-biphenylyl, (227) 4-ethoxycarbonylphenyl, (228) 4-butoxyphenyl, (229) 4-methylphenyl, (230) 4-chlorophenyl, (231) 4-phenylthiophenyl, (232) 4-benzoylphenyl, (233) 4-acetoxyphenyl, (234) 4-benzoyloxyphenyl, (235) 4-phenoxycarbonylphenyl, (236) 4-methoxyphenyl, (237) 4-anilinophenyl, (238) 4-isobutylylaminophenyl, (239) 4-phenoxycarbonylaminophenyl, (240) 4-(3-ethylureido)phenyl, (241) 4-(3,3-diethylureido)phenyl, (242) 4-phenoxyphenyl, (243) 4-hydroxyphenyl, (244) 3-butylphenyl, (245) 3-(2-methoxy-2-ethoxyethyl)phenyl, (246) 3-(5-nonenyl)phenyl, (247) m-biphenylyl, (248) 3-ethoxycarbonylphenyl, (249) 3-butoxyphenyl, (250) 3-methylphenyl, (251) 3-chlorophenyl, (252) 3-phenylthiophenyl, (253) 3-benzoylphenyl, (254) 3-acetoxyphenyl, (255) 3-benzoyloxyphenyl, (256) 3-phenoxycarbonylphenyl, (257) 3-methoxyphenyl, (258) 3-anilinophenyl, (259) 3-isobutylylaminophenyl, (260) 3-phenoxycarbonylaminophenyl, (261) 3-(3-ethylureido)phenyl, (262) 3-(3,3-diethylureido)phenyl, (263) 3-phenoxyphenyl, (264) 3-hydroxyphenyl, (265) 2-butylphenyl, (266) 2-(2-methoxy-2-ethoxyethyl)phenyl, (267) 2-(5-nonenyl)phenyl, (268) o-biphenylyl, (269) 2-ethoxycarbonylphenyl, (270) 2-butoxyphenyl, (271) 2-methylphenyl, (272) 2-chlorophenyl, (273) 2-phenylthiophenyl, (274) 2-benzoylphenyl, (275) 2-acetoxyphenyl, (276) 2-benzoyloxyphenyl, (277) 2-phenoxycarbonylphenyl, (278) 2-methoxyphenyl, (279) 2-anilinophenyl, (280) 2-isobutylylaminophenyl, (281) 2-phenoxycarbonylaminophenyl, (282) 2-(3-ethylureido)phenyl, (283) 2-(3,3-diethylureido)phenyl, (284) 2-phenoxyphenyl, (285) 2-hydroxyphenyl, (286) 3,4-dibutylphenyl, (287) 3,4-di(2-methoxy-2-ethoxyethyl)phenyl, (288) 3,4-diphenylpyhenyl, (289) 3,4-diethoxycarbonylphenyl, (290) 3,4-didodecyloxyphenyl, (291) 3,4-dimethylphenyl, (292) 3,4-dichlorophenyl, (293) 3,4-dibenzoylphenyl, (294) 3,4-diacetoxyphenyl, (295) 3,4-dimethoxyphenyl, (296) 3,4-di-N-methylaminophenyl, (297) 3,4-diisobutylylaminophenyl, (298) 3,4-diphenoxyphenyl, (299) 3,4-dihydroxyphenyl, (300) 3,5-dibutylphenyl, (301) 3,5-di(2-methoxy-2-ethoxyethyl)phenyl, (302) 3,5-diphenylpyhenyl, (303) 3,5-diethoxycarbonylphenyl, (304) 3,5-didodecyloxyphenyl, (305) 3,5-dimethylphenyl, (306) 3,5-dichlorophenyl, (307) 3,5-dibenzoylphenyl, (308) 3,5-diacetoxyphenyl, (309) 3,5-dimethoxyphenyl, (310) 3,5-di-N-methylaminophenyl, (311) 3,5-diisobutylylaminophenyl, (312) 3,5-diphenoxyphenyl, (313) 3,5-dihydroxyphenyl, (314) 2,4-dibutylphenyl, (315) 2,4-di(2-methoxy-2-ethoxyethyl)phenyl, (316) 2,4-diphenylpyhenyl, (317) 2,4-diethoxycarbonylphenyl, (318) 2,4-didodecyloxyphenyl, (319) 2,4-dimethylphenyl, (320) 2,4-dichlorophenyl, (321) 2,4-dibenzoylphenyl, (322) 2,4-diacetoxyphenyl, (323) 2,4-dimethoxyphenyl, (324) 2,4-di-N-methylaminophenyl, (325) 2,4-diisobutylylaminophenyl, (326) 2,4-diphenoxyphenyl, (327) 2,4-dihydroxyphenyl, (328) 2,3-dibutylphenyl, (329) 2,3-di(2-methoxy-2-ethoxyethyl)phenyl, (330) 2,3-diphenylpyhenyl, (331) 2,3-diethoxycarbonylphenyl, (332) 2,3-didodecyloxyphenyl, (333) 2,3-dimethylphenyl, (334) 2,3-dichlorophenyl, (335) 2,3-dibenzoylphenyl, (336) 2,3-diacetoxyphenyl, (337) 2,3-dimethoxyphenyl, (338) 2,3-di-N-methylaminophenyl, (339) 2,3-diisobutylylaminophenyl, (340) 2,3-diphenoxyphenyl, (341) 2,3-dihydroxyphenyl, (342) 2,6-dibutylphenyl, (343) 2,6-di(2-methoxy-2-ethoxyethyl)phenyl, (344) 2,6-diphenylpyhenyl, (345) 2,6-diethoxycarbonylphenyl, (346) 2,6-didodecyloxyphenyl, (347) 2,6-dimethylphenyl, (348) 2,6-dichlorophenyl, (349) 2,6-dibenzoylphenyl, (350) 2,6-diacetoxyphenyl, (351) 2,6-dimethoxyphenyl, (352) 2,6-di-N-methylaminophenyl, (353) 2,6-diisobutylylaminophenyl, (354) 2,6-diphenoxyphenyl, (355) 2,6-dihydroxyphenyl, (356) 3,4,5-tributylphenyl, (357) 3,4,5-tri(2-methoxy-2-ethoxyethyl)phenyl, (358) 3,4,5-triphenylpyhenyl, (359) 3,4,5-trietoxycarbonylphenyl, (360) 3,4,5-tridodecyloxyphenyl, (361) 3,4,5-trimethylphenyl, (362) 3,4,5-trichlorophenyl, (363) 3,4,5-tribenzoylphenyl, (364) 3,4,5-triacetoxyphenyl, (365) 3,4,5-trimethoxyphenyl, (366) 3,4,5-tri-N-methylaminophenyl, (367) 3,4,5-triisobutylylaminophenyl, (368) 3,4,5-triphenoxyphenyl, (369) 3,4,5-trihydroxyphenyl, (370) 2,4,6-tributylphenyl, (371) 2,4,6-tri(2-methoxy-2-ethoxyethyl)phenyl, (372) 2,4,6-triphenylpyhenyl, (373) 2,4,6-trietoxycarbonylphenyl, (374) 2,4,6-tridodecyloxyphenyl, (375) 2,4,6-trimethylphenyl, (376) 2,4,6-trichlorophenyl, (377) 2,4,6-tribenzoylphenyl, (378) 2,4,6-triacetoxyphenyl, (379) 2,4,6-trimethoxyphenyl, (380) 2,4,6-tri-N-methylaminophenyl, (381) 2,4,6-triisobutylylaminophenyl, (382) 2,4,6-triphenoxyphenyl, (383) 2,4,6-trihydroxyphenyl, (384) pentafluorophenyl, (385) pentachlorophenyly, (386) pentamethoxyphenyl, (387) 6-N-methylsulfamoyl-8-methoxy-2-naphyl, (388) 5-N-methylsulfamoyl-2-naphtyl (389) 6-N-phenylsulfamoyl-2-naphtyl, (390) 5-ethoxy-7-N-methylsulfamoyl-2-naphtyl, (391) 3-methoxy-2-naphtyl, (392) 1-ethoxy-2-naphtyl, (393) 6-N-phenylsulfamoyl-8-methoxy-2-naphtyl, (394) 5-methoxy-7-phenylsulfamoyl-2-naphtyl, (395) 1-(4-methylphenyl)-2-naphtyl, (396) 6,8-di-N-methylsulfamoyl-2-naphtyl, (397) 6-N-2-acetoxyethylsulfamoyl-8-methoxy-2-naphtyl, (398) 5-acetoxy-7-N-phenylsulfamoyl-2-naphtyl, (399) 3-benzoyloxy-2-naphtyl, (400) 5-acetylamino-1-naphtyl, (401) 2-methoxy-1-naphtyl, (402) 4-phenoxy-1-naphtyl, (403) 5-N-methylsulfamoyl-1-naphtyl, (404) 3-N-methylcarbamoyl-4-hydroxy-1-naphtyl, (405) 5-methoxy-6-N-ethylsulfamoyl-1-naphtyl, (406) 7-tetradecyloxy-1-naphtyl, (407) 4-(4-methylphenoxy)-1-naphtyl, (408) 6-N-methylsulfamoyl-1-naphtyl, (409) 3-N,N-dimethylcarbamoyl-4-methoxy-1-naphtyl, (410) 5-methoxy-6-N-benzylsulfamoyl-1-naphtyl, (411) 3,6-di-N-phenylsulfamoyl-1-naphtyl, (412) methyl, (413) ethyl, (414) butyl, (415) octyl, (416) dodecyl, (417) 2-butoxy-2-ethoxyethyl, (418) benzyl, (419) 4-methoxybenzyl, (420)
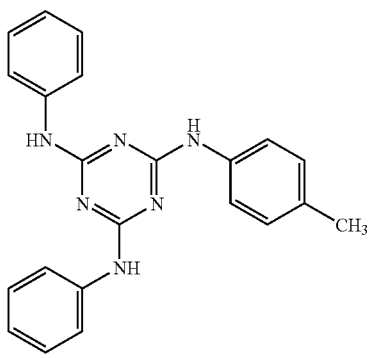
(421)
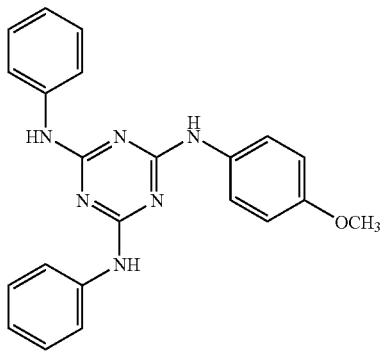
(422)
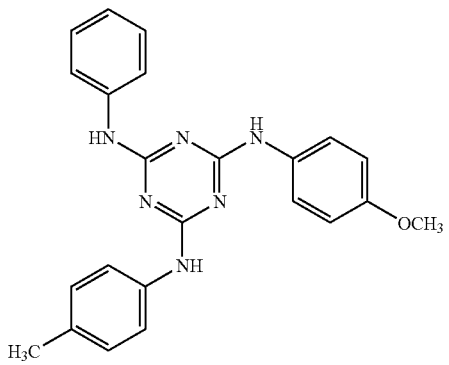
(423)
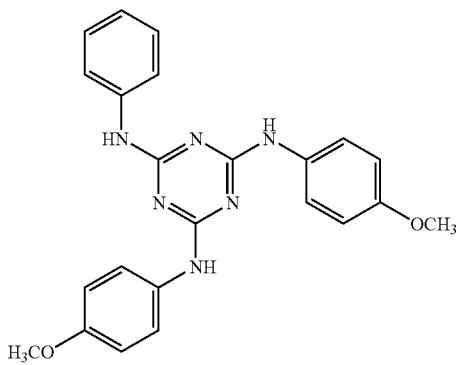
(424-426)
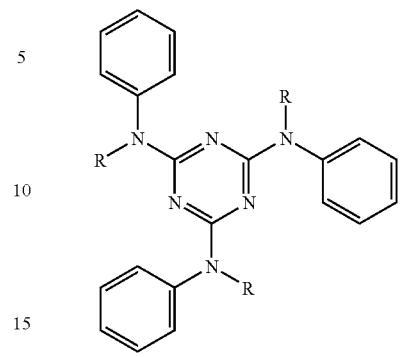
(424) methyl, (425) phenyl, (426) butyl
(427)
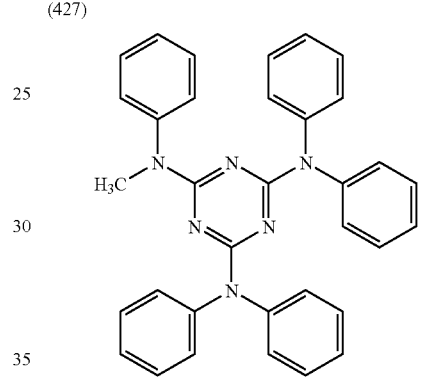
(428)
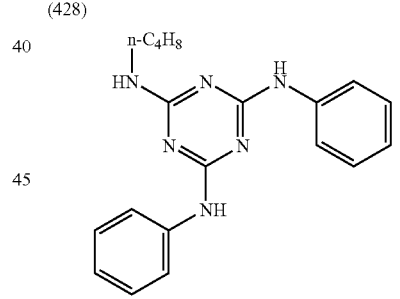
(429)
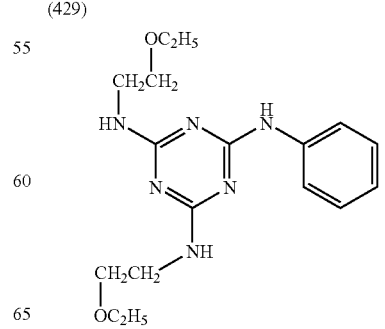

(430-437)
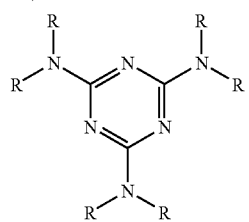
(430) methyl, (431) ethyl, (432) butyl, (433) octyl, (434) dodecyl, (435) 2-butoxy-2-ethoxyethyl, (436) benzyl, (437) 4-methoxybenzyl,
(438)
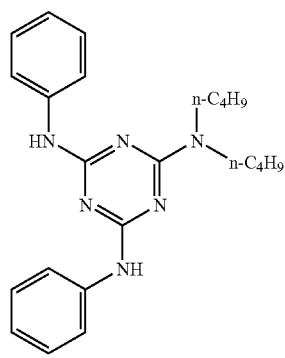
(439)
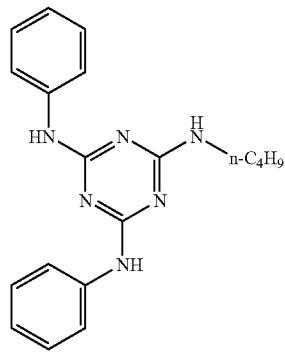
(440)
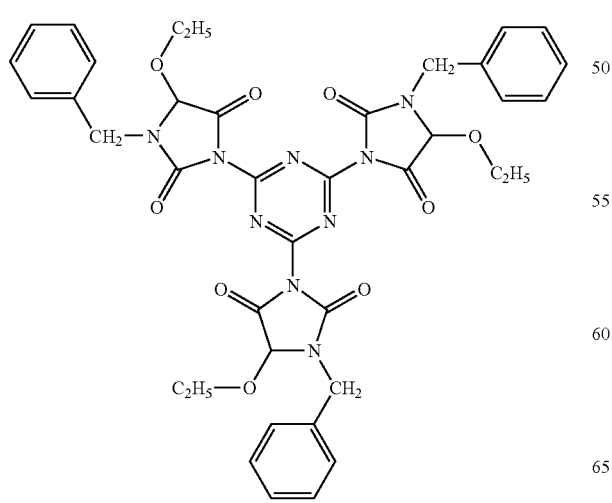
(441)
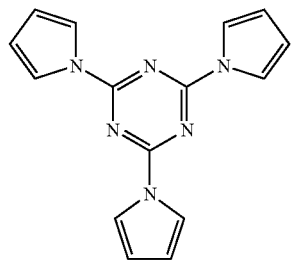
(442)
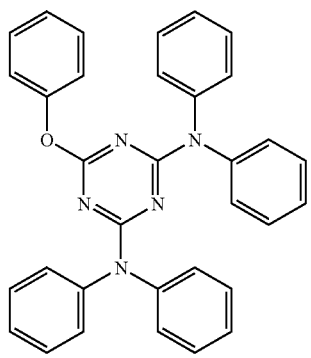
(443)
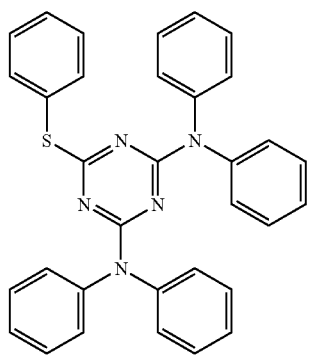
(444)
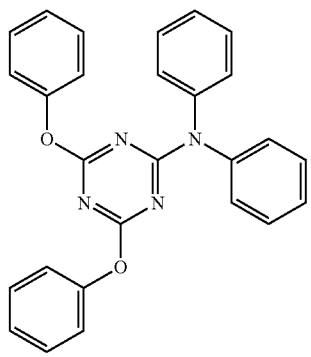

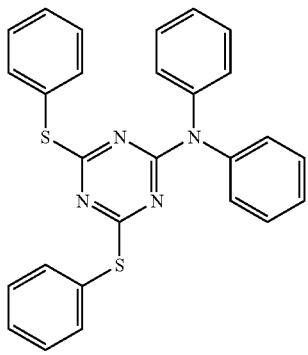

As the compound having 1,3,5-triadine ring, melanin polymers may be used. Preferably, melanin polymers are synthesized in polymerization of carbonyl compounds and melanin compounds, as shown in Formula II.

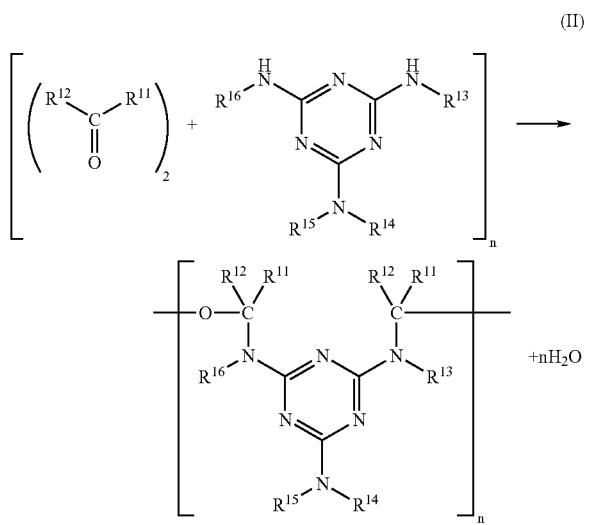

In the formula (II), $R^{11}$, $R^{12}$, $R^{13}$, $R^{14}$, $R^{16}$, and $R^{16}$ are hydrogen atom, alkyl group, alkenyl group, aryl group, and heterocyclic group, whose definition and substituents are the same as those according to the formula (I). The polymerization of melanin compounds and carbonyl compounds is made in the same manner as the synthesis for melanin resins. The melanin polymer (melanin resin) in the market may be used. The molecular weight of the melanin polymer is preferably at least 2,000 and at most 400, 000. The repeat units of melanin polymers are shown in the following.

(MP-1)-(MP-50)

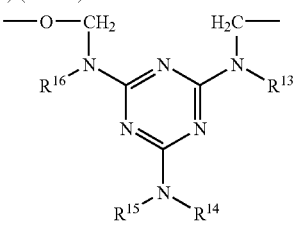

MP-1: $R^{13}$, $R^{14}$, $R^{15}$, $R^{16}$: $CH_2OH$
MP-2: $R^{13}$, $R^{14}$, $R^{15}$, $R^{16}$: $CH_2OCH_3$
MP-3: $R^{13}$, $R^{14}$, $R^{15}$, $R^{16}$: $CH_2O\text{-}i\text{-}C_4H_9$
MP-4: $R^{13}$, $R^{14}$, $R^{15}$, $R^{16}$: $CH_2O\text{-}n\text{-}C_4H_9$
MP-5: $R^{13}$, $R^{14}$, $R^{15}$, $R^{16}$: $CH_2NHCOCH=CH_2$
MP-6: $R^{13}$, $R^{14}$, $R^{15}$, $R^{16}$: $CH_2NHCO(CH_2)_7CH=CH(CH_2)_7CH_3$
MP-7: $R^{13}$, $R^{14}$, $R^{15}$: $CH_2OH$; $R^{16}$: $CH_2OCH_3$
MP-8: $R^{13}$, $R^{14}$, $R^{16}$: $CH_2OH$; $R^{15}$: $CH_2OCH_3$
MP-9: $R^{13}$, $R^{14}$: $CH_2OH$; $R^{15}$, $R^{16}$: $CH_2OCH_3$
MP-10: $R^{13}$, $R^{16}$: $CH_2OH$; $R^{14}$, $R^{15}$: $CH_2OCH_3$
MP-11: $R^{13}$, $CH_2OH$; $R^{14}$, $R^{15}$, $R^{16}$: $CH_2OCH_3$
MP-12: $R^{13}$, $R^{14}$, $R^{16}$: $CH_2OCH_3$; $R^{15}$: $CH_2OH$
MP-13: $R^{13}$, $R^{16}$: $CH_2OCH_3$; $R^{14}$, $R^{15}$: $CH_2OH$
MP-14: $R^{13}$, $R^{14}$, $R^{15}$: $CH_2OH$; $R^{16}$: $CH_2O\text{-}i\text{-}C_4H_9$
MP-15: $R^{13}$, $R^{14}$, $R^{16}$: $CH_2OH$ $R^{15}$: $CH_2O\text{-}i\text{-}C_4H_9$
MP-16: $R^{13}$, $R^{14}$: $CH_2OH$; $R^{15}$, $R^{16}$: $CH_2O\text{-}i\text{-}C_4H_9$
MP-17: $R^{13}$, $R^{16}$: $CH_2OH$; $R^{14}$, $R^{15}$: $CH_2O\text{-}i\text{-}C_4H_9$
MP-18: $R^{13}$: $CH_2OH$; $R^{14}$, $R^{15}$, $R^{16}$: $CH_2O\text{-}i\text{-}C_4H_9$
MP-19: $R^{13}$, $R^{14}$, $R^{16}$: $CH_2O\text{-}i\text{-}C_4H_9$; $R^{15}$: $CH_2OH$
MP-20: $R^{13}$, $R^{16}$: $CH_2O\text{-}i\text{-}C_4H_9$; $R^{14}$, $R^{15}$: $CH_2OH$
MP-21: $R^{13}$, $R^{14}$, $R^{16}$: $CH_2OH$; $R^{16}$: $CH_2O\text{-}n\text{-}C_4H_9$
MP-22: $R^{13}$, $R^{14}$, $R^{16}$: $CH_2OH$; $R^{15}$: $CH_2O\text{-}n\text{-}C_4H_9$
MP-23: $R^{13}$, $R^{14}$: $CH_2OH$; $R^{15}$, $R^{16}$: $CH_2O\text{-}n\text{-}C_4H_9$
MP-24: $R^{13}$, $R^{16}$: $CH_2OH$; $R^{14}$, $R^{15}$: $CH_2O\text{-}n\text{-}C_4H_9$
MP-25: $R^{13}$: $CH_2OH$; $R^{14}$, $R^{15}$, $R^{16}$: $CH_2O\text{-}n\text{-}C_4H_9$
MP-26: $R^{13}$, $R^{14}$, $R^{16}$: $CH_2O\text{-}n\text{-}C_4H_9$; $R^{15}$: $CH_2OH$
MP-27: $R^{13}$, $R^{16}$: $CH_2O\text{-}n\text{-}C_4H_9$; $R^{14}$, $R^{15}$: $CH_2OH$
MP-28: $R^{13}$, $R^{14}$: $CH_2OH$; $R^{15}$: $CH_2OCH_3$; $R^{16}$: $CH_2O\text{-}n\text{-}C_4H_9$
MP-29: $R^{13}$, $R^{14}$: $CH_2OH$; $R^{15}$: $CH_2O\text{-}n\text{-}C_4H_9$; $R^{16}$: $CH_2OCH_3$
MP-30: $R^{13}$, $R^{16}$: $CH_2OH$; $R^{14}$: $CH_2OCH_3$; $R^{15}$: $CH_2O\text{-}n\text{-}C_4H_9$
MP-31: $R^{13}$: $CH_2OH$; $R^{14}$, $R^{15}$: $CH_2OCH_3$; $R^{16}$: $CH_2O\text{-}n\text{-}C_4H_9$
MP-32: $R^{13}$: $CH_2OH$; $R^{14}$, $R^{16}$: $CH_2OCH_3$; $R^{15}$: $CH_2O\text{-}n\text{-}C_4H_9$
MP-33: $R^{13}$: $CH_2OH$; $R^{14}$: $CH_2OCH_3$; $R^{15}$, $R^{16}$: $CH_2O\text{-}n\text{-}C_4H_9$
MP-34: $R^{13}$: $CH_2OH$; $R^{14}$, $R^{15}$: $CH_2O\text{-}n\text{-}C_4H_9$; $R^{16}$: $CH_2OCH_3$
MP-35: $R^{13}$, $R^{14}$: $CH_2OCH_3$; $R^{15}$: $CH_2OH$; $R^{16}$: $CH_2O\text{-}n\text{-}C_4H_9$
MP-36: $R^{13}$, $R^{16}$: $CH_2OCH_3$; $R^{14}$: $CH_2OH$; $R^{15}$: $CH_2O\text{-}n\text{-}C_4H_9$
MP-37: $R^{13}$: $CH_2OCH_3$; $R^{14}$, $R^{15}$: $CH_2OH$; $R^{16}$: $CH_2O\text{-}n\text{-}C_4H_9$
MP-38: $R^{13}$, $R^{16}$: $CH_2O\text{-}n\text{-}C_4H_9$; $R^{14}$: $CH_2OCH_3$; $R^{15}$: $CH_2OH$
MP-39: $R^{13}$: $CH_2OH$; $R^{14}$: $CH_2OCH_3$; $R^{15}$: $CH_2O\text{-}n\text{-}C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$: $CH_2O\text{-}n\text{-}C_4H_9$
MP-41: $R^{13}$: $CH_2OH$; $R^{14}$: $CH_2O\text{-}n\text{-}C_4H_9$; $R^{15}$: $CH_2NHCOCH=CH_2$; $R^{16}$: $CH_2OCH_3$
MP-42: $R^{13}$: $CH_2OCH_3$; $R^{14}$: $CH_2OH$; $R^{15}$: $CH_2O\text{-}n\text{-}C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O\text{-}n\text{-}C_4H_9$
MP-44: $R^{13}$: $CH_2O\text{-}n\text{-}C_4H_9$; $R^{14}$: $CH_2OCH_3$; $R^{15}$: $CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$ MP-47: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$ MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$ MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$ MP-50: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ (MP-51)-(MP-100)

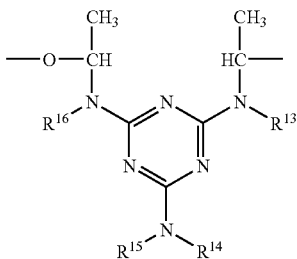

MP-51: $R^{13}, R^{14}, R^{15}, R^{16}$: $CH_2OH$
MP-52: $R^{13}, R^{14}, R^{15}, R^{16}$: $CH_2OCH_3$
MP-53: $R^{13}, R^{14}, R^{15}, R^{16}$: $CH_2O$-i-$C_4H_9$
MP-54: $R^{13}, R^{14}, R^{15}, R^{16}$: $CH_2O$-n-$C_4H_9$
MP-55: $R^{13}, R^{14}, R^{15}, R^{16}$: $CH_2NHCOCH=CH_2$
MP-56: $R^{13}, R^{14}, R^{15}, R^{16}$: $CH_2NHCO(CH_2)_7CH=CH(CH_2)_7CH_3$
MP-57: $R^{13}, R^{14}, R^{15}$: $CH_2OH$; $R^{16}$: $CH_2OCH_3$
MP-58: $R^{13}, R^{14}, R^{16}$: $CH_2OH$; $R^{15}$: $CH_2OCH_3$
MP-59: $R^{13}, R^{14}$: $CH_2OH$; $R^{15}, R^{16}$: $CH_2OCH_3$
MP-60: $R^{13}, R^{16}$: $CH_2OH$; $R^{14}, R^{15}$: $CH_2OCH_3$
MP-61: $R^{13}$: $CH_2OH$; $R^{14}, R^{15}, R^{16}$: $CH_2OCH_3$
MP-62: $R^{13}, R^{14}, R^{16}$: $CH_2OCH_3$; $R^{15}$: $CH_2OH$
MP-63: $R^{13}, R^{16}$: $CH_2OCH_3$; $R^{14}, R^{15}$: $CH_2OH$
MP-64: $R^{13}, R^{14}, R^{15}$: $CH_2OH$; $R^{16}$: $CH_2O$-i-$C_4H_9$
MP-65: $R^{13}, R^{14}, R^{16}$: $CH_2OH$; $R^{15}$: $CH_2O$-i-$C_4H_9$
MP-66: $R^{13}, R^{14}$: $CH_2OH$; $R^{15}, R^{16}$: $CH_2O$-i-$C_4H_9$
MP-67: $R^{13}, R^{16}$: $CH_2OH$; $R^{14}, R^{15}$: $CH_2O$-i-$C_4H_9$
MP-68: $R^{13}$: $CH_2OH$; $R^{14}, R^{15}, R^{16}$: $CH_2O$-i-$C_4H_9$
MP-69: $R^{13}, R^{14}, R^{16}$: $CH_2O$-i-$C_4H_9$; $R^{15}$: $CH_2OH$
MP-70: $R^{13}, R^{16}$: $CH_2O$-i-$C_4H_9$; $R^{14}, R^{15}$: $CH_2OH$
MP-71: $R^{13}, R^{14}, R^{15}$: $CH_2OH$; $R^{16}$: $CH_2O$-n-$C_4H_9$
MP-72: $R^{13}, R^{14}, R^{16}$: $CH_2OH$; $R^{15}$: $CH_2O$-n-$C_4H_9$
MP-73: $R^{13}, R^{14}$: $CH_2OH$; $R^{15}, R^{16}$: $CH_2O$-n-$C_4H_9$
MP-74: $R^{13}, R^{16}$: $CH_2OH$; $R^{14}, R^{15}$: $CH_2O$-n-$C_4H_9$
MP-75: $R^{13}$: $CH_2OH$; $R^{14}, R^{15}, R^{16}$: $CH_2O$-n-$C_4H_9$
MP-76: $R^{13}, R^{14}, R^{16}$: $CH_2O$-n-$C_4H_9$; $R^{15}$: $CH_2OH$
MP-77: $R^{13}, R^{16}$: $CH_2O$-n-$C_4H_9$; $R^{14}, R^{15}$: $CH_2OH$
MP-78: $R^{13}, R^{14}$: $CH_2OH$; $R^{15}$: $CH_2OCH_3$; $R^{16}$: $CH_2O$-n-$C_4H_9$
MP-79: $R^{13}, R^{14}$: $CH_2OH$; $R^{15}$: $CH_2O$-n-$C_4H_9$; $R^{16}$: $CH_2OCH_3$
MP-80: $R^{13}, R^{16}$: $CH_2OH$; $R^{14}$: $CH_2OCH_3$; $R^{15}$: $CH_2O$-n-$C_4H_9$
MP-81: $R^{13}$: $CH_2OH$; $R^{14}, R^{15}$: $CH_2OCH_3$; $R^{16}$: $CH_2O$-n-$C_4H_9$
MP-82: $R^{13}$: $CH_2OH$; $R^{14}, R^{15}$: $CH_2OCH_3$; $R^{16}$: $CH_2O$-n-$C_4H_9$
MP-83: $R^{13}$: $CH_2OH$; $R^{14}, R^{15}$: $CH_2OCH_3$; $R^{16}$: $CH_2O$-n-$C_4H_9$
MP-84: $R^{13}$: $CH_2OH$; $R^{14}, R^{15}$: $CH_2O$-n-$C_4H_9$; $R^{16}$: $CH_2OCH_3$
MP-85: $R^{13}, R^{14}$: $CH_2OCH_3$; $R^{15}$: $CH_2OH$; $R^{16}$: $CH_2O$-n-$C_4H_9$
MP-86: $R^{13}, R^{16}$: $CH_2OCH_3$; $R^{14}$: $CH_2OH$; $R^{15}$: $CH_2O$-n-$C_4H_9$
MP-87: $R^{13}$: $CH_2OCH_3$; $R^{14}, R^{15}$: $CH_2OH$; $R^{16}$: $CH_2O$-n-$C_4H_9$
MP-88: $R^{13}, R^{16}$: $CH_2O$-n-$C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-90: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$
MP-91: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-92: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-93: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-94: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-95: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-96: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$
MP-97: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$
MP-98: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-100: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ (MP-101)-(MP-150)

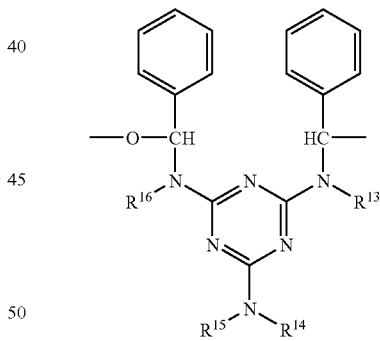

MP-101: $R^{13}, R^{14}, R^{15}, R^{16}$: $CH_2OH$
MP-102: $R^{13}, R^{14}, R^{15}, R^{16}$: $CH_2OCH_3$
MP-103: $R^{13}, R^{14}, R^{15}, R^{16}$: $CH_2O$-i-$C_4H_9$
MP-104: $R^{13}, R^{14}, R^{15}, R^{16}$: $CH_2O$-n-$C_4H_9$
MP-105: $R^{13}, R^{14}, R^{15}, R^{16}$: $CH_2NHCOCH=CH_2$
MP-106: $R^{13}, R^{14}, R^{15}, R^{16}$: $CH_2NHCO(CH_2)_7CH=CH(CH_2)_7CH_3$
MP-107: $R^{13}, R^{14}, R^{15}$: $CH_2OH$; $R^{16}$: $CH_2OCH_3$
MP-108: $R^{13}, R^{14}, R^{16}$: $CH_2OH$; $R^{15}$: $CH_2OCH_3$
MP-109: $R^{13}, R^{14}$: $CH_2OH$; $R^{15}, R^{16}$: $CH_2OCH_3$
MP-110: $R^{13}, R^{16}$: $CH_2OH$; $R^{14}, R^{15}$: $CH_2OCH_3$
MP-111: $R^{13}$: $CH_2OH$; $R^{14}, R^{15}, R^{16}$: $CH_2OCH_3$
MP-112: $R^{13}, R^{14}, R^{16}$: $CH_2OCH_3$; $R^{15}$: $CH_2OH$
MP-113: $R^{13}, R^{16}$: $CH_2OCH_3$; $R^{14}, R^{15}$: $CH_2OH$
MP-114: $R^{13}, R^{14}, R^{15}$: $CH_2OH$; $R^{16}$: $CH_2O$-i-$C_4H_9$

MP-115: $R^{13}, R^{14}, R^{16}$: CH$_2$OH; $R^{15}$: CH$_2$O-i -C$_4$H$_9$
MP-116: $R^{13}, R^{14}$: CH$_2$OH; $R^{15}, R^{16}$: CH$_2$O-i -C$_4$H$_9$
MP-117: $R^{13}, R^{16}$: CH$_2$OH; $R^{14}, R^{15}$: CH$_2$O-i -C$_4$H$_9$
MP-118: $R^{13}$: CH$_2$OH; $R^{14}, R^{15}, R^{16}$: CH$_2$O-i -C$_4$H$_9$
MP-119: $R^{13}, R^{14}, R^{16}$: CH$_2$O-i-C$_4$H$_9$; $R^{15}$: CH$_2$OH
MP-120: $R^{13}, R^{16}$: CH$_2$O-i-C$_4$H$_9$; $R^{14}, R^{15}$: CH$_2$OH
MP-121: $R^{13}, R^{14}, R^{16}$: CH$_2$OH; $R^{16}$: CH$_2$O-n -C$_4$H$_9$
MP-122: $R^{13}, R^{14}, R^{16}$: CH$_2$OH; $R^{15}$: CH$_2$O-n -C$_4$H$_9$
MP-123: $R^{13}, R^{14}$: CH$_2$OH; $R^{15}, R^{16}$: CH$_2$O-n -C$_4$H$_9$
MP-124: $R^{13}, R^{16}$: CH$_2$OH; $R^{14}, R^{15}$: CH$_2$O-n -C$_4$H$_9$
MP-125: $R^{13}$: CH$_2$OH; $R^{14}, R^{15}, R^{16}$: CH$_2$O-n -C$_4$H$_9$
MP-126: $R^{13}, R^{14}, R^{16}$: CH$_2$O-n-C$_4$H$_9$; $R^{15}$: CH$_2$OH
MP-127: $R^{13}, R^{16}$: CH$_2$O-n-C$_4$H$_9$; $R^{14}, R^{15}$: CH$_2$OH
MP-128: $R^{13}, R^{14}$: CH$_2$OH; $R^{15}$: CH$_2$OCH$_3$; $R^{16}$: CH$_2$O-n-C$_4$H$_9$
MP-129: $R^{13}, R^{14}$: CH$_2$OH; $R^{15}$: CH$_2$O-n-C$_4$H$_9$; $R^{16}$: CH$_2$OCH$_3$
MP-130: $R^{13}, R^{16}$: CH$_2$OH; $R^{14}$: CH$_2$OCH$_3$; $R^{15}$: CH$_2$O-n-C$_4$H$_9$
MP-131: $R^{13}$: CH$_2$OH; $R^{14}, R^{15}$: CH$_2$OCH$_3$; $R^{16}$: CH$_2$O-n-C$_4$H$_9$
MP-132: $R^{13}$: CH$_2$OH; $R^{14}, R^{16}$: CH$_2$OCH$_3$; $R^{15}$: CH$_2$O-n-C$_4$H$_9$
MP-133: $R^{13}$: CH$_2$OH; $R^{14}$: CH$_2$OCH$_3$; $R^{15}, R^{16}$: CH$_2$O-n-C$_4$H$_9$
MP-134: $R^{13}$: CH$_2$OH; $R^{14}, R^{15}$: CH$_2$O-n-C$_4$H$_9$; $R^{16}$: CH$_2$OCH$_3$
MP-135: $R^{13}, R^{14}$: CH$_2$OCH$_3$; $R^{15}, R^{16}$: CH$_2$O-n-C$_4$H$_9$
MP-136: $R^{13}, R^{16}$: CH$_2$OCH$_3$; $R^{14}, R^{15}$: CH$_2$O-n-C$_4$H$_9$
MP-137: $R^{13}$: CH$_2$OCH$_3$; $R^{14}, R^{15}, R^{16}$: CH$_2$O-n-C$_4$H$_9$
MP-138: $R^{13}, R^{16}$: CH$_2$O-n-C$_4$H$_9$; $R^{14}$: CH$_2$OCH$_3$; $R^{15}$: CH$_2$OH
MP-139: $R^{13}$: CH$_2$OH; $R^{14}$: CH$_2$OCH$_3$; $R^{15}$: CH$_2$O-n-C$_4$H$_9$; $R^{16}$: CH$_2$NHCOCH=CH$_2$
MP-140: $R^{13}$: CH$_2$OH; $R^{14}$: CH$_2$OCH$_3$; $R^{15}$: CH$_2$NHCOCH=CH$_2$; $R^{16}$: CH$_2$O-n-C$_4$H$_9$
MP-141: $R^{13}$: CH$_2$OH; $R^{14}$: CH$_2$O-n-C$_4$H$_9$; $R^{15}$: CH$_2$NHCOCH=CH$_2$; $R^{16}$: CH$_2$OCH$_3$
MP-142: $R^{13}$: CH$_2$OCH$_3$; $R^{14}$: CH$_2$OH; $R^{15}$: CH$_2$O-n-C$_4$H$_9$; $R^{16}$: CH$_2$NHCOCH=CH$_2$
MP-143: $R^{13}$: CH$_2$OCH$_3$; $R^{14}$: CH$_2$OH; $R^{15}$: CH$_2$NHCOCH=CH$_2$; $R^{16}$: CH$_2$O-n-C$_4$H$_9$
MP-144: $R^{13}$: CH$_2$O-n-C$_4$H$_9$; $R^{14}$: CH$_2$OCH$_3$; $R^{15}$: CH$_2$OH; $R^{16}$: CH$_2$NHCOCH=CH$_2$
MP-145: $R^{13}$: CH$_2$OH; $R^{14}$: CH$_2$OCH$_3$; $R^{15}$: CH$_2$NHCO(CH$_2$)$_7$CH=CH(CH$_2$)$_7$CH$_3$; $R^{16}$: CH$_2$NHCOCH=CH$_2$
MP-146: $R^{13}$: CH$_2$OH; $R^{14}$: CH$_2$OCH$_3$; $R^{15}$: CH$_2$NHCOCH=CH$_2$; $R^{16}$: CH$_2$NHCO(CH$_2$)$_7$CH=CH(CH$_2$)$_7$CH$_3$
MP-147: $R^{13}$: CH$_2$OH; $R^{14}$: CH$_2$NHCO(CH$_2$)$_7$CH=CH(CH$_2$)$_7$CH$_3$; $R^{15}$: CH$_2$NHCOCH=CH$_2$; $R^{16}$: CH$_2$OCH$_3$
MP-148: $R^{13}$: CH$_2$OCH$_3$; $R^{14}$: CH$_2$OH; $R^{15}$: CH$_2$NHCO(CH$_2$)$_7$CH=CH(CH$_2$)$_7$CH$_3$; $R^{16}$: CH$_2$NHCOCH=CH$_2$
MP-149: $R^{13}$: CH$_2$OCH$_3$; $R^{14}$: CH$_2$OH; $R^{15}$: CH$_2$NHCOCH=CH$_2$; $R^{16}$: CH$_2$NHCO(CH$_2$)$_7$CH=CH(CH$_2$)$_7$CH$_3$
MP-150: $R^{13}$: CH$_2$NHCO(CH$_2$)$_7$CH=CH(CH$_2$)$_7$CH$_3$; $R^{14}$: CH$_2$OCH$_3$; $R^{15}$: CH$_2$OH; $R^{16}$: CH$_2$NHCOCH=CH$_2$ (MP-151)-(MP-200)

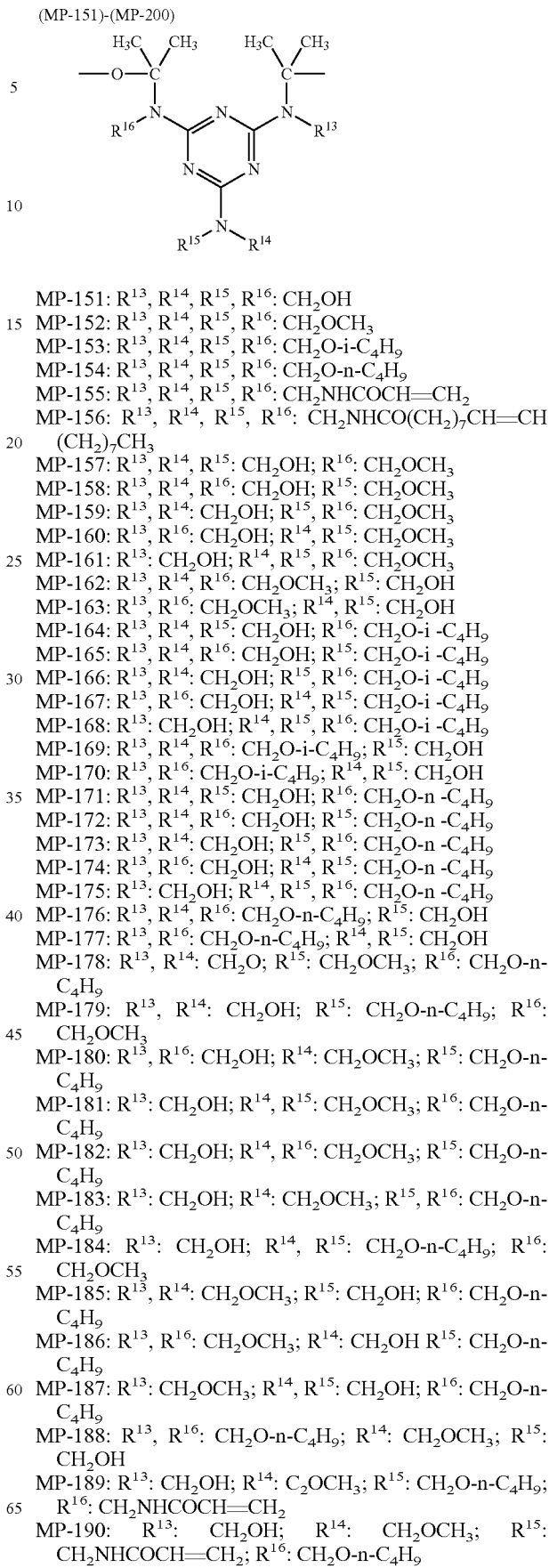

MP-151: $R^{13}, R^{14}, R^{15}, R^{16}$: CH$_2$OH
MP-152: $R^{13}, R^{14}, R^{15}, R^{16}$: CH$_2$OCH$_3$
MP-153: $R^{13}, R^{14}, R^{15}, R^{16}$: CH$_2$O-i-C$_4$H$_9$
MP-154: $R^{13}, R^{14}, R^{15}, R^{16}$: CH$_2$O-n-C$_4$H$_9$
MP-155: $R^{13}, R^{14}, R^{15}, R^{16}$: CH$_2$NHCOCH=CH$_2$
MP-156: $R^{13}, R^{14}, R^{15}, R^{16}$: CH$_2$NHCO(CH$_2$)$_7$CH=CH(CH$_2$)$_7$CH$_3$
MP-157: $R^{13}, R^{14}, R^{15}$: CH$_2$OH; $R^{16}$: CH$_2$OCH$_3$
MP-158: $R^{13}, R^{14}, R^{16}$: CH$_2$OH; $R^{15}$: CH$_2$OCH$_3$
MP-159: $R^{13}, R^{14}$: CH$_2$OH; $R^{15}, R^{16}$: CH$_2$OCH$_3$
MP-160: $R^{13}, R^{16}$: CH$_2$OH; $R^{14}, R^{15}$: CH$_2$OCH$_3$
MP-161: $R^{13}$: CH$_2$OH; $R^{14}, R^{15}, R^{16}$: CH$_2$OCH$_3$
MP-162: $R^{13}, R^{14}, R^{16}$: CH$_2$OCH$_3$; $R^{15}$: CH$_2$OH
MP-163: $R^{13}, R^{16}$: CH$_2$OCH$_3$; $R^{14}, R^{15}$: CH$_2$OH
MP-164: $R^{13}, R^{14}, R^{15}$: CH$_2$OH; $R^{16}$: CH$_2$O-i -C$_4$H$_9$
MP-165: $R^{13}, R^{14}, R^{16}$: CH$_2$OH; $R^{15}$: CH$_2$O-i -C$_4$H$_9$
MP-166: $R^{13}, R^{14}$: CH$_2$OH; $R^{15}, R^{16}$: CH$_2$O-i -C$_4$H$_9$
MP-167: $R^{13}, R^{16}$: CH$_2$OH; $R^{14}, R^{15}$: CH$_2$O-i -C$_4$H$_9$
MP-168: $R^{13}$: CH$_2$OH; $R^{14}, R^{15}, R^{16}$: CH$_2$O-i -C$_4$H$_9$
MP-169: $R^{13}, R^{14}, R^{16}$: CH$_2$O-i-C$_4$H$_9$; $R^{15}$: CH$_2$OH
MP-170: $R^{13}, R^{16}$: CH$_2$O-i-C$_4$H$_9$; $R^{14}, R^{15}$: CH$_2$OH
MP-171: $R^{13}, R^{14}, R^{15}$: CH$_2$OH; $R^{16}$: CH$_2$O-n -C$_4$H$_9$
MP-172: $R^{13}, R^{14}, R^{16}$: CH$_2$OH; $R^{15}$: CH$_2$O-n -C$_4$H$_9$
MP-173: $R^{13}, R^{14}$: CH$_2$OH; $R^{15}, R^{16}$: CH$_2$O-n -C$_4$H$_9$
MP-174: $R^{13}, R^{16}$: CH$_2$OH; $R^{14}, R^{15}$: CH$_2$O-n -C$_4$H$_9$
MP-175: $R^{13}$: CH$_2$OH; $R^{14}, R^{15}, R^{16}$: CH$_2$O-n -C$_4$H$_9$
MP-176: $R^{13}, R^{14}, R^{16}$: CH$_2$O-n-C$_4$H$_9$; $R^{15}$: CH$_2$OH
MP-177: $R^{13}, R^{16}$: CH$_2$O-n-C$_4$H$_9$; $R^{14}, R^{15}$: CH$_2$OH
MP-178: $R^{13}, R^{14}$: CH$_2$O; $R^{15}$: CH$_2$OCH$_3$; $R^{16}$: CH$_2$O-n-C$_4$H$_9$
MP-179: $R^{13}, R^{14}$: CH$_2$OH; $R^{15}$: CH$_2$O-n-C$_4$H$_9$; $R^{16}$: CH$_2$OCH$_3$
MP-180: $R^{13}, R^{16}$: CH$_2$OH; $R^{14}$: CH$_2$OCH$_3$; $R^{15}$: CH$_2$O-n-C$_4$H$_9$
MP-181: $R^{13}$: CH$_2$OH; $R^{14}, R^{15}$: CH$_2$OCH$_3$; $R^{16}$: CH$_2$O-n-C$_4$H$_9$
MP-182: $R^{13}$: CH$_2$OH; $R^{14}, R^{16}$: CH$_2$OCH$_3$; $R^{15}$: CH$_2$O-n-C$_4$H$_9$
MP-183: $R^{13}$: CH$_2$OH; $R^{14}$: CH$_2$OCH$_3$; $R^{15}, R^{16}$: CH$_2$O-n-C$_4$H$_9$
MP-184: $R^{13}$: CH$_2$OH; $R^{14}, R^{15}$: CH$_2$O-n-C$_4$H$_9$; $R^{16}$: CH$_2$OCH$_3$
MP-185: $R^{13}, R^{14}$: CH$_2$OCH$_3$; $R^{15}$: CH$_2$OH; $R^{16}$: CH$_2$O-n-C$_4$H$_9$
MP-186: $R^{13}, R^{16}$: CH$_2$OCH$_3$; $R^{14}$: CH$_2$OH $R^{15}$: CH$_2$O-n-C$_4$H$_9$
MP-187: $R^{13}$: CH$_2$OCH$_3$; $R^{14}, R^{15}$: CH$_2$OH; $R^{16}$: CH$_2$O-n-C$_4$H$_9$
MP-188: $R^{13}, R^{16}$: CH$_2$O-n-C$_4$H$_9$; $R^{14}$: CH$_2$OCH$_3$; $R^{15}$: CH$_2$OH
MP-189: $R^{13}$: CH$_2$OH; $R^{14}$: C$_2$OCH$_3$; $R^{15}$: CH$_2$O-n-C$_4$H$_9$; $R^{16}$: CH$_2$NHCOCH=CH$_2$
MP-190: $R^{13}$: CH$_2$OH; $R^{14}$: CH$_2$OCH$_3$; $R^{15}$: CH$_2$NHCOCH=CH$_2$; $R^{16}$: CH$_2$O-n-C$_4$H$_9$

MP-191: $R^{13}$: $CH_2OH$; $R^{14}$: $CH_2O\text{-}n\text{-}C_4H_9$; $R^{15}$: $CH_2NHCOCH=CH_2$; $R^{16}$: $CH_2OCH_3$ MP-192: $R^{13}$: $CH_2OCH_3$; $R^{14}$: $CH_2OH$; $R^{15}$: $CH_2O\text{-}n\text{-}C_4H_9$; $R^{16}$: $CH_2NHCOCH=CH_2$ MP-193: $R^{13}$: $CH_2OCH_3$; $R^{14}$: $CH_2OH$; $R^{15}$: $CH_2NHCOCH=CH_2$; $R^{16}$: $CH_2O\text{-}n\text{-}C_4H_9$ MP-194: $R^{13}$: $CH_2O\text{-}n\text{-}C_4H_9$; $R^{14}$: $CH_2OCH_3$; $R^{15}$: $CH_2OH$; $R^{16}$: $CH_2NHCOCH=CH_2$ MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$ MP-196: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$ MP-197: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$ MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$ MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$ MP-200: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ Copolymers in which at least two sorts of repeat units may be combined may be used. Further, at least two sorts of homo polymers and copolymers may be used simultaneously. Further, at least two sorts of compounds having 1,3,5-triadine rings may be used simultaneously. Furthermore, at least two sorts of discotic compounds (for example the compounds the compounds having 1,3,5-triadine ring and the compounds having porphyrin moiety) may be used simultaneously.

[Production Method of Cellulose Acylate Dispersion]

Explanations for a production method of a dispersion of cellulose acylate will be made with reference to FIG. 1 in the followings. In the production method, cellulose acylate particles (hereinafter particles) are dispersed inro the solvent. The solvent functions as a dispersing medium in producing the cellulose acylate dispersion, and as described below, functions as a swelling medium in preparing the swelling solution and as an original solvent in preparing the dope thereafter.

The solvent is contained in a solvent tank 11, and a valve 12 is opened to feed the solvent from the solvent tank 11 to a supply section 21 of a disperser 20. Note that the solvent in the present invention may be a mixture solution in which an additive solution 13 is previously mixed. In order to add the additives to the solvent, the additive solution 13 is fed to the solvent, or the additives may be directly fed into the solvent tank 11 without previously producing the additive solution, when the additives are liquid in the room temperature. When the additives are solid in the room temperature, the additives may be fed to the solvent tank 11 with use of a hopper, and the mixing is made in the solvent tank 11. Thus a solution of the additives and the solvent is obtained. In the present invention, the sort of the additives is not restricted in one.

When the solvent (solution) is fed to the supply section 21, the amount of the particles is measured with use of a hopper (as supplying device) 15 having a meter 14. The supply rate (as an amount in a unit time) of each of the solvent and the cellulose acylate particles is not restricted especially. However, in order to make the effects of the present invention of reducing the generation of the undissolved aggregates, the supply rate (kg/min) of the solvent is preferably in the range of 99:1 to 1:1, particularly 20:1 to 3:2, and especially 9:1 to 7:3. Further, in order to prepare the dope for the film production, the cellulose acylate solution (dope) in the range of 10 wt. % to 30 wt. % is obtained when the supply rate is in the range of 9:1 to 7:3.

The solvent and the particles are continuously fed to the supply section 21 of the disperser 20, and the shearing thereof is made in the shearing section 22 to obtain the dispersion. The shearing speed is not restricted especially. For example, when the dispersion is used as the dope for the film production described below, the shearing speed is in the range of $1 \times 10^3$ (1/sec) to $2 \times 10^5$ (1/sec). In this case, the dispersing in the solvent is made without generation of the undissolved aggregates from the particles. Note that the preferable shearing speed is in the range of $5 \times 10^3$ (1/sec) to $1 \times 10^5$ (1/sec).

The solvent and the particles to which the shearing is made in the shearing section 22 are discharged through the discharge section 23 out of the disperser 20. When the particles are slightly swollen in the solvent, the swelling solution is obtained. However, some of the particles aggregate to form the undissolved aggregates. In the present invention, the retention time of the solvent and the particles in the disperser 20 is less than 1 minute such that the particles are uniformly dispersed in the solvent before the swelling. It is preferable thereby that not only the dispersing but also the mixing of the particles is made to obtain the uniform mixture dispersion. Thus the generation of the undissolved aggregates are reduced. However, in order to make the dispersion and the mixing dispersion adequately, the retention time in the disperser 20 is preferably in the range of 1 second to 30 seconds.

In order to prevent an explosion of the dispersion in the disperser 20, especially in the shearing section 22, when the dispersion of the particles in the solvent is made, the density of oxygen is preferably at most 10 vol. %. As a method of decreasing the density of oxygen, there is a method in which a gas 24 is fed into the shearing section 22 of the disperser 20 and exhaust gases 24a, 24b, 24c are exhausted from the disperser 20. Note that it is especially preferable that the gas 24 is also fed to the supply section 21 and the discharge section 23. In this case, the sub reaction is not made, and therefore the denaturation of components of the dispersion or the solution is prevented. The sort of the gas is not restricted especially. However, it may be inert gas (rear gas such as helium, neon, argon, krypton, xenon, radon), nitrogen gas (which has low reactivity) and the like, and especially preferably nitrogen gas in view of the cost. Otherwise, as the method of decreasing the density of oxygen in the disperser, there is a method in which the pressure in the disperser 20 is made lower.

Further, a cooling device 25 is provided in the disperser 20, especially in the shearing section 22, such that the heat generation is prevented in the dispersing or the mix-dispersing of the particles in the solvent. The cooling temperature is not restricted especially. However, it is at least 5° C. when the dope for the film production is prepared from the dispersion. Note that the higher limit of the cooling temperature is preferably 10° C. lower than the boiling point of the used dope. When the mixture solvent is used as the solvent, the lowest boiling point of the used solvent components is taken as the standard value for determination of the higher limit of the cooling temperature.

In the above method, the cellulose acylate dispersion (which includes the mixture-dispersion) is obtained. The disperser 20 used in the present invention continuously feeds the solvent and the particles to the shearing section in which the shearing is made. Thus the dispersion is obtained and then discharged through the discharge section 23 out of the disperser 20. This method is applied, for example to a continuous kneader for powder and liquid that is illustrated in Japanese Patent Laid-Open Publication No.2002-191953. However, the disperser 20 is not restricted in it.

[Producing Method of Swelling Solution]

Preferably a shearing device (mixer or shearing mixer) 30 is provided downstream from the disperser 20 in order to progress the swelling of cellulose acylate particles dispersed as described above for preventing the generation of the undissolved aggregates in the aggregation. In order to cool the shearing device 30 (mixer, or shearing mixer), the mixer preferably has a jacket 31 in which a cooling medium 32a flows. After the cooling, a cooling medium 32b flows out from the jacket 31. Embodiments of cooling the shearing device 30 are not restricted in a heat exchanger type in which a cooling medium flows in the jacket.

The temperature of the shearing device 30 is lower than the boiling point of the solvent of the dispersion. Thus the evaporation of the solvent of the dispersion is prevented, and the generation of the skinning in the mixer is reduced. Note that when plural solvents are contained in the dispersion, the temperature is preferably less than the lowest boiling point of the used compounds.

The flowing time of the dispersion (or dispersion mixture) from the discharge section 23 of the disperser 20 to the shearing device 30 is preferably at most 1 minute. Especially preferably the disperser 20 and the shearing device 30 are inline type, and after the production of the dispersion, it is preferably fed to the shearing device 30 soon. Thereby, it is preferable in the dispersion during the supply thereof to the shearing device 30 that the swelling is not progressed into a center of each particle, in order to make the shearing effectively. When the shearing is made too much also in the center of the particle, the particle becomes soft and easily passes through the shearing device 30. When the flowing time is more than one minute, the swelling is made too much, and the shearing in the shearing device 30 is not made effectively. Further, When the flowing time is more than one minute, the cellulose acylate particles contain the solvent and are swollen to form the gel-like materials. When part of the gel-like materials is solidified, a flow path is occluded, and the continuous flow becomes impossible.

In the shearing device 30, the shearing is made at the shearing speed in the range of $1\times10^3$ (1/sec) to $2\times10^5$ (1/sec). When the shearing speed is less than $1\times10^3$ (1/sec), the shearing of the dispersion is not made enough, and sometimes the cellulose acylate particles are sometimes not swollen uniformly in the solution. Further, when the shearing speed is more than $2\times10^5$ (1/sec), the polymer decomposes, and the molecular weight becomes lower.

The particles become smaller during the shearing in the shearing device 30 although the dispersing of the particles and the solvent is mainly made in the disperser 20. When the particle becomes smaller, the dissolution is easily made in the swelling. Therefore when the selling time is longer, the effect becomes larger. Accordingly, it is preferable that the retention time of the dispersion (or the dispersion mixture) in the shearing device 30 is preferably at least 30 seconds.

The particles are swollen in the dispersion so as to obtain a swelling solution. Concretely in the present invention, the technical worker having knowledge of chemistry enough samples about 5 L of the solution, and observes it with eyes to judge whether there are no cellulose acylate particles and the undissolved aggregates are not generated.

[Production Method of Dope]

The swelling solution described above is fed through a pipe to a dope production apparatus 35 with use of a pump 33. The dope production apparatus 35 produces from the swelling solution the dope used for forming a film. A production method of the dope is not restricted, and may be one of the well-known methods. Concretely, there are a heat-dissolving method, a cool-dissolving method, and a dissolving method in which the dissolution is made in the room temperature. In the followings, the explanations for these three dissolving methods will be made.

(Heat-Dissolving Method)

The swelling solution is heated to a temperature in the range of 60° C. to 240° C. under the pressure from 0.2 MPa to 30 MPa. The temperature range is preferably in the range of 80° C. to 220° C., especially 100° C. to 200° C., and the most especially 100° C. to 190° C. In the heating, the steam may be used with application of a high pressure thereto, and otherwise, an electric source may be used. Further, it is preferable to feed the swelling solution through a pressure tight pipe to a pressure tight vessel. The pressure tight pipe and the pressure tight Vessel are made of stainless or iron, but the sorts of the materials are not restricted especially.

The dope produced from the swelling solution under the condition of the high pressure and the high temperature is cooled for using for forming the film. The cooling temperature is at most the boiling point of the solvent of the dope. Thus the solvent hardly evaporates and the fluctuation of a composition ratio of the dope becomes smaller. Further, when the mixture solution is used, the lowest boiling point in the solvent is the standard value. Further, it is preferable for easiness of operation that the pressure is made back to the atmospheric pressure with cooling to the range of −10° C. to 55° C. Note that in the cooling, the vessel and the pipe of the dope production apparatus 35 may be disposed in the room temperature, and cooled with use of cooling water as a cooling medium.

In order to improve the solubility in the production of the dope, it is effective to repeat the heating and the cooling. The judgment whether the dope is obtained is made in observation with eyes. Thereby when the cellulose acylate in a gel-like state is not observed, it is judged that the dope is produced. In the heat dissolution, an airtight vessel is used for preventing the fluctuation of the composition ratio caused by the evaporation of the solvent. Note that it is preferable to use the methods described as in Japanese Patent Laid-Open Publications No.11-322946 and No.11-322947. However, the heat-dissolving method already known may be used for producing the dope.

(Cool-Dissolving Method)

At first, the swelling solution is cooled to a temperature in the range of −100° C. to −10° C. The cooling temperature is preferably in the range of −100° C. to −30° C., particularly −100° C. to −50° C., and especially −90° C. to −60° C. The cooling is made with a cooling medium, for example a dry ice methanol bath (−75° C.), with a chlorofluorocarbon type cooling medium mechanically cooled, a fluorine type cooling medium, fluorinate (trade name, produced by Sumitomo 3M Ltd.). When the cooling temperature is in the above range, the swelling solution is solidified. The swelling solution obtained in the shearing device 30 is preferably fed to the dope production apparatus 35 for the cool-dissolution soon. Thereby it is preferable to cool the dope production apparatus 35 to the temperature in the above range before feeding the swelling solution. Thus the uniform dope is obtained from the swelling solution. When the dope is not uniformly cooled, the undissolved aggregate is provably generated.

Preferably, the cooling speed is higher. However, it is not especially restricted when the cooling is practically made at a high speed at least about 100° C./sec. Note that in the present invention that the cooling speed is a value obtained by dividing a difference between the temperature at start of the cooling and the predetermined temperature by time period for shift of the temperature from the start value to the predetermined one. Note that the time period for cooling the swelling solution at the lowest cooling temperature is not restricted especially, and determined depending on the inner size of the cooling tank and the volume of the supplied swelling solution.

The temperature is made higher in the heating after the cooling, the dope is obtained, in which the cellulose acylate flow in the solvent. The temperature becomes higher in the range of 0° C. to 200° C., preferably 0° C. to 150° C., especially 0° C. to 120° C., and more especially 0° C. to 50° C. Note that the temperature may be increased by disposing the vessel for the cooling in the room temperature, by heating in the hot water bath, or with use of a heating apparatus. Note that there are not any problems especially, although the solvent in the dope evaporates and the pressure becomes from 0.3 MPa to 30 MPa larger. However, in order to make the time period under higher pressure shorter, the heating time for increasing the temperature is preferably in the range of 0.5 minutes to 60 minutes, and especially preferably in the range of 0.5 minutes to 2 minutes.

Note that the cooling and the heating are repeated in this order when the particles are not entirely dissolved even after the one performance of the cooling and the heating. Thus the dope is obtained. In order to judge whether the dope is obtained, the technical worker observes with eyes. Further, when the cool-dissolution is performed, it is preferable to use the tightly closed vessel in the dope production apparatus 35, such that the dew condensation water generated in the cooling may not intrude. In the processes of the cooling and the heating, when the pressure in the tightly closed vessel is made higher in the cooling and lower in the heating, the time period for producing the dope can be shorter. The cool-dissolving method described above is preferably made in the manner concretely described in Japanese Paten Laid-Open Publications No.9-95544 and No. 10-95854. However, the cool-dissolving method is not restricted in the method described in these publications.

(Dissolving Method in Room Temperature) In the present invention, the dope production method of producing the dope from the swelling solution is not restricted in the above heat-dissolving and cold dissolving methods. In the followings, the dissolving method in room temperature will be explained. In the dissolving method in room temperature, it is not necessary to use a special devices (for example high speed cooler, pressure tight vessel and the like) in the dope production apparatus 35. The temperature of the swelling solution is kept in the range of 0° C. to 55° C., namely in the range of the room temperature ±about 25° C., and the stirring is made enough with the stirrer to produce the dope from the swelling solution. When the swelling solution is stirred, the gel-like materials of cellulose acylate contain the solvent more. Thus the dope is obtained. In the dissolving method in room temperature, the cellulose acylate particle contains the enough quantity of the solvent and dissolves. Therefore, the time period of performing this method must be longer than the other methods. For example the stirring is continuously made for 3 hours, for example. However, in the dissolving method in room temperature, the special devices are not used, the heating temperature is not too high, and the cooling temperature is not too low. Therefore the decomposition of the elements or composition of the swelling solution that is caused in rapid temperature variation is reduced.

The judgment whether there are undissolved aggregates in the dope is made in the same manner as that in case of the swelling solution. Namely, the technical worker samples about 5 L of the dope and observes it with eyes. When the cellulose acylate particles are not found and the undissolved aggregates are not generated, the dope can be used in the film production.

[Solution Casting Method]

A filtration apparatus 36 removes impurities from the dope produced in the dope production apparatus 35 as shown in FIG. 1. Then, the film is produced with a film production equipment 50. A dope 51 is fed through a pipe 52 to a storing tank 53 which is connected through a pump 54 and the filtration apparatus 55 to a casting die 56. Further, a stirrer 57 is attached to the storing tank 53 and rotated by a motor (not shown) to stir and make the dope 51 uniformly. The plasticizers and the UV-absorbing agents may be added to the dope 51 in the storing tank 53. Thereby the additives in a solid or liquid state, or otherwise the additive solution of the additives may be added.

Below the casting die 56, there is a belt 60 supported by rollers 58, 59. The belt 60 continuously moves in accordance with the rotation of the rollers 58,59 driven by a driver (not shown). The dope 51 is fed from the storing tank 53 by the pump 54, and supplied to the casting die 56 after the removal of the impurities by the filtration apparatus. The dope 51 is cast on the belt 60 with use of the die 56 to form a casting film 61. The casting is made such that a film thickness is in the range of 30 µm to 200 µm. Further, the present invention is adequate for the case that a film as a production may has width in the range of 1400 mm to 1800 mm. However, the present invention is applied to the case that the width is more than 1800 mm. Note that the casting film is often called a gel-like film. The casting film 61 is gradually dried on the belt 60 to have self-supporting properties, and peeled from the belt 60 as a film 63 with support of a peeling roller 62.

The film 63 is transported by a tenter device (tenter type drying device) 64. Note that it is preferable thereby to stretch the film 63 in at least one of width and lengthwise directions to have a predetermined width. Thus the quality of the film 63 is improved. The film 63 is transported from the tenter device 64 to a drying chamber 66 in which many rollers 65 are provided. The film after the drying is cooled in a cooling chamber 67, and wound by a winding apparatus 68. Note that the cooling temperature in the cooling chamber 67 is not restricted especially. However, the cooling temperature is preferably the room temperature for easy treatment. Side edge portions of the film 63 transported from the cooling chamber 67 may be cut off, and the knurling may be made. Further, the support is the belt in FIG. 2. However, a rotary drum may be used in the present invention.

As described above, it is preferable in the present invention that the feeding of the solution (including the dispersion and the swelling solution) is continuously made. Namely, the feeding is especially preferably not stopped between the supply of the solution and the solute into the dispersion and the feed of the dope 51 into the storing tank 53. When the production speed of the dope varies, the flow rate of the solution becomes lower, and thereby the solute such as cellulose acylate contained in the solution precipitates at the wall contacting to the solution in the dope production equipment 35. When the flow rate becomes higher, the precipitated solute are dipped in the solution, but often don't dissolve to the solution to remain as the gel-like materials. When the film is produced from the dope containing the gel-like materials, the film has defect in the luminescent spot, and cannot be used as a film product.

Figure 2:
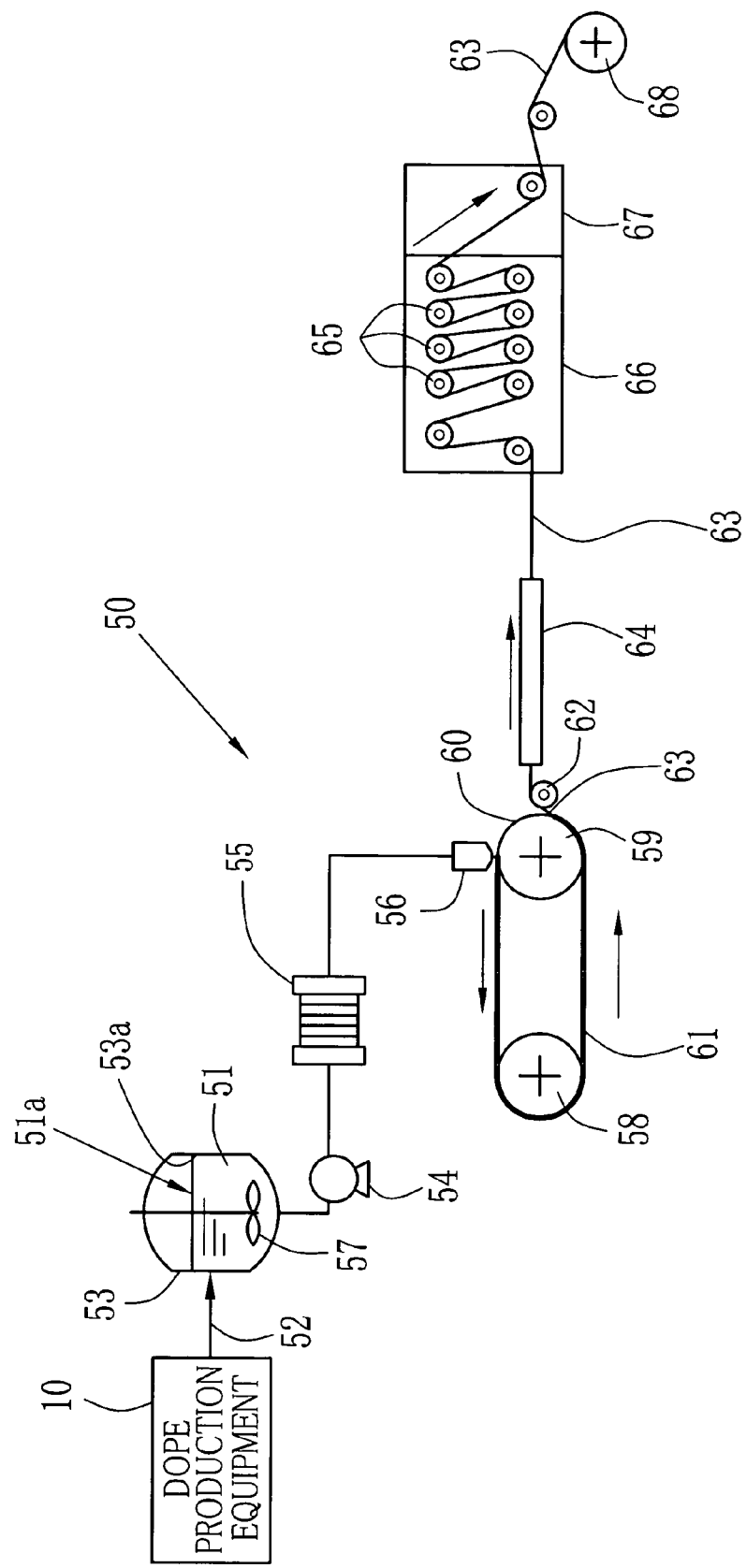
FIG. 2 is a schematic diagram of one embodiment of film production equipments to which a solution casting method is applied.

Especially preferable in the present invention, the dope is produced with the dope production equipment 10 (see FIG. 1) according to the casting speed from the casting die (see FIG. 2). Namely, also in the preferable embodiment explained previously, the level of a liquid surface 51a of the dope 51 shifts in the tank (FIG. 2), and the solutes precipitates on an inner wall 53a of the storing tank 53. When the precipitated solutes are contained in the dope again in the upward shifting of the liquid surface 51a, the solutes does not dissolve entirely, and remains as a foreign materials called skinning. As the skinning causes the defect of luminescent pint on the film surface, it is important to prevent the generation of the skinning.

[Film Producing Method with Formation of Plural Layers]

The solution casting method described above is the casting method for forming a single layer with use of the casting die 56 for casting the one dope. However, the solution casting method with use of the dope of the present invention is not restricted in the above embodiment, for example, may be the casting method for forming plural layers. The embodiment of them will be explained in the following with reference to a figure. Note that the explanations and the illustration of the same members will be omitted as the film production equipment 50 in FIG. 2.

FIG. 3 is a partial sectional view of the film production equipment that explains for the co-casting method. The casting die 83 is a multi-manifold type having plural manifolds 80,81,82, into which dopes 84,85,86 are respectively supplied. Note that the pipes for feeding the dopes are not illustrated. Thereafter, the dopes 84-86 are joined at a joining point 87, and cast on a belt 88 to form a casting film 89. Then the casting film 89 is dried. Thus the film is obtained.

The other embodiment of the co-casting method will be explained with reference to FIG. 4. A feed block 101 is attached to an upstream side of a casting die 100. The feed block 101 is connected through pipes 101a-101c to a dope feeding device (not shown), and dopes 102-104 are fed from the dope feeding device to the feed block 101 and joined therein. Thereafter, the dopes 102-104 are cast on a belt 105 with use of a casting die 100 to form a casting film 106. Thereafter, the casting film 106 is dried and a film is obtained. Note that a rotary drum may be used as the support instead of the belts in FIGS. 3.&4.

Figure 5:
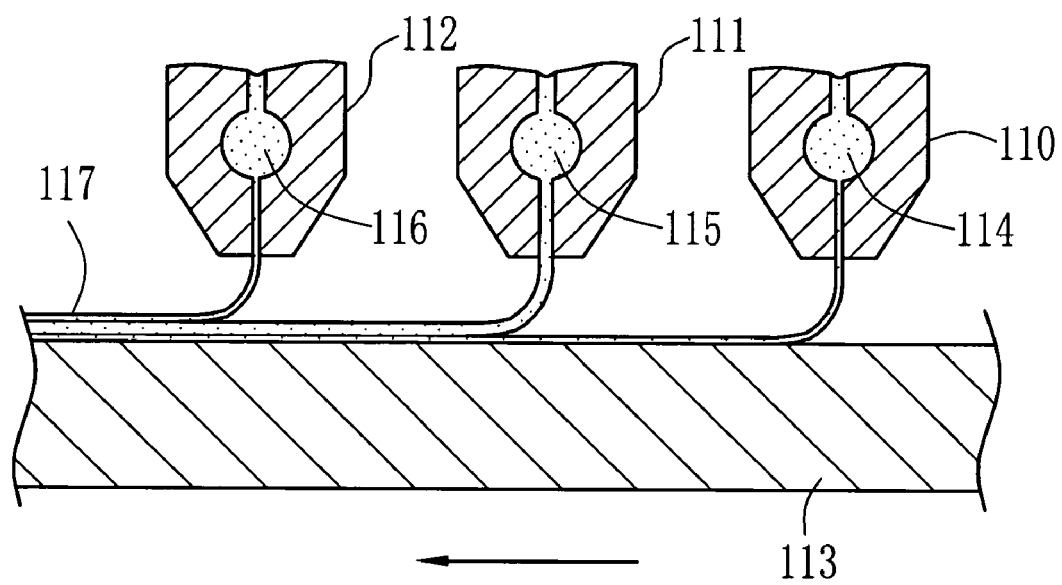
FIG. 5 is an explanatory view illustrating a situation of casting the dope with use of a third embodiment of plural casting dies.

Then a sequentially casting method will be explained in reference to FIG. 5. Three dies 110-112 are disposed on a belt 113. Dopes 114-116 are respectively fed into casting dies 110-112, and cast on a belt 113 to form a casting film 117. Then the casting film 117 is dried and the film is obtained. Note that the present invention can be applied to a combination of the co-casting method and sequentially casting method.

In each solution casting method for forming plural layers, at least one of the dopes for the plural layers is preferably the dope of the present invention. It is especially preferable to use the dope of the present invention for forming all of the plural layers.

[Film]

The film obtained in one of the above solution casting methods is cut and sampled, such that the sample may be 5 cm². Thus 5 samples are obtained, and observed in cross-nicol arrangement. In the observation, a size and a number of the luminescent spot is obtained, and the averaged values thereof are calculated. On the basis of the averaged values, it is determined whether the generation of the undissolved aggregates in the dope is reduced. For example, in the film used for the film base of a photosensitive material, when the size is at least 20 μm, the number is at most 0 in 5 cm². Further, when the area is at least 10 μm and less than 20 μm, the number is at most 10 in 5 cm², and when the area is at least 5 μm and less than 10 μm, the number is at most 10 in 5 cm². The film obtained in the embodiment of the present invention satisfies the above conditions according to the defects of the luminescent spot, and therefore can be used for optical products, such as the film base of the photosensitive materials, a protective film for the polarizing filter, and an optical function film.

The optical properties of the obtained film 63 are estimated by measuring the retardation (Rth) in the thickness direction. For example, when the film 63 is used as the protective film for the polarizing plate, The Rth in 100 μm of the film 63 is preferably in the range of 0 nm to 600 nm, particularly 0 nm to 400 nm, and especially 0 nm to 250 nm. The present invention is adequate for obtaining the film whose Rth is in the range of 10 nm to 50 nm. Therefore the produced film is preferably used for the protective film for the polarizing filter. Note that the Rth is calculated from the following formula:

$$Rth=\{(nx+ny)/2-nz\}\times d \quad (1)$$

In this formula, nx, ny,nz are the respective refractive indexes in widthwise, lengthwise and thickness directions of the film, and measured in illumination of 632.0 nm with use of elipsometer (polarization analyzer). Further, d (mm) is a average thickness of the film.

[Product]

The film obtained in the solution casting method of the present invention has no defect of luminescent spot and quality of the film surface is very good. Therefore the film can be used as the protective film for the polarizing filter. When the protective films are adhered to both surfaces of a polarized film formed of polyvinyl alcohol, the polarizing filter is obtained. Further, the film can be used for such as an optical compensation film in which an optical compensation sheet is adhered to the film, and an optical function film such as the antireflective film in which antiglare layer is formed on the film. These products can construct a part of the liquid crystal display.

In the followings, the examinations of the present invention will be explained. However, the embodiment of the present invention is not restricted in them. Note that the explanation is made in detail of Example 1. Then the explanations of the same conditions of Examples 2&3 will be omitted as Example 1.

EXAMPLES

Experiment 1

In Experiment 1, the dope is produced from the materials of the following contents.

| | |
|---|---|
| Cellulose triacetate | 17 pts. wt. |

(Powder; degree of substitution, 2.83; viscometric average degree of polymerization, 320; moisture content, 0.4 wt. %; viscosity of 6% by mass of methylelchloride solution, 305 mPa.s; averaged particle diameter, 1.5 mm; standard deviation, 0.5 mm.)

| | |
|---|---|
| Methylenechloride (water content, at most 0.2 wt. %) | 63 pts. wt. |
| Methanol (water content, at most 0.2 wt. %) | 5 pts. wt. |
| Ethanol (water content, at most 0.2 wt. %) | 5 pts. wt. |

-continued

| | |
|---|---|
| n-butanol | 5 pts. wt. |
| (water content, at most 0.2 wt. %) | |
| Plasticizer A | 1.2 pts. wt. |
| (dipentaerythrytholhexaacetate) | |
| Plasticizer B (Triphenyl phosphate) | 1.2 pts. wt. |
| UV-absorbing agent a | 0.2 pts. wt. |
| (2,4-bis-(n-octylthio)-6-(4-hydroxy-3,5-di-tert-butylanilino)-1,3,5-triazine) | |
| UV-absorbing agent b | 0.2 pts. wt. |
| (2-(2'-hydroxy-3',5'-di-tert-butylphenyl)-5-chrolobenzotriazol) | |
| UV-absorbing agent c | 0.2 pts. wt. |
| (2-(2'-hydroxy-3',5'-di-tert-amilphenyl)-5-chrolobenzotriazol) | |
| $C_{12}H_{25}OCH_2CH_2OP(=O)(OK)_2$ | 0.4 pts. wt. |
| Particles | 0.05 pts. wt. |
| (silica having diameter of 20 nm, and Mohrs hardness about 7) | |

Cellulose triacetate powder (flakes) and a solution of the plasticizers A and B were supplied to a continuous disperser (MWJ 300 type, produced by Funken Pawtechs, Inc.) as the disperser 20 such that the quantity rate of cellulose triacetate might be 90 kg/h. The retention time in the disperser 20 was 20 seconds and the temperature was 30° C. The obtained mixture dispersion was continuously sheard in 30 minutes at 300 rpm in an inline mixer (Hivis Line Mixer SL type, produced by Tokushukika Kogyo Co., Ltd.). Thus the cellulose acetate flakes were swollen, and the swelling solution was obtained. The retention time in the inline mixer was 1 minute. Thereafter, the dissolution of cellulose triacetate was made at 80° C. and 1 MPa in the tightly closable vessel (dope production machine) 35. Thus the dope was obtained. The filtration of the dope was made with use of the filtration apparatus 36 having a filter paper (advantech #63). The water content in the dope was 0.2 wt. %. The additives such as the UV-agents and the like were added to the dope thereafter. In the apparatus, nitrogen was added and the content of oxygen was 5 vol. %.

The produced dope as the cellulose triacetate solution was observed with eyes, and the undissolved aggregates were not generated. Therefore the cellulose triacetates were dissolved uniformly and the quality of the dope was good.

The film 63 was produced from the dope 51 with use of the film production equipment 50 in FIG. 2. The dope 51 was continuously supplied at 540 kg/hr from the dope production equipment 10 through the pipes 52 into the storing tank 53. The dope 51 of 30° C. was cast from the casting die 56 to the belt 60 which was moved by the rollers 58, 59 at 20° C., such that the film 63 after the drying might have the thickness of 40 µm. After the casting film 61 had the self-supporting property, it was peeled as the film 63 from the belt 60. The film 63 was dried for two minutes by the tenter device 64 with stretching. Further, the film 63 was transferred into the drying chamber 66 whose temperature was regulated in the range of 80° C. to 140° C. Then the film 63 was transported for ten minutes in the drying chamber with contact to the rollers 65. Thereafter, the film 63 was transported to the cooling chamber 67, and the temperature of the film 63 was decreased to 25° C. and wound by the winding apparatus 68.

(Estimation of Film)

The retardation Rth in thickness of the obtained film 63 was measured. The measured value was 15 nm. The film obtained in Experiment 1 was excellent in the optical properties.

Experiment 2

In Experiment 2, the dope is produced from the materials of the following contents.

15 pts.wt. of Cellulose triacetate was used. This cellulose triacetate had 2.82 of degree of substitution, 320 viscometric average degree of polymerization, 0.2 wt. % of moisture content. The viscosity of 6% by mass in methylelchloride solution was 305 mPa.s. The averared particle diameter was 1.5 mm, and the standard deviation was 0.5 mm. Further, the content of other materials was: remaining acetylic acid, at most 0.1 wt. %; Ca, 0.05 wt. %; Mg, 0.007 wt. %; and Fe, 5 ppm. The substitution degree of the acetyl group at $6^{th}$ position was 0.95, and 32.2% in total acetyl groups. Further, the weight percentage of the material extracted with acetone was 11 wt. %, and the ratio of the weight average molecular weight to the number average molecular weight were 0.5. The fluctuation was constant. Further, the haze was 0.08, transparency was 93.5%, Tg was 160° C., a calorific value in crystallization was 6.0 J/g.

| | |
|---|---|
| Methyl acetate | 58 pts. wt. |
| (water content, at most 0.2 wt. %) | |
| Acetone | 5 pts. wt. |
| (water content, at most 0.2 wt. %) | |
| Methanol | 6 pts. wt. |
| (water content, at most 0.2 wt. %) | |
| n-butanol | 5 pts. wt. |
| (water content, at most 0.2 wt. %) | |
| Plasticizer A | 1 pts. wt. |
| (ditrimethylolpropanetetraacetate) | |
| Plasticizer B (Triphenyl phosphate) | 1 pts. wt. |
| Plasticizer C (biphenyldiphenylphosphate) | 0.2 pts. wt. |
| Plasticizer D | 0.2 pts. wt. |
| (ethylphthalylgrycol ethylester) | |
| UV-absorbing agent a | 0.2 pts. wt. |
| (2,4-bis-(n-octylthio)-6-(4-hydroxy-3,5-di-tert-butylanilino)-1,3,5-triazine) | |
| UV-absorbing agent b | 0.2 pts. wt. |
| (2-(2'-hydroxy-3',5'-di-tert-butylphenyl)-5-chrolobenzotriazol) | |
| UV-absorbing agent c | 0.2 pts. wt. |
| (2-(2'-hydroxy-3',5'-di-tert-amilphenyl)-5-chrolobenzotriazol) | |
| Particles | 0.05 pts. wt. |
| (silica having diameter of 20 nm, and Mohrs hardness about 7) | |
| citric acid monoethyl ester | 0.04 pts. wt. |

Cellulose triacetate particles (flakes) of 77.6 kg, a solution of the plasticizers A and B were supplied to the continuous disperser (MWJ 300 type, produced by Funken Pawtechs, Inc.) as the disperser 20 such that the supply rate of the solution might be 440 kg/h. The retention time in the disperser 20 was 20 seconds and the temperature was 30° C. The obtained mixture dispersion was continuously sheared in 30 minutes at 3000 rpm in an inline mixer (Hivis Line Mixer SL type, produced by Tokushukika Kogyo Co., Ltd.). Thus the cellulose acetate flakes were swollen, and the swelling solution was obtained. The retention time in the inline mixer was 1 minute. The water content in the dope was 0.2 mass %. Thereby, the content of oxygen in the disperser 20 was kept at 5 vol. % as the situation for protection to the explosion.

The dope was produced from the obtained gel-like swelling solution in the cool-dissolving method described above. The swelling solution was fed with use of a screw pump in which the temperature of a center of a shaft was 30° C. Further the outer surface of the screw was cooled, and the swelling solution flew for three minutes in cooled portions at −75° C. The cooling was made with use of a cooling medium cooled at −80° C. The solution obtained by cooling was fed by the screw pump, and thereby heated to 35° C. Then the solution was supplied to a stainless tank, in which the solution was stirred at 50° C. for two hours. Thus the solution became uniform. The filter paper was #63, produced by Toyo Roshi Kaisha Co., Ltd, and the filtration accuracy thereof was 0.01 mm.

The produced dope as the cellulose triacetate solution was observed with eyes, and the undissolved aggregates were not generated. Therefore the cellulose triacetates were dissolved uniformly and the quality of the dope was good. As described above, in the dope production method of the present invention, the generation of the undissolved aggregates was also reduced, when the main solvent is metylacetate as non-chlorine solvent, to which cellulose triacetate hardly dissolves.

The film 63 was produced from the dope 51 with use of the film production equipment 50 in FIG. 2. The dope 51 was supplied at 517.6 kg/hr from the dope production equipment 10 through the pipes 52 into the storing tank 53. The dope 51 of 40° C. was cast from the casting die 56 to the belt 60 which was continuously moved by the rollers 58, 59 at 15° C., such that the film 63 after the drying might have the thickness of 40 μm. After the casting film 61 had the self-supporting property, it was peeled as the film 63 from the belt 60. The film 63 was dried for two minutes by the tenter device 64 with stretching. Further, the film was transferred into the drying chamber 66 whose temperature was regulated in the range of 80° C. to 140° C. Then the film was transported for ten minutes in the drying chamber with contact to the rollers 65. Thereafter, the film 63 was transported to the cooling chamber, and the temperature of the film 63 was decreased to 25° C. and wound by the winding apparatus 68.

(Estimation of Film)

The retardation Rth in thickness of the obtained film 63 was measured. The measured value was 20 nm. The film obtained in Experiment 2 was excellent in the optical properties.

Experiment 3 (for Comparison)

The dope was produced from materials of the same contents as in Experiment 1. The production method was the batch method explained below.

While the solution containing the additives were stirred with the stirring device in stainless dissolution tank of 4000 L, the cellulose triacetate flakes were gradually added such that the total weight may be 2000 kg. First, the cellulose triacetate flake stirred and mixed in a stainless tank. The stainless tank had an eccentricity stirrer of a dissolver type and an anchor stirrer. The pressure inside the tank was reduced to be 1300 Pa. Then the cellulose triacetate flake was stirred for thirty minutes by the rotation of the eccentricity stirrer at 15 m/sec and the rotation of the anchor stirrer at 1 m/sec. The stirring started at 20° C. of the solution, and the outside of the stirring device was cooled such that the last temperature may be 35° C. When the stirring was end, the high speed stirring with a stirring shaft of the dissolver type was stopped. Thereafter, the stirring was made for 100 minutes at the 0.5 m/sec rotating speed of the anchor stirrer. The swelling of cellulose triacetate was made to obtain the swelling solution, in which the water content was 0.1 wt. %. When the observation of the swelling solution was made, and about 10 undissolved aggregates from 5 mm to 10 mm generated.

Antireflection films as the optical function films were produced with use of the films of Experiments 1&2.

(Preparation of Coating Solution A for Antiglare Layer)

In order to prepare a coating solution A for an antiglare layer, a mixture (DPHA, produced by NIPPON KAYAKU CO., LTD.) was used, in which dipentaerythritol pentaacrylate and dipentaerythritol hexaacrylate were mixed. The mixture of 125 g and bis(4-metacryloil thiophenyl) sulfide (MPSMA, produced by SUMITOMO SEIKA CHEMICALS CO., LTD.) of 125 g were dissolved in a mixture solvent of 439 g that contained methylethylketone of 50 wt. % and cyclohexanone of 50 wt. %. Thus a first solution was obtained. Further, second solution was prepared. In the second solution, a photoinitiator for radical polymerization (IRGACURE 907, produced by Chiba Gaigy Japan Limited) of 5.0 g and photo polymerization initiator (KAYACURE DETX, produced by NIPPON KAYAKU CO., LTD.) of 3.0 g were dissolved in methylethyl ketone of 49 g. The second solution was added to the first solution to obtain an added solution. The added solution was coating and thereafter cured with ultraviolet ray to obtain a coating layer, which had reflective index of 1.60.

Further, crosslinked polystyrene particles (name of product: SX-200H, produced by Soken Chemical & Engineering Co., Ltd.) of 10 g, whose average particle diameter was 2 μm, were added to the added solution, and this mixture was stirred to disperse the crosslinked polystyrene particles with a high speed stirrer for an hour. The stir speed thereof was 5000 rpm. Thereafter, the filtration of the dispersed solution was made with a polypropylene filter having pores whose diameter each was 30 μm. Then the coating solution A for antiglare layer was obtained.

(Preparation of Coating Solution B for Antiglare layer)

A mixture solvent containing cyclohexanone of 104.1 g and methylethyl ketone 61.3 g was stirred with an air stirrer. Thereby to the mixture solvent were added a coating solution for hard coat that contains DeSolite KZ-7886A (containing zirconium oxide dispersion, and produced by JSR corporation) of 217.0 g. Thus an added solution was obtained. Then it was cast and thereafter cured with ultraviolet ray to obtain a coating, which had refractive index of 1.61. Further, crosslinked polystyrene particles (name of product: SX-200H, produced by Soken Chemical & Engineering Co., Ltd.) of 5 g, whose average particle diameter was 2 μm, were added to the added solution, and this mixture was stirred to disperse the crosslinked polystyrene particles with a high speed stirrer for an hour. The stir speed thereof was 5000 rpm. Thereafter, the filtration of the dispersed solution was made with a polypropylene filter having pores whose diameter each was 30 μm. Then the coating solution B for antiglare layer was obtained.

(Preparation of Coating Solution C for Antiglare Layer)

In order to prepare a coating solution C for an antiglare layer, Methylethyl ketone and cyclohexanone were mixed in ratio of 54 wt. % and 46 wt. % for using as the solvent. Further, amixture (DPHA, produced by NIPPON KAYAKU CO., LTD.) was used, in which dipentaerythritol pentaacrylate and dipentaerythritol hexaacrylate were mixed. The solvent of 52 g was supplied with 91 g of the mixture, 199 g of hard coat solution containing zirconium oxide (DeSolite KZ-7115, produced by JSR corporation), and 19 g of hard coat solution containing zirconium oxide (DeSolite KZ-7161, produced by JSR corporation). Thus the mixture was dissolved to obtain a mixed solution. Then in the mixed solution was dissolved a photo polymerization initiator (IRGACURE 907, produced by Chiba Gaigy Japan Limited) of 10 g to obtain an added solution. The added solution was coated and thereafter cured with ultraviolet ray to obtain a coating, which had refractive index of 1.61.

Further, crosslinked polystyrene particles (name of product: SX-200H, produced by Soken Chemical & Engineering Co., Ltd.) of 20 g, whose average particle diameter was 2 μm, were added to a mixture solvent of 80 g, in which methylethylketone of 54 wt. % and cyclohexanone of 46 wt. % were mixed. This solution was stirred to disperse the crosslinked polystyrene particles with high speed stirrer of 5000 rpm for an hour, and added to the added solution to obtain the dispersed solution. Thereafter, the filtration of the dispersed solution was made with a polypropylene filter having pores whose diameter each was 30 μm. Then the coating solution C for antiglare layer was obtained.

(Preparation of Coating Solution D for Hard Coating)

In order to prepare a coating solution D for a hard coating, Methylethylketone of 62 g and cyclohexanone of 88 g were mixed for using as the solvent. Then, UV-ray curable hard coat composition (DeSolite KZ-7689, 72 wt. %, produced by JSR corporation) of 250 g was dissolved to the solvent. This obtained solution was coated and cured in ultraviolet ray to form a coating layer, which had refractive index of 1.53. Further, the solution was filtrated with a polypropylene filter having pores whose diameter each was 30 μm. Then the coating solution D for hard coating layer was obtained.

(Preparation of Coating Solution E for Low Reflective Index Layer)

MEK-ST of 8 g (average diameter of particles was 10 nm-20 nm, $SiO_2$ sol dispersion of methylethylketone, whose solids content degree was 30 wt. %, produced by Nissan Chemical Industries Co., Ltd.) and methylethylketone of 100 g were added to heat-closslinkage polymer (TN-049, produced by JSR Corporation) of 20093 g containing fluoride that had refractive index of 1.42. This mixture was stirred and filtrated with a polypropylene filter having pores whose diameter was 1 μm. Thus the coating solution E for low refractive index layer was obtained.

A surface of the cellulose triacetate film of 80 μm thickness that was produced in the above explained method was coated with the coating solution D by using a bar coater, and thereafter dried at 120° C. Then an UV light was applied to the coating layer on the film with air-cooled type metal halide lamp of 160 W/cm (produced by Eyegraphics Co., Ltd.). The illuminance was thereby 400 mW/cm$^2$, and illumination density was 300 mJ/cm$^2$. Thus the coating was cured to form the hard coat layer of thickness of 2.5 μm on the film.

Further, the coating solution A was applied on the hard coat layer on the film with the bar coater. The coating solution A was dried and cured in the same conditions as in forming the hard coat layer (namely in application of UV light). Thus the antiglare layer A of 1.5 μm was formed. Furthermore, the antiglare layer A was coated with the coating solution E for the low refractive index layer. Furthermore the coating solution for the low reflective index layer was applied on the antiglare layer A and dried at 80° C. Then the cross-linking was made at 120° C. for ten minutes to form a low refractive index layer whose thickness was 0.096 μm.

The estimations of the obtained antireflection films were made as follows.

(1) Specular Reflectance and Integral Reflectance

A spectrophotometer V-550 (produced by JASCO Corporation) was provided with an adapter ARV-474 to measure the specular reflectance at an exiting angle of −5° according to the incident light of wavelength from 380 nm to 780 nm at the incident angle of 5°. Then the average of the specular reflectance of the reflection whose wavelength was from 450 nm to 650 nm was calculated to evaluate properties of antireflection. Actually, when the specular reflectance was at most 5%, there was no problem, actually.

Further, a spectrophotometer V-550 (produced by JASCO Corporation) was provided with an adapter ILV-471 to measure the integral reflectance according to the incident light of wavelength between 380 nm and 780 nm at the incident angle of 5°. Then the average of the integral reflectance of the reflection whose wavelength was between 450 nm and 650 nm was calculated to evaluate antireflection properties. Actually, when the integral reflectance was at most 10%, there was no problem, actually.

(2) Haze

A haze meter MODEL 1001 DP, (produced by Nippon Denshoku Industries Co., Ltd.) was used for measurement of haze of the antireflection film.

(3) Pencil Hardness

The evaluations of pencil hardness were made as described in JIS K 5400 and the data thereof was used as a criterion of scratch resistance. After the antireflection film was set in atmosphere with the temperature of 25° C. and the humidity of 60% RH for two hours, the surface of the antireflection film was scratched with a 3H test pencil determined in JIS S 6006. Thereby a force of 1 kg was applied to the test pencil. The evaluation of the pencil hardness was:

"A", when no scratch remains on the surface in evaluation of n=5 (n was trial number of performances of scratching);

"B", when one or two scratches remained on the surface in evaluation of n=5;

"N", when more than three scratches remain on the surface in evaluation of n=5.

(4) Contact Angle

After the antireflection film was set in the atmosphere at 25° C. and the humidity of 60% RH for two hours, the contact angle to the water on the antireflection film was measured, and the data thereof was used as a criterion of antistaining, especially finger printing stain proofness. Actually, when the contact angle was in the range of 90° to 180°, there were no problems.

(5) Color Tint

A reflection spectrum was obtained from a data of the observation. Then from the reflection spectrum were calculated L* number, a* number and b* number in a CIE 1976 L*a*b* space, which represent the color tint of the regular reflection to a light generated with an incident angle at 5° by a CIE standard light source D65. The color tint was estimated on the basis of the L* number, a* number and b* number. Actually, there were no problems when the L* number, a* number and b* number are respectively 0 to +15, 0 to +20, and −30 to 0.

(6) Coefficient of Dynamic Friction

After the antireflection film was set in the atmosphere with the temperature of 25° C. and the relative humidity of 60% for two hours, the coefficient of dynamic friction was measured with a machine for measuring the coefficient of dynamic friction, HEIDON-14, in which a stainless steel ball of 5 mmφ was used. Thereby, the speed was set to 60 cm/min, and a force of 100 gw was applied to the surface of the antireflection film.

(7) Antiglare Property

First and second stimations of the antiglare properties were made to the 27 sorts of the obtained antireflection films. An fluorescent lamp (8000 cd/m$^2$) without louver emitted a light onto each antireflection film and the light reflects. An image of the fluorescent lamp formed by the reflection was observed. Thus the estimation of antiglare property was made as follows:

"E" (Excellent) when no outline of the illumination lamp was observed;

"G" (Good) when the outline was slightly recognized;

"P" (Pass) when the outline was not clear but recognized;

"R" (Reject) when the outline was almost clear.

(8) Evaluation of Surface Condition of Coating Layer

A surface of the coating layer of each antireflection film was observed with eyes, and the estimation was made as follows:

"E" (Excellent) when the surface of the coating layer is smooth;

"G" (Good) when the surface is smooth but there were little undissolved aggregates;

"P" (Pass) when the surface is slightly uneven, and the undissolved aggregates are observed clearly;

"R" (Reject) when the surface is uneven and there is a large number of the undissolved aggregates.

Then, the solution B for forming the antiglare layer was coated instead of the solution A on the same film as Example 1, so as to produce another antireflection film as in Experiment 1. Thereby other conditions were the same. Further, the solution C for forming the antiglare layer was coated instead of the solution A on the same film as Example 1, so as to produce another antireflection film as in Experiment 1.

Furthermore, the three antireflection films are produced, in which the solutions A, B, C were respectively coated on the same film obtained in Experiment 2. The evaluations of all the antireflection films are shown in Table 1.

TABLE 1

| Kind of Dope | SA | SR (%) | IR (%) | H (%) | PH | CA | Color Tint L*/a*/b | DF | AP | SC |
|---|---|---|---|---|---|---|---|---|---|---|
| Ex. 1 | A | 1.1 | 2.0 | 8 | A | 103° | 10/1.9/1.3 | 0.08 | E | E |
|  | B | 1.1 | 2.0 | 8 | A | 103° | 9/2.0/−4.0 | 0.08 | E | E |
|  | C | 1.1 | 2.0 | 12 | A | 103° | 9/1.7/0.2 | 0.08 | E | E |
| Ex. 2 | A | 1.2 | 2.2 | 8 | A | 103° | 10/2.0/1.3 | 0.09 | E | E |
|  | B | 1.1 | 2.0 | 8 | A | 102° | 9/2.0/1.3 | 0.08 | E | E |
|  | C | 1.0 | 1.9 | 10 | A | 105° | 10/1.8/1.2 | 0.06 | E | E |

SA: Kind of solution for antiglare layer
SR: Specular Reflectance
IR: Integral Reflectance
H: Haze
PH: Pencil Hardness with Use of 3H Pencil
CA: Contact Angle
DF: Coefficient of Dynamic Friction
AP: Antiglare Property
SC: Surface Condition Table 1 teaches that the antireflection films produced in Examples 1, 2 were excellent in the antiglare property and the antireflection property. Further, the color tint was low, and the evaluations of pencil hardness, and the properties of film (such as the contact angle or the finger printing stain proofness, and the coefficient of dynamic friction) were excellent.

[Production and Estimation of Polarizing Filter]

The polyvinyl alcohol is stretched, and iodine is adsorbed thereto, so as to obtain a polarizing element. The films obtained in Example 1 or 2 are adhered to both surfaces of the polarizing element with polyvinyl type adhering agent. The polarizing plate was exposed for 500 hours in the atmosphere at the temperature of 60° C. and at the humidity of 90% RH.

The parallel transparency Yp and the orthogonal transparency Yc of the polarized light in a visible area were measured with a spectrophotometer. Thereafter, a polarization degree was calculated from the following formula, based on the parallel transparency Yp and the direct transparency Yc:

$$P=[(Yp-Yc)/(Yp+Yc)]^{1/2} \times 100 \ (\%)$$

In the polarizing filter in which the films of Example 1 or 2 were used, the polarization degree was at least 99.6%. The polarizing filter had the enough endurance. The film produced from the dope obtained in the method of present invention for producing the dope, the cellulose acylate dispersion and the swelling solution was preferably used as the protective film for the polarizing filter, and the polarizing filter was excellent in the optical properties.

Various changes and modifications are possible in the present invention and may be understood to be within the present invention.

What is claimed is:

1. A method of producing a cellulose acylate dope, comprising steps of:

continuously supplying cellulose acylate and a solvent into a disperser;

feeding said cellulose acylate and said solvent through said disperser in a retention time of 1 second to thirty seconds before said cellulose acylate is swelled, so as to disperse said cellulose acylate in said solvent to obtain a dispersion;

continuously supplying said dispersion into a shearing device;

swelling said dispersion in said shearing device by retaining said dispersion in said shearing device for at least 30 seconds to obtain a swelling solution;

supplying said swelling solution into a dope production apparatus; and heating said swelling solution by said dope production apparatus and dissolving said cellulose acylate in said dope production apparatus to obtain a dope of said cellulose acylate.

2. The method as defined in claim 1, wherein said solvent contains an additive that is at least one of a plasticizer, a UV-absorbing agent, a matting agent, an adjuster of optical properties, a release agent, a deterioration inhibitor, and a retardation adjuster.

3. The method as defined in claim 1, wherein said disperser includes a shearing section for shearing said solvent and said cellulose acylate, said shearing section dispersing said cellulose acylate in said solvent, and a shearing speed in said shearing section is in the range of $1 \times 10^3$ (1/sec) to $2 \times 10^5$ (1/sec).

4. The method as defined in claim 1, wherein an oxygen density in said disperser is at most 10 vol. %.

5. The method as defined in claim 1, further comprising a step of injecting at least one of gas of nitrogen, helium, neon, argon, krypton, xenon and radon into said disperser.

6. The method as defined in claim 1, wherein a shearing device is provided downstream from said disperser, said shearing device makes the shearing of said dispersion at a shearing speed in the range of $1 \times 10^3$ (1/sec) to $2 \times 10^5$ (1/sec) to swell said cellulose acylate in said dispersion such that a swelling solution is obtained.

7. The method as defined in claim 6, wherein a flowing time of said dispersion from said disperser to said shearing device is less than about one minute.

8. The method as defined in claim 6, wherein said shearing device is inline-connected to said disperser.

9. The method as defined in claim 6, wherein a retention time of said dispersion in said shearing device is at least 30 minutes.

10. The method as defined in claim 6, wherein a cooler for cooling said dispersion is provided for said shearing device.

11. The method as defined in claim 10, wherein said cooler cools said dispersion with use of a cooling medium so as to keep a temperature of said dispersion less than boiling point of said solvent.

12. The method as defined in claim 6, wherein said swelling solution is used for producing a dope.

13. The method as defined in claim 12, wherein said dope is prepared from said swelling solution in a heat-dissolving method.

14. The method as defined in claim 12, wherein said dope is prepared from said swelling solution in a cool-dissolving method.

15. The method as defined in claim 12, wherein a film is formed from said dope in a solution casting method.

16. The method as defined in claim 1, wherein at least 90 wt. % of said cellulose acylate is particles having diameter from 0.1 mm to 2.0 mm.

17. The method as defined in claim 1, wherein a bulk density of said cellulose acylate is in the range of 0.2 g/cm$^3$ to 1.0 g/cm$^3$.

18. The method as defined in claim 1, wherein a repose angle of said cellulose acylate is at most 60°.

19. The method as defined in claim 1, wherein said solvent is a mixture solvent composed of at least two sorts of compounds.

20. The method as defined in claim 19, wherein at least one of said compounds is non-chlorine compounds.

21. A method of producing a cellulose acylate swelling solution, comprising the steps of:
   continuously supplying cellulose acylate and a solvent into a disperser to disperse said cellulose acylate in said solvent before swelling for a time of 1 second to 30 seconds, to obtain a cellulose acylate dispersing solution; and
   continuously supplying said cellulose acylate dispersing solution to a shearing device to obtain a cellulose acylate swelling solution.

* * * * *